(12) United States Patent
Yuang et al.

(10) Patent No.: US 10,687,130 B2
(45) Date of Patent: Jun. 16, 2020

(54) INTELLIGENCE-DEFINED OPTICAL TUNNEL NETWORK SYSTEM CONTROLLER AND CONTROL METHOD THEREOF

(71) Applicant: DELTA ELECTRONICS, INC., Taoyuan (TW)

(72) Inventors: Maria Chi-Jui Yuang, Hsinchu (TW); Po-Lung Tien, Hsinchu (TW); Wei-Zhang Ruan, Hsinchu (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/432,947

(22) Filed: Jun. 6, 2019

(65) Prior Publication Data

US 2019/0379953 A1 Dec. 12, 2019

Related U.S. Application Data

(60) Provisional application No. 62/695,776, filed on Jul. 9, 2018, provisional application No. 62/683,037, filed on Jun. 11, 2018.

(30) Foreign Application Priority Data

Apr. 25, 2019 (CN) .......................... 2019 1 0338492

(51) Int. Cl.
H04Q 11/00 (2006.01)
(52) U.S. Cl.
CPC ..... *H04Q 11/0062* (2013.01); *H04Q 11/0005* (2013.01); *H04Q 2011/009* (2013.01);
(Continued)
(58) Field of Classification Search
None
See application file for complete search history.

(56) References Cited

U.S. PATENT DOCUMENTS 8,705,954 B2 4/2014 Singla et al.
9,654,852 B2 5/2017 Yin et al.
(Continued)

FOREIGN PATENT DOCUMENTS

CN 100373847 C 3/2008
CN 102638411 A 8/2012
(Continued)

OTHER PUBLICATIONS

M. C. Yuang et al., "OPMDC: Architecture Design and Implementation of a New Optical Pyramid Data Center Network," Journal of Lightwave Technology, vol. 33, No. 10, pp. 2019-2031, May 15, 2015.
(Continued)

*Primary Examiner* — David W Lambert
(74) *Attorney, Agent, or Firm* — CKC & Partners Co., LLC

(57) ABSTRACT

An network system control method includes: planning an optical tunnel network according to a routing path table and transmitting a control command according to an optical tunnel network configuration of the optical tunnel network by a tunnel scheduling module, wherein the optical tunnel network includes multiple optical tunnels, and each of the optical tunnels includes a routing path and a wavelength; outputting a control signal to multiple optical switches and multiple top-of-rack switches according to the control command by a configuration managing module; receiving flow statistics of the dataflows of the optical tunnels from the top-of-rack switches, calculating dataflow rates of the dataflows and bandwidth usage rates of the optical tunnels, and transmitting a load notification when one of the bandwidth usage rates exceeds an preset interval by a bandwidth usage monitor; and replanning the optical tunnel network according to the load notification by the tunnel scheduling module.

7 Claims, 40 Drawing Sheets

(52) U.S. Cl.
CPC ........ *H04Q 2011/0041* (2013.01); *H04Q 2011/0064* (2013.01); *H04Q 2011/0073* (2013.01); *H04Q 2011/0088* (2013.01)

(56) References Cited

U.S. PATENT DOCUMENTS

| | | | |
|---|---|---|---|
| 9,807,477 | B2 | 10/2017 | Yuang et al. |
| 2002/0018264 | A1* | 2/2002 | Kodialam ............ H04L 45/62 398/87 |
| 2002/0156914 | A1 | 10/2002 | Lo et al. |
| 2003/0058798 | A1* | 3/2003 | Fleischer ............ H04L 45/00 370/238 |
| 2009/0285097 | A1* | 11/2009 | So ................ H04Q 11/0062 370/235 |
| 2014/0193154 | A1 | 7/2014 | Graham et al. |
| 2015/0181317 | A1 | 6/2015 | Yin et al. |
| 2016/0050044 | A1 | 2/2016 | Liu et al. |
| 2016/0112327 | A1 | 4/2016 | Morris et al. |
| 2016/0173199 | A1* | 6/2016 | Gupta ................ H04B 10/11 398/127 |
| 2016/0277816 | A1* | 9/2016 | Yuang ............ H04Q 11/0005 |
| 2018/0098138 | A1 | 4/2018 | Frankel et al. |
| 2018/0287818 | A1* | 10/2018 | Goel ................ H04L 49/70 |

FOREIGN PATENT DOCUMENTS

| | | | | |
|---|---|---|---|---|
| CN | 105099556 | A | 11/2015 | |
| TW | 1552536 | B | 10/2016 | |
| TW | 201635733 | A | 10/2016 | |
| TW | I615645 | B | 2/2018 | |
| WO | WO-02082720 | A2 * | 10/2002 | ............ H04L 43/12 |

OTHER PUBLICATIONS

Francesco Testa and• Lorenzo Pavesi (Editors), "Optical Switching in Next Generation Data Centers," New York, NY, USA: Springer, 2018.

Cisco Data Center Spine-and-Leaf Architecture: Design Overview White Paper (2016). [Online]. Available: https://www.cisco.com/c/en/us/products/collateral/switches/nexus-7000-series-switches/white-paper-c11-737022.html.

Huber+suhner. Optical switch 7000 series. (2018). [Online]. Available: https://www.hubersuhner.com/en/solutions/wan-access-network/products/optical-switches/optical-switch-7000-series.

Y. Yin, R. Proietti, X. Ye, C. Nitta, V. Akella, and S. Yoo, "LIONS: An AWGR-based low-latency optical switch for high-performance computing and data centers," IEEE J. Set. Topics Quantum Electron., vol. 19, No. 2,Mar./Apr. 2013.

Antonio Capone et al: "Virtual Flow Deviation: Dynamic Routing of Bandwidth Guaranteed Connections", Feb. 24, 2003 (Feb. 24, 2003), Quality of Service in Multiservice IP Networks; [Lecture Notes in Computer Science], Springer Berlin Heidelberg, Berlin Heidelberg, pp. 592-605, XP019073525, ISBN: 978-3-540-00604-6.

* cited by examiner

Input: Pre-allocation Scheme S
Output: routing path and wavelength ($P, \lambda$)
Variable:
    $f$   : routing path function
    $idx$ : set of indices
    $P$  : routing path
    $Re$ : 40-bit result
    $S_P$ : source pod
    $S_R$ : source rack
    $D_P$ : destination pod
    $D_R$ : destination rack
    $T$  : tunnel
    $T(S, D)$ : set of tunnels from S to D

Compute_pre-allocation_tunnel(S):
    for all OADSs *Src* do:
        for all pre-allocation tunnel T in S do:
            $Dst$ ← Destination OADS for *Src* in T
            $\lambda$ ← wavelength used in *Src* in T
            $f$ ← routing path function used in T
            calculate ($S_P, S_R, D_P, D_R$) from *Src* and *Dst*
            $idx$ ← $f(S_P, S_R, D_P, D_R)$;
            $P$ ← get different routing elements with *idx* to form a routing path;
            Create_Tunnel ($P, \lambda$);
    //Configure ToR to enable relay for all-to-all connectivity
    for all OADSs *Src* do:
        for all OADSs Dst not in pre-allocation scheme S do:
            ReOADS ← the source relay OADS if any, otherwise the destination relay OADS;
            //source relay OADS means the OADS in the same pod with Src and the same
              index as Dst, similar with the destination erlay OADS
            T1 ←T(Src, ReOADS);
            T2 ←T(ReOADS, Dst);
            Config_ToR_Relay(T1, T2);//configure ToRs to relay flow from Src to Dst

FIG. 18

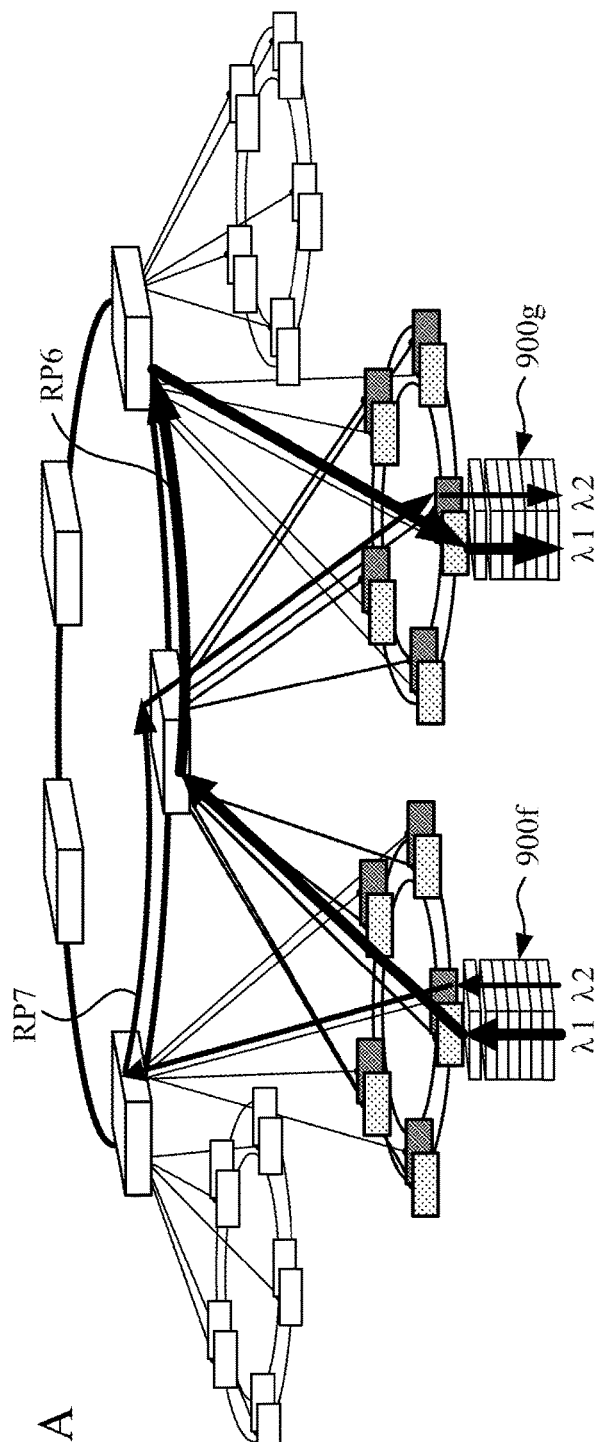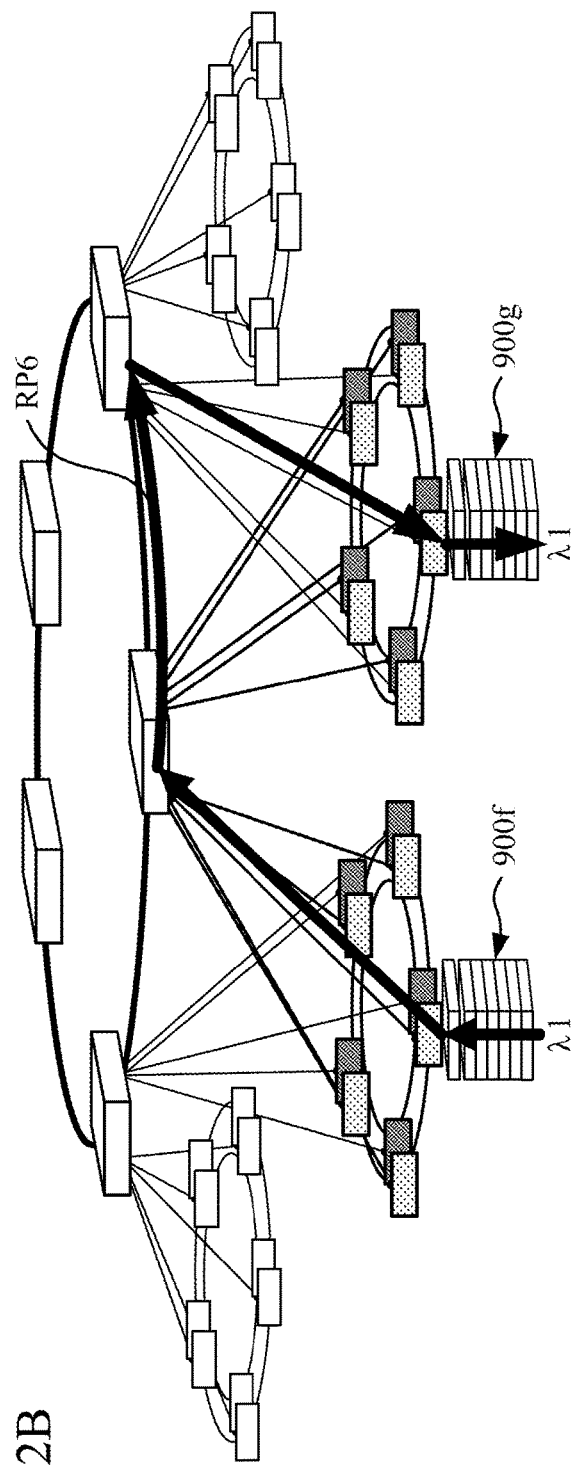
FIG. 22A
FIG. 22B

Input: overload tunnel $T_o$ or underload tunnel $T_u$
Output: routing path and wavelength ($P$, $\lambda$), if any
Variable:
    $T$ : routing path table
    $F$ : routing path function
    $idx$ : set of indices
    $P$ : routing path
    $Re$ : 40-bit result
    $\lambda$ : wavelength
    $T(S, D)$: the set of tunnel from S to D Allocation_Algorithm():
    if received overload alarm on tunnel $T_o$ then call Handle_Overload($T_o$);
    if received underload alarm on tunnel $T_u$ then call Handle_Underload($T_u$);

Handle_Overload($T_o$):
    f ← the flow with maximum traffic in $T_o$;
    Redirect(f);
    Tunnel_Creation() if needed;
    Tunnel_Splitting();

Handle_Underload($T_u$)
    for all flow f in $T_u$ do:
        Redirect (f);
    Tunnel_Merging();
    Tunnel_Removal();

Redirect (f)://this function would trigger one or multiple times of tunnel splitting/merging
    Find_Other_Available_Routing_Path();

Tunnel_Creation(f):
    $S_P$, $S_R$, $D_P$, $D_R$ ← f's source pod/rack and destination pod/rack;
    $T$ ← Find_Routing_Path_Table($S_P$, $S_R$, $D_P$, $D_R$);
    Parallel for all routing path function $F$ in $T$ do:
        $idx$ ← $F(S_P, S_R, D_P, D_R)$;
        $P$ ← get different routing elements with $idx$;
        $Re$ ← execute and (&) operation of all elements in $P$;
        if ($Re \neq 0$) then:
            $\lambda$ ← position of first bit of 1 (from left to right) in $Re$;
            return routing path and wavelength ($P$, $\lambda$);
    return NULL

FIG. 24

Input: $S_P$, $S_R$, $D_P$, $D_R$
Output: information of routing path
Variable:
  Ring_1 : Constant, value= 0, refers to the ring formed by OADSs' blue sub modules
  Ring_2 : Constant, value= 1, refers to the ring formed by OADSs' red sub modules
  OADS_Sender: Indices of source OADS's routing element
  OADS_Rcver: Indices of destination OADS's routing element
Intra_Pod_Rpath_Type_Blue ($S_P$, $S_R$, $D_P$, $D_R$):
  OADS_Sender ← (Ring_1, $S_P$, $S_R$)
  OADS_Rcver ← (Ring_1, $D_P$, $D_R$)
  return { OADS_Sender, OADS_Rcver }

FIG. 29

Input: $S_P, S_R, D_P, D_R$
Output: information of routing path
Variable:
   Ring_1 : Constant, value= 0, refers to the ring formed by OADSs' blue sub modules
   Ring_2 : Constant, value= 1, refers to the ring formed by OADSs' red sub modules
   To_East : Constant, value= 0, refers to the "to east" direction
   To_West : Constant, value= 1, refers to the "to west" direction
   Src_OSIS : Index of source OSIS
   Dst_OSIS : Index of destination OSIS
   OADS_Sender: Indices of source OADS's routing element
   OADS_Rcver: Indices of destination OADS's routing element
   OSIS_EW: Indices of source OSIS's routing element
   OSIS_South: Indices of destination OSIS's routing element Inter_Pod_Rpath_Type_BB ($S_P, S_R, D_P, D_R$):
   OADS_Sender ← (Ring_1, $S_P, S_R$)
   OADS_Rcver ← (Ring_1, $D_P, D_R$)
   Src_OSIS ← get the index of source OSIS using $S_P$
   Dst_OSIS ← get the index of destination OSIS using $D_P$
   OSIS_South ←(Ring_1, Dst_OSIS)
   if(Src_OSIS = Dst_OSIS) then:
      OSIS_EW ← NULL
   else then:
      East_Distance ← go from Src_OSIS to east to Dst_OSIS, record the distance
      West_Distance ← go from Src_OSIS to west to Dst_OSIS, record the distance
      if(West_Distance < East_Distance) then:
         OSIS_EW ← (To_West, Src_OSIS)
      else then:
         OSIS_EW ← (To_East, Src_OSIS)
   return ( OADS_Sender, OSIS_EW, OSIS_South, OADS_Rcver )

FIG. 31

INTELLIGENCE-DEFINED OPTICAL TUNNEL NETWORK SYSTEM CONTROLLER AND CONTROL METHOD THEREOF

RELATED APPLICATIONS

This application claims priority to U.S. Provisional Application Ser. No. 62/683,037, filed Jun. 11, 2018, and U.S. Provisional Application Ser. No. 62/695,776, filed Jul. 9, 2018, and China Application Serial Number 201910338492.8, filed Apr. 25, 2019, which are herein incorporated by reference.

BACKGROUND

Technical Field

The disclosure relates to an edge data center network system and an edge data center network system control method, particularly to an optical tunnel network system applied to the edge data center network system and a control method thereof.

Description of Related Art

Data Center Networks (DCNs) are utilized in cloud data centers or edge data centers to provide a reliable and efficient network structure, which is able to support various applications and services which are cloud-based, edge-based or enterprise-orientated, such as cloud computing, edge computing, data storage, data mining, social networking, etc.

In a Data Center Network utilizing conventional electrical switches for data exchanging, a transmission rate of the Data Center Network will be limited by data exchanging capability of the conventional electronic switches. In addition, the process of data transmission in the Data Center Network involves a lot of Optical-Electrical conversions and Electrical-Optical conversions, which will cause a heavy power consumption. The conventional electronic switches also require a lot of computation to determine how to route packets during the data transmission. The computation performed by the conventional electronic switches consumes a lot of power, increase latency of data transmission and raise a cost to cool down the Data Center Network system. Furthermore, when a system structure of the conventional electronic switches is formed and fixed it is difficult to upgrade the system structure in order to support more racks or servers with higher performance. In order to increase a transmission rate of the Data Center Network utilizing the conventional electronic switches, the existed electronic switches are required to be replaced or upgraded, such that it causes a higher cost to establish or maintain the Data Center Network utilizing the conventional electronic switches.

SUMMARY

One aspect of the present disclosure is an network system control method including: planning an optical tunnel network according to a routing path table and transmitting a control command according to an optical tunnel network configuration of the optical tunnel network by a tunnel scheduling module, wherein the optical tunnel network includes multiple optical tunnels, and each of the optical tunnels includes a routing path and a wavelength; outputting a control signal to multiple optical switches and multiple top-of-rack switches according to the control command by a configuration managing module; receiving flow statistics of the dataflows of the optical tunnels from the top-of-rack switches, calculating dataflow rates of the dataflows and bandwidth usage rates of the optical tunnels, and transmitting a load notification when one of the bandwidth usage rates exceeds an preset interval by a bandwidth usage monitor; and replanning the optical tunnel network according to the load notification by the tunnel scheduling module.

Another aspect of the present disclosure is a network system controller configured to control multiple optical switches and multiple top-of-rack switches to build optical tunnels and including a shared memory, a topology transformer, a tunnel scheduling module, a configuration managing module and a bandwidth usage monitor. The topology transformer is coupled to the shared memory and configured to calculate a routing path table, and store the routing path table to the shared memory. The tunnel scheduling module is coupled to the shared memory and configured to build an optical tunnel network according to the routing path table, and to transfer a control command according to an optical tunnel network configuration of the optical tunnel network. The configuration managing module is coupled to the tunnel scheduling module and configured to convert the control command into a control signal and to output the control signal to the multiple optical switches and the multiple top-of-rack switches. The bandwidth usage monitor is coupled to the shared memory and the tunnel scheduling module and configured to receive flow statistics, to calculate dataflow rates and bandwidth usage rates according to the flow statistics, and to transfer a load notification to the tunnel scheduling module according to the bandwidth usage rates, the tunnel scheduling module configured to replan the optical tunnel network according to the bandwidth usage rates and the optical tunnel network configuration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Figure 15A:
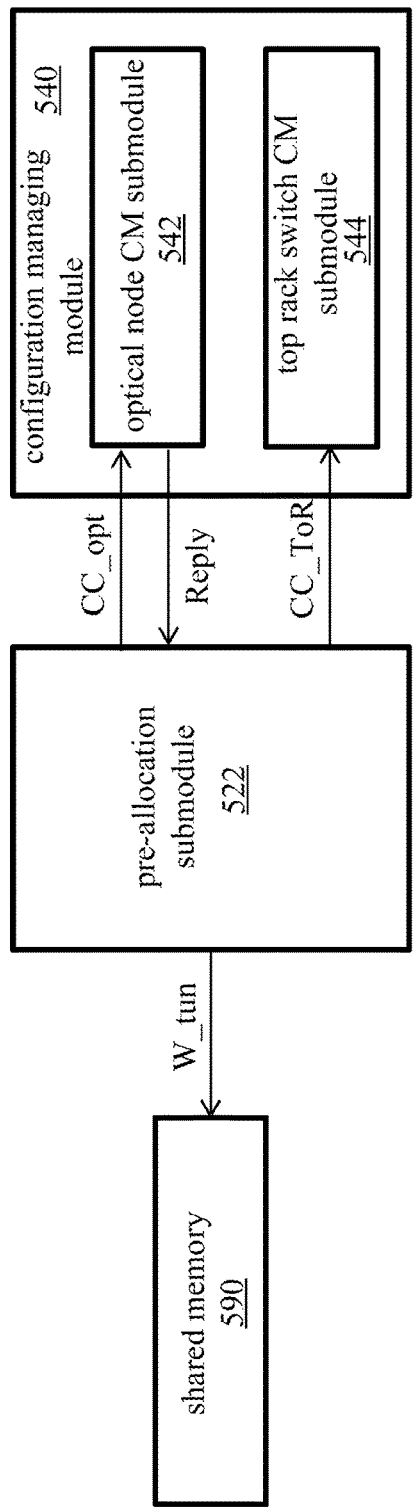
Figure 15B:
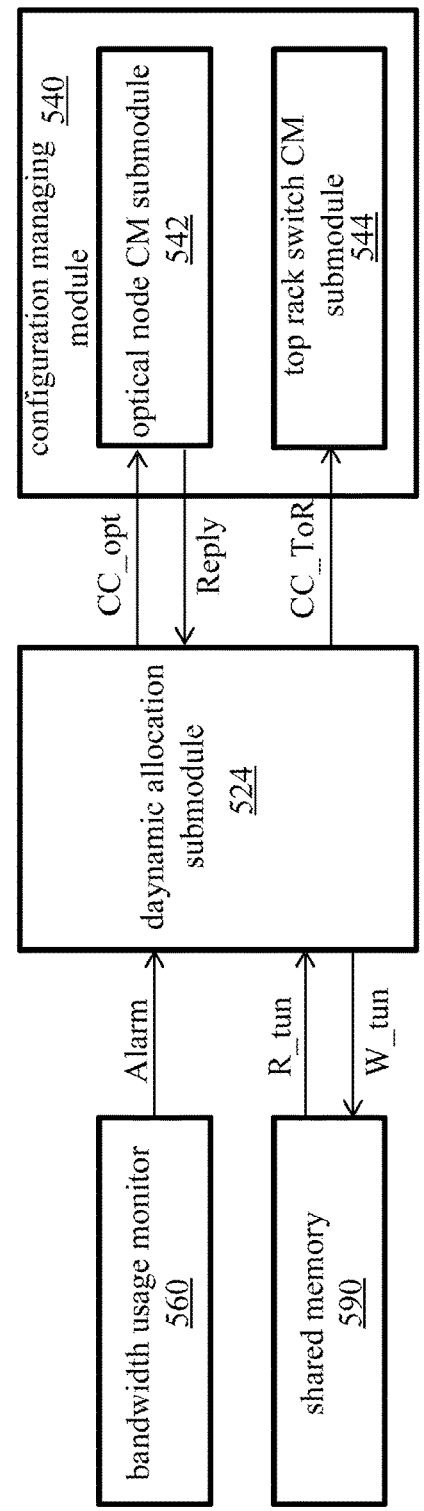

The FIG. 15A and FIG. 15B are detailed functional block diagram of a SDN controller in accordance with some embodiments of the present disclosure.

Figure 16:
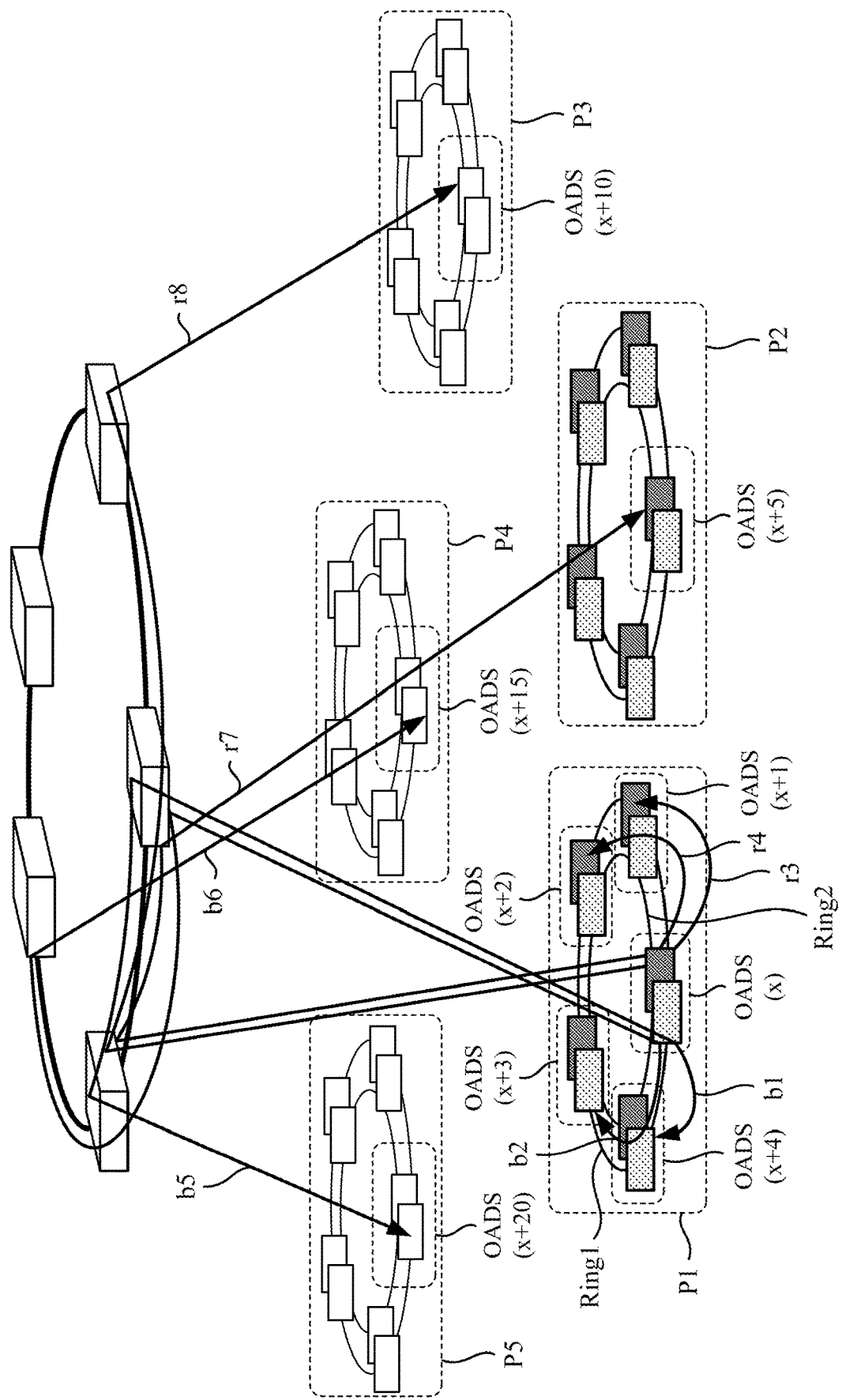

FIG. 16 is a schematic diagram of optical tunnels between any one of the optical add-drop sub-system and another one of the optical add-drop sub-system in the optical tunnel network build by the pre-allocation submodule in accordance with some embodiments of the present disclosure.

Figure 17:
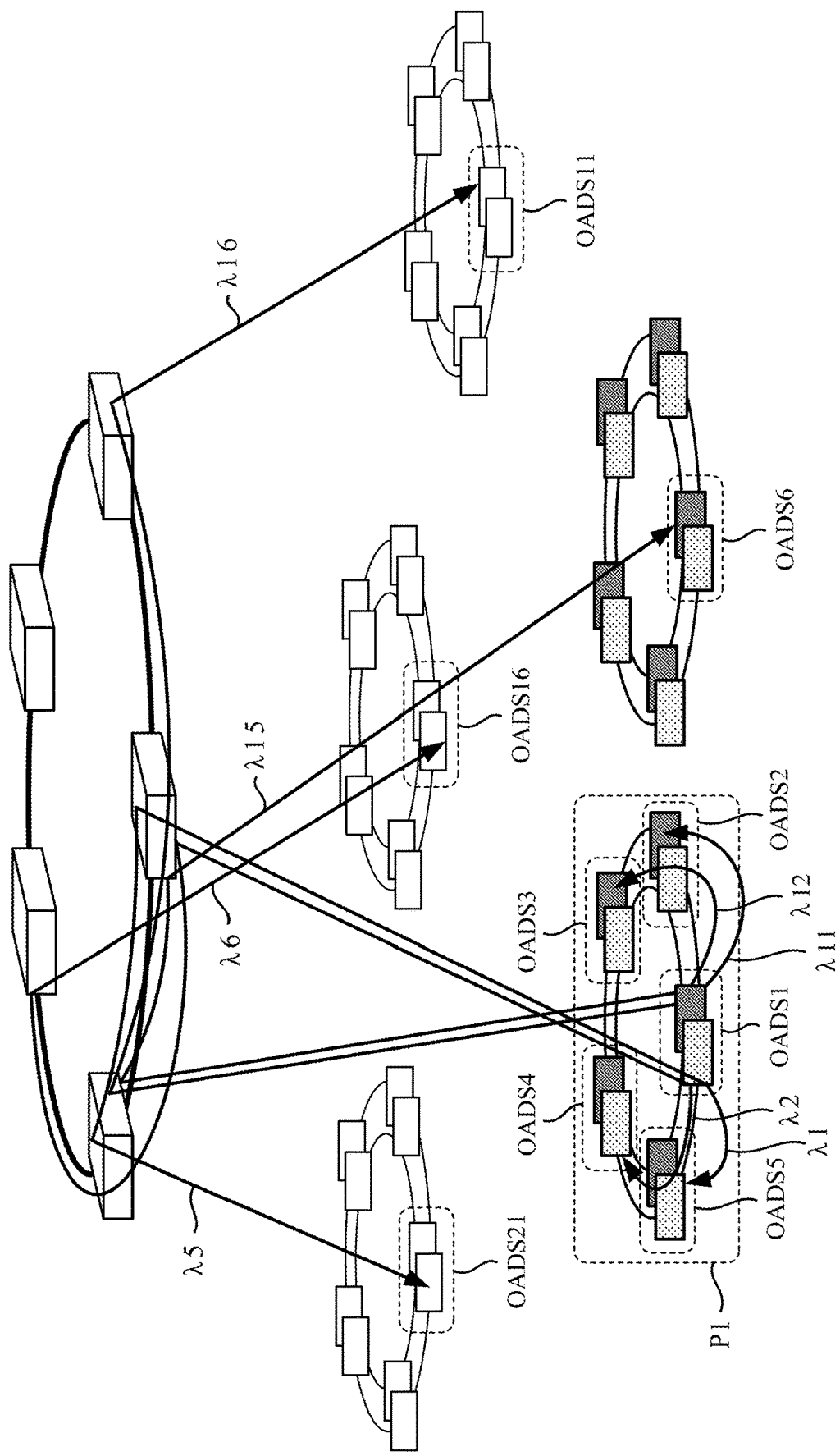

FIG. 17 is a schematic diagram of optical tunnels between one specific optical add-drop sub-system and the other the optical add-drop sub-system in the optical tunnel network build by the pre-allocation submodule in accordance with some embodiments of the present disclosure.

FIG. 18 is a schematic diagram of an algorithm to build the optical tunnel network by the pre-allocation submodule in accordance with some embodiments of the present disclosure.

Figure 19:
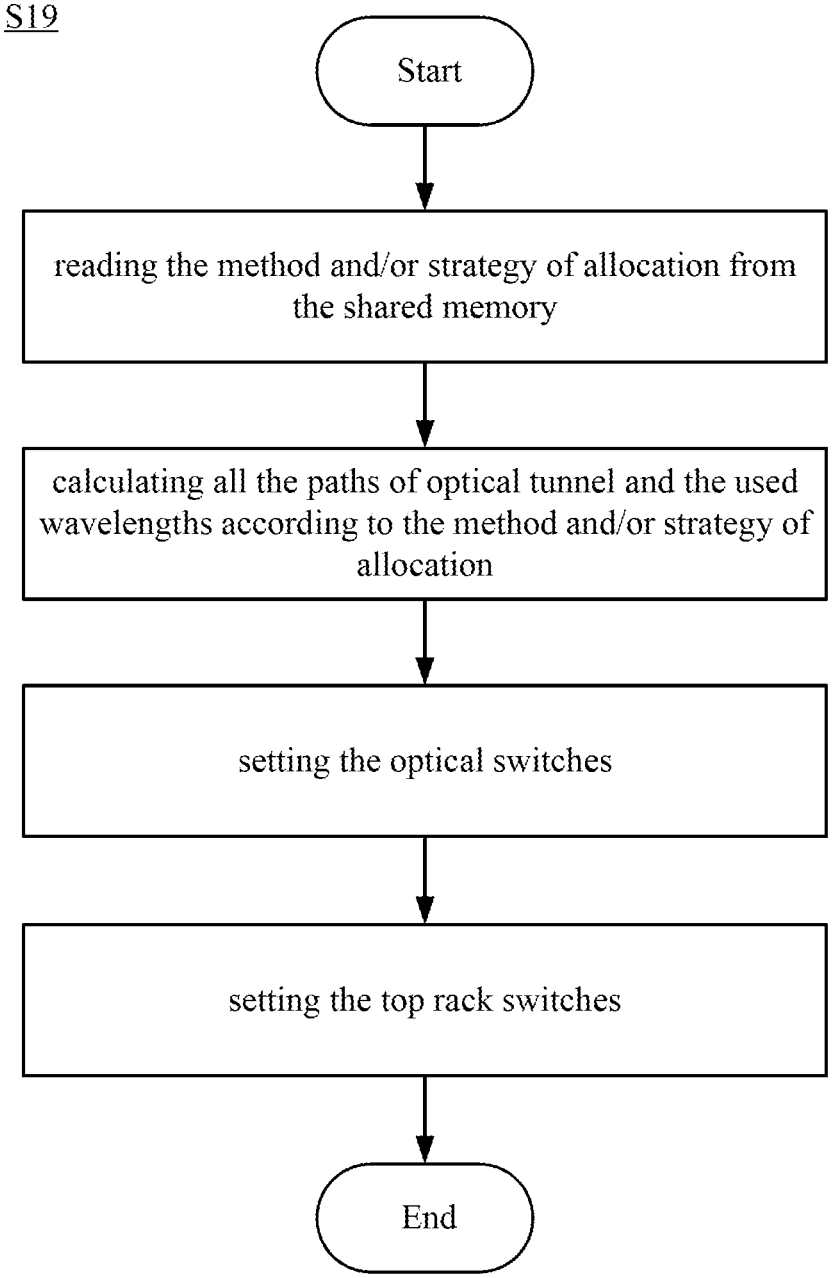

FIG. 19 is a flowchart of the operation of the pre-allocation submodule in accordance with some embodiments of the present disclosure.

Figure 20A:
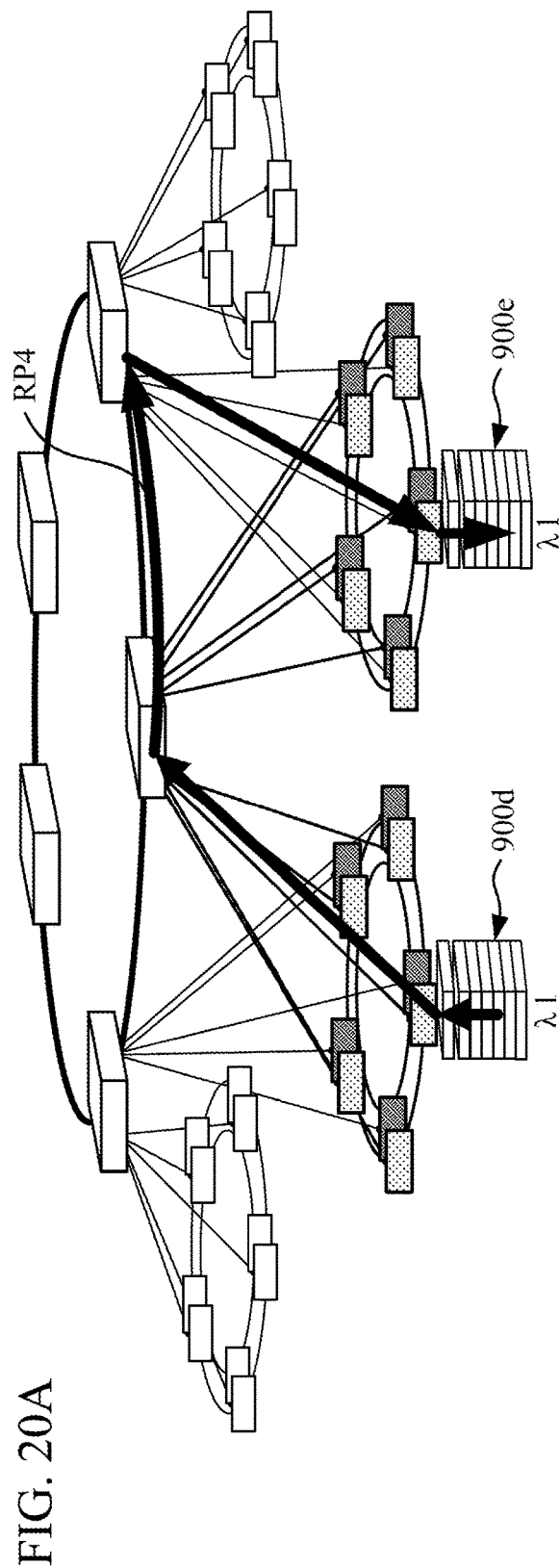
Figure 20B:
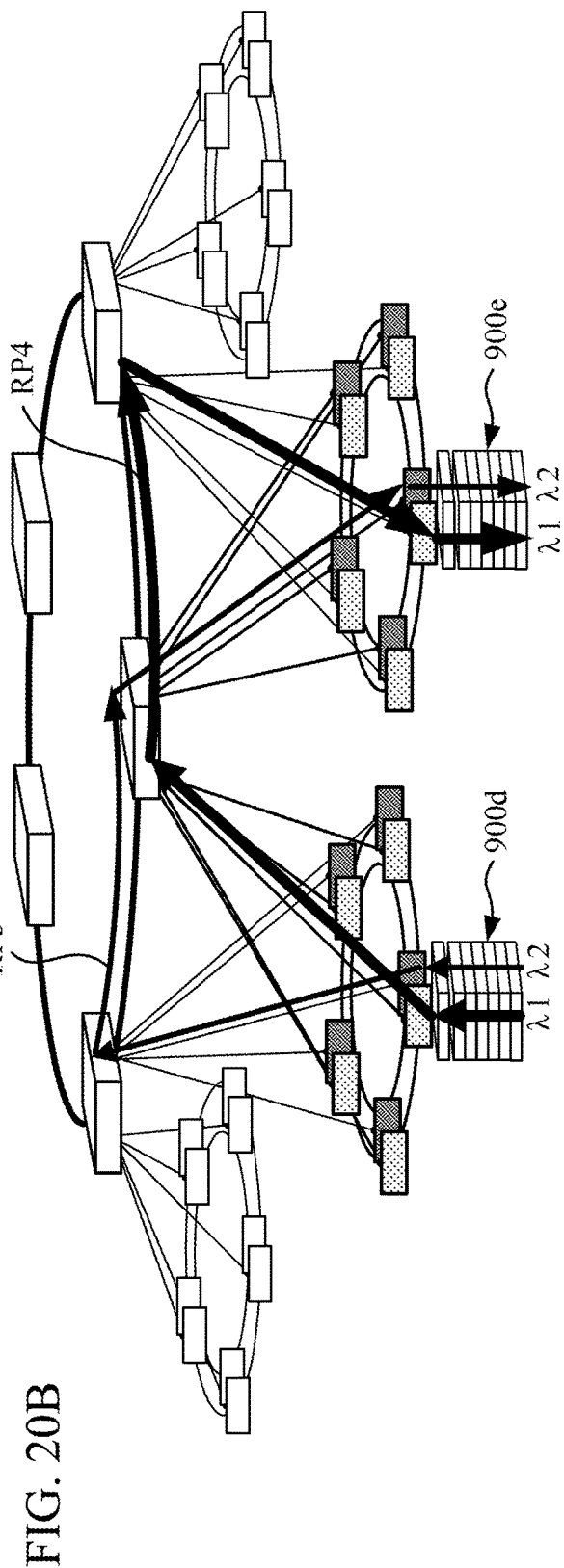

FIG. 20A and FIG. 20B are schematic diagrams of tunnel splitting in accordance with some embodiments of the present disclosure.

Figure 21:
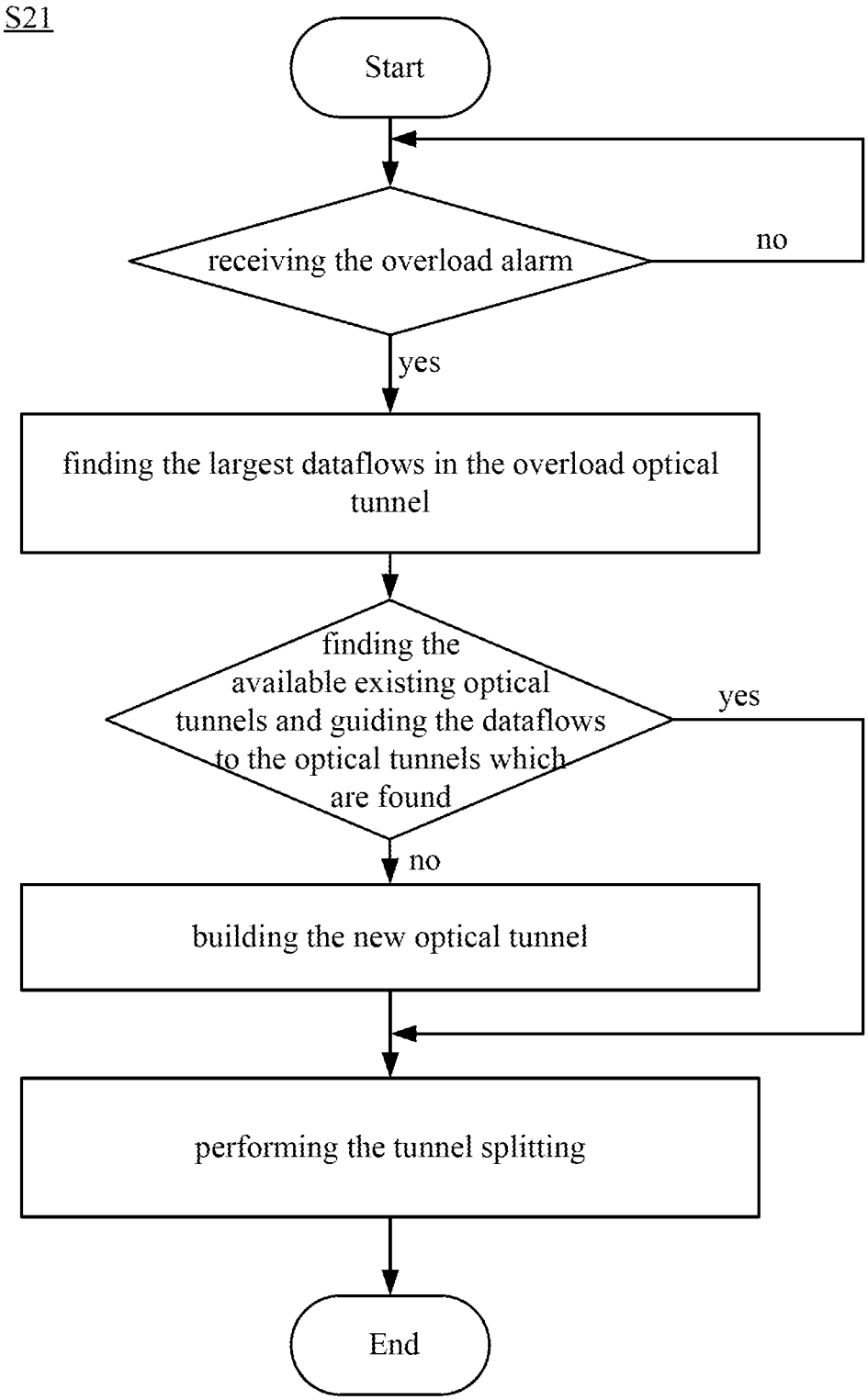

FIG. 21 is a flowchart of processing the high load tunnel in accordance with some embodiments of the present disclosure.

FIG. 22A and FIG. 22B are schematic diagrams of tunnel merging in accordance with some embodiments of the present disclosure.

Figure 23:
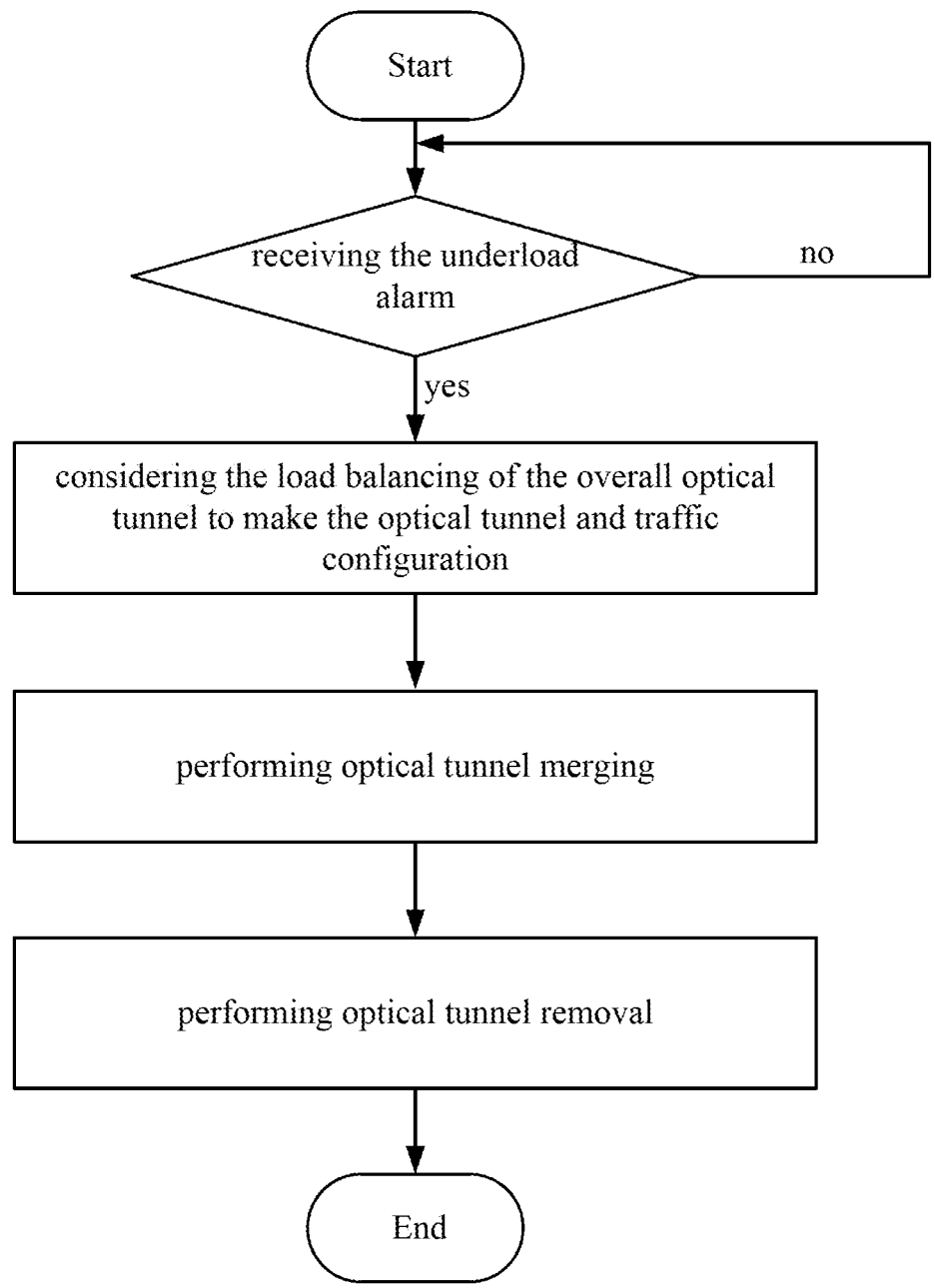

FIG. 23 is a flowchart of processing the low load tunnel in accordance with some embodiments of the present disclosure.

FIG. 24 is a schematic diagram of an optical tunnel allocation algorithm in accordance with some embodiments of the present disclosure.

Figure 25:
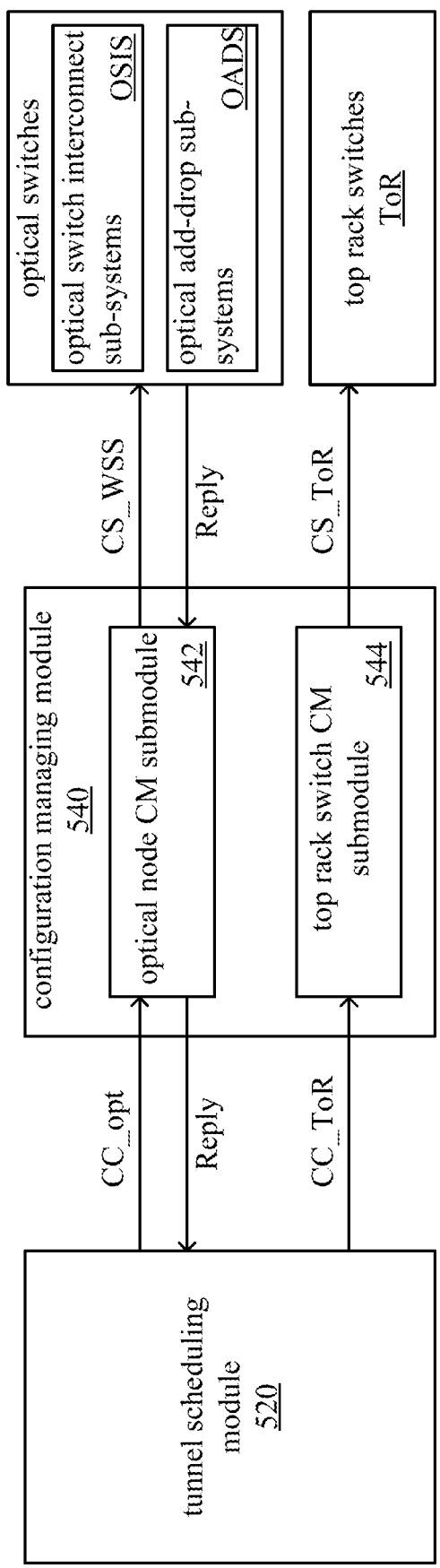

FIG. 25 is a detailed functional block diagram of a SDN controller in accordance with some embodiments of the present disclosure.

Figure 26:
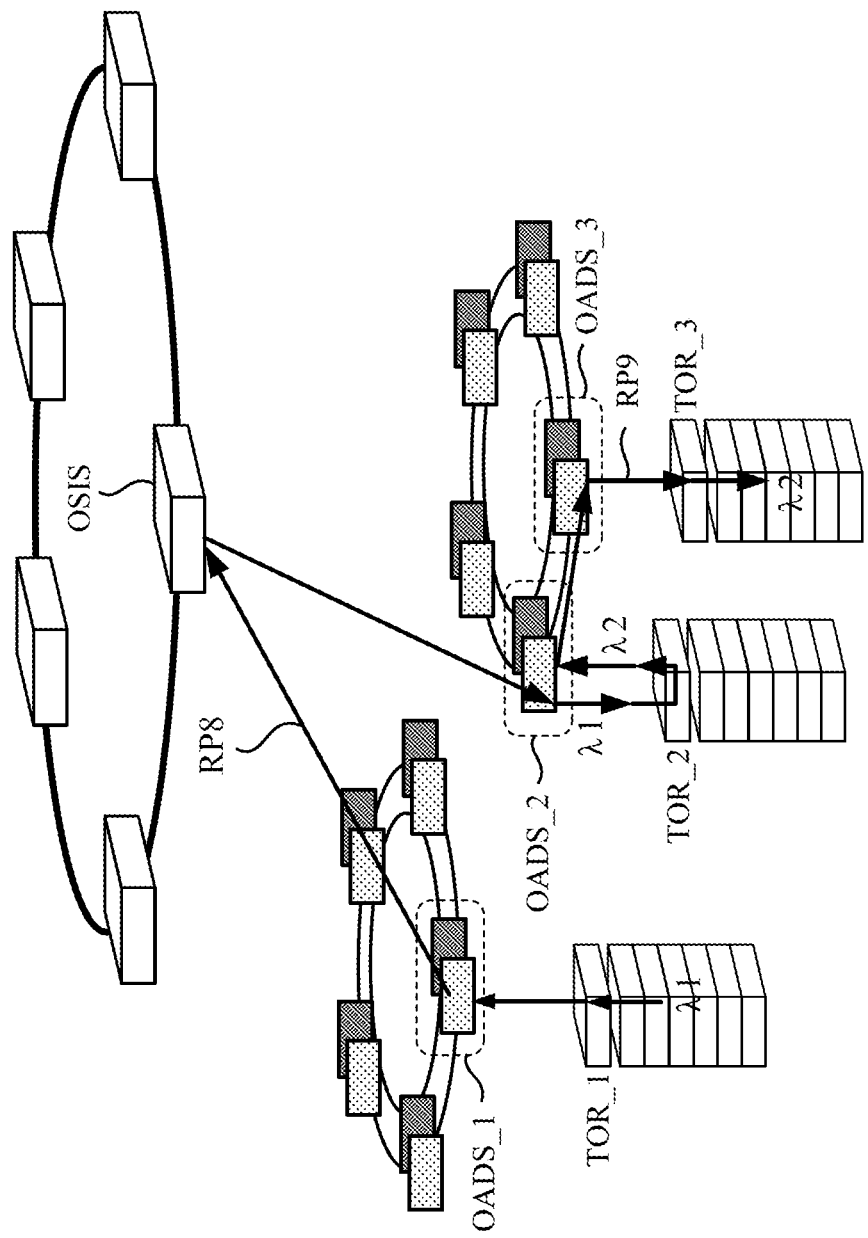

FIG. 26 is a schematic diagram of tunnel relay in accordance with some embodiments of the present disclosure.

Figure 27:
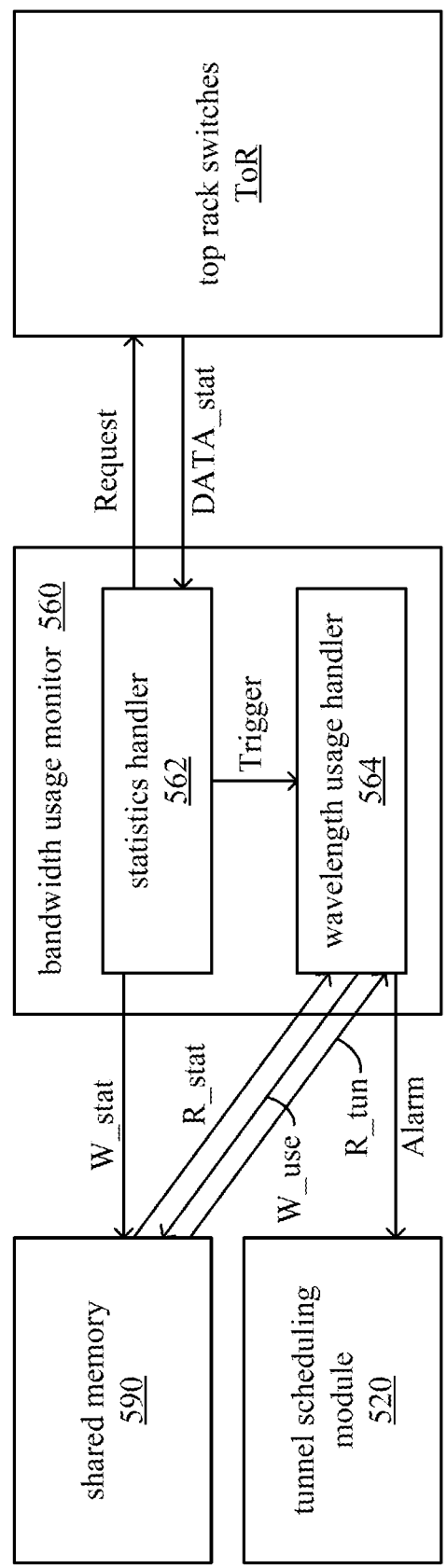

FIG. 27 is detailed functional block diagram of a SDN controller in accordance with some embodiments of the present disclosure.

Figure 28:
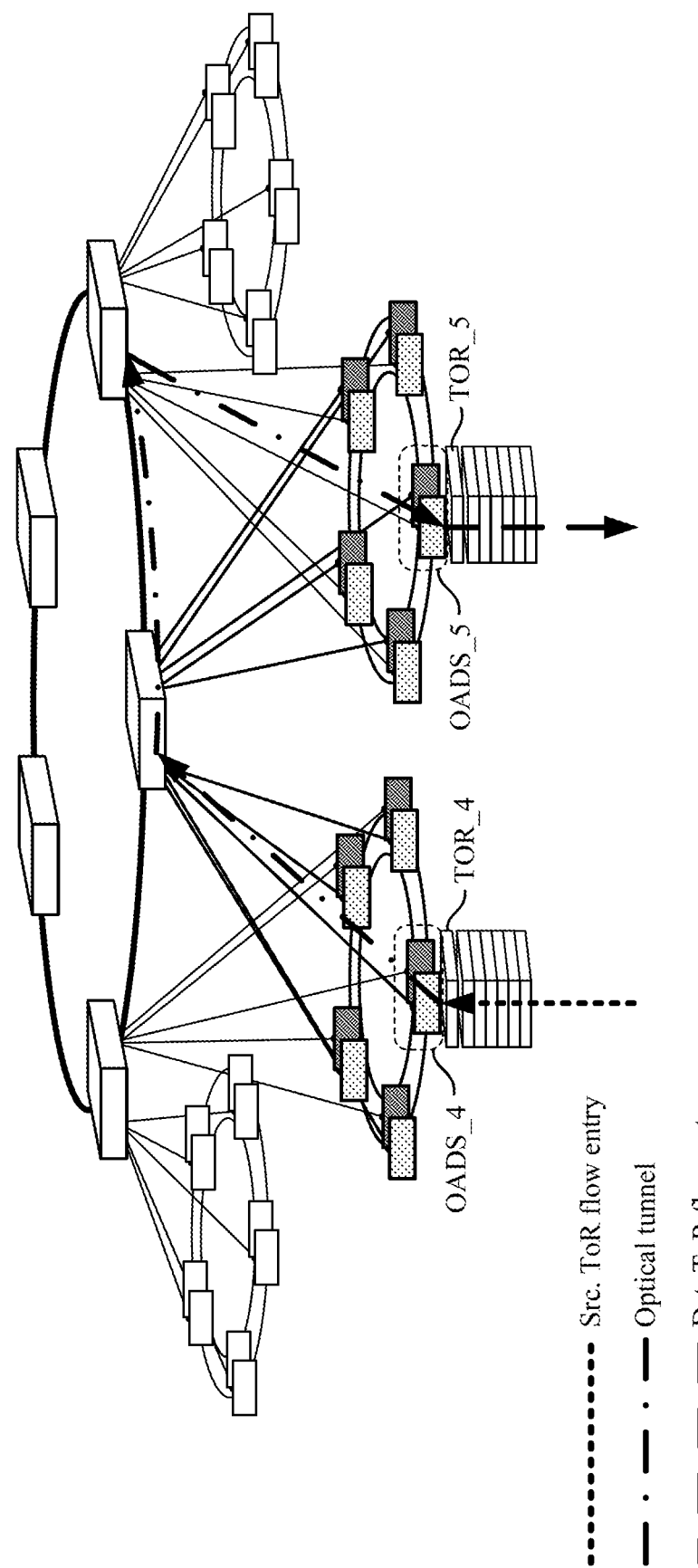

FIG. 28 is a schematic diagram of calculating dataflow rates of the optical tunnel in accordance with some embodiments of the present disclosure.

FIG. 29 is a schematic diagram of the algorithm of the intra-pod routing path function in accordance with some embodiments of the present disclosure.

Figure 30:
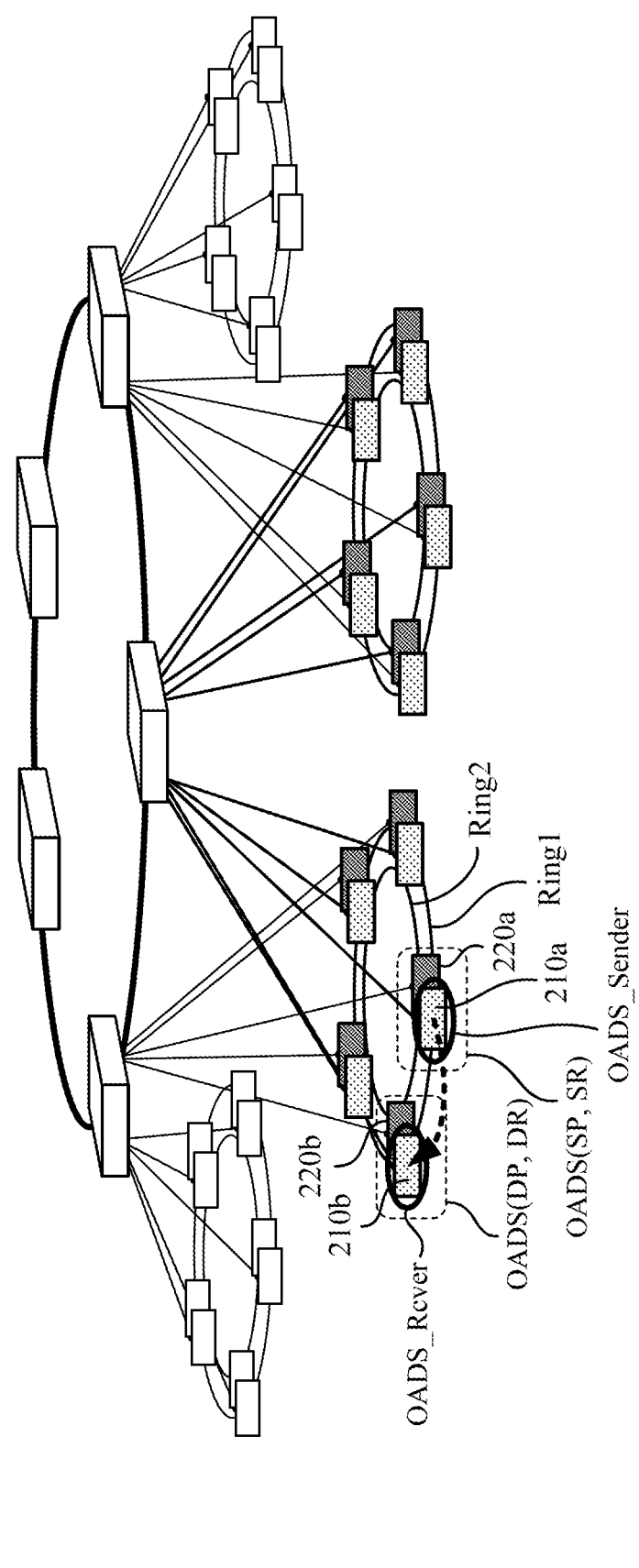

FIG. 30 is a schematic diagram of building the intra-pod optical tunnel in accordance with some embodiments of the present disclosure.

FIG. 31 is a schematic diagram of the algorithm of the inter-pod routing path function in accordance with some embodiments of the present disclosure.

Figure 32:
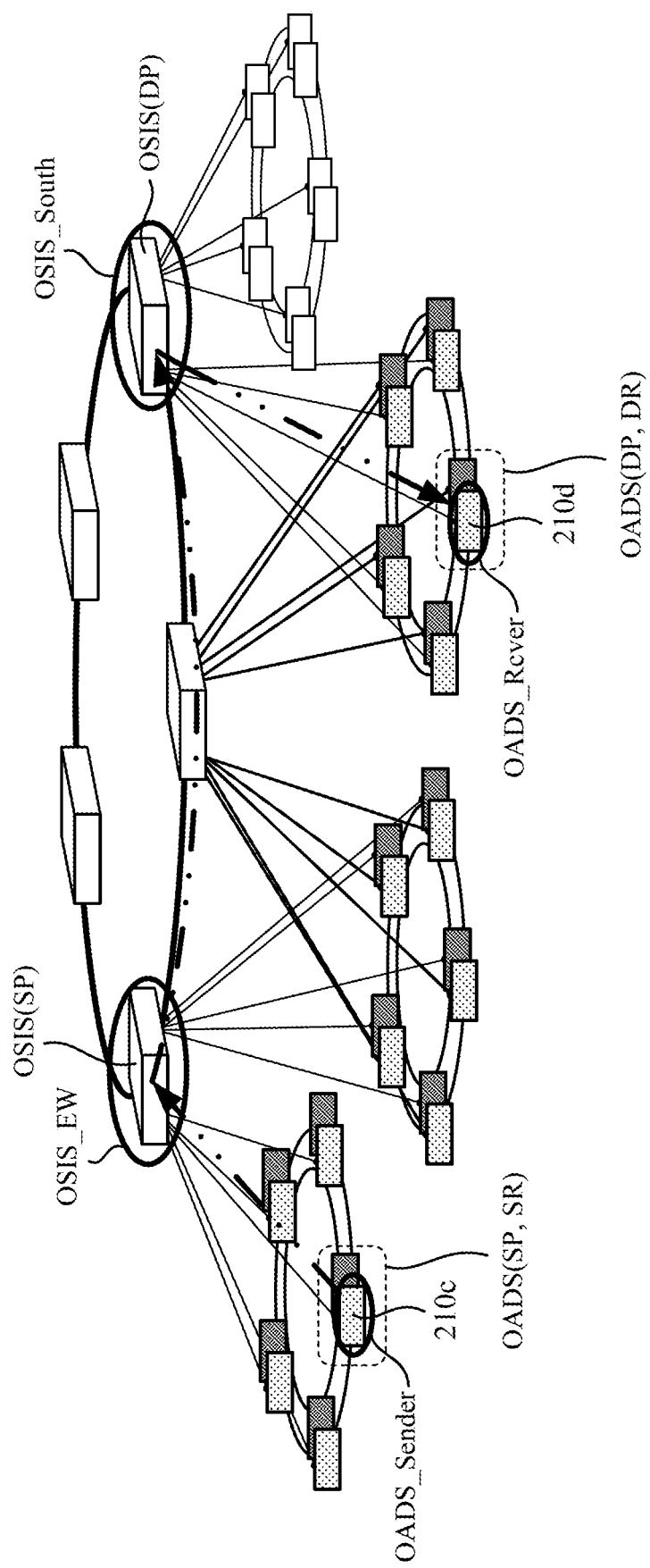

FIG. 32 is a schematic diagram of building the inter-pod optical tunnel in accordance with some embodiments of the present disclosure.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "comprise," "comprising," "include," "including," "has," "having," etc. used in this specification are open-ended and mean "comprises but not limited." As used herein, the term "and/or" includes any and all combinations of one or more of the associated listed items.

In this document, the term "coupled" may also be termed "electrically coupled" and "coupled by optical fiber", and the term "connected" may be termed "electrically connected" and "connected by optical fiber". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. In this disclosure, mentioned terms 1×1, 1×2, 1×3, 2×1, 2×2, 5×1, 6×4 and N×M illustrate the amount of input terminals and the amount of output terminals such as 1 input and 1 output, 1 input and 2 outputs, 1 input and 3 outputs, 2 inputs and 1 output, 2 inputs and 2 outputs, 5 inputs and 1 output, 6 inputs and 4 outputs, and N inputs and M outputs respectively.

Figure 1:
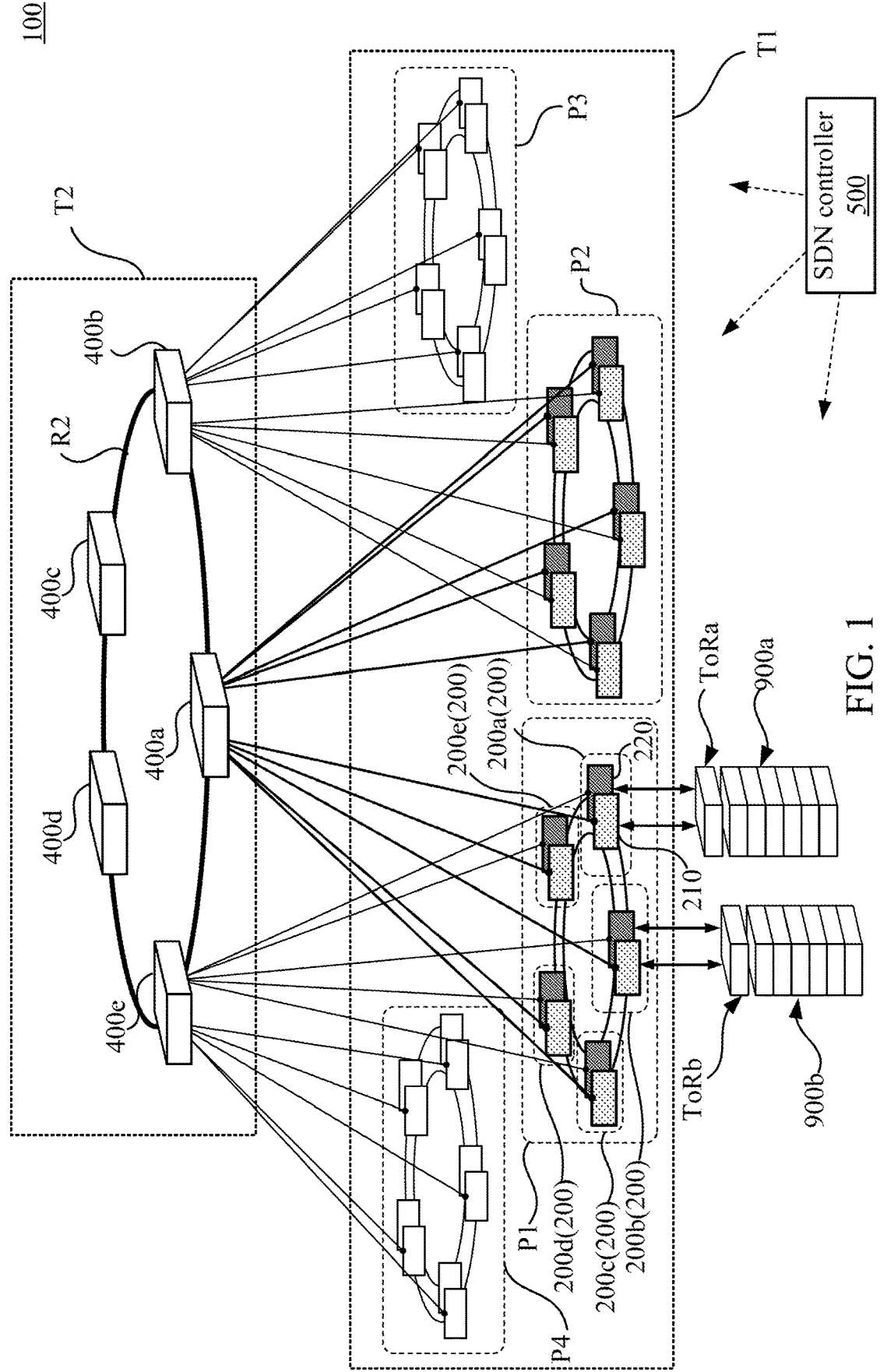
FIG. 1 is a schematic diagram of an intelligence-defined optical tunnel network system in accordance with some embodiments of the present disclosure.

Please refer to FIG. 1. FIG. 1 is a schematic diagram of an intelligence-defined optical tunnel network system 100 in accordance with some embodiments of the present disclosure. In some embodiments, the intelligence-defined optical tunnel network system 100 can be applied to the intelligence-defined optical tunnel network system (OPTUNS) in the Edge Data Center for replacing the complicated, multi-tier and electrically-switching network system in the data center.

As shown in FIG. 1, in some embodiments, the intelligence-defined optical tunnel network system 100 includes a first tier network T1 and a second tier network T2. The first tier network T1 and the second tier network T2 can be interconnected by a single mode fiber. In some embodiments, the first tier network T1 and the second tier network T2 are optical switching networks respectively.

As shown in FIG. 1, in some embodiments, the first tier network T1 includes a plurality of pods, as the pods P1-P4 shown in the figure. In this embodiment, the pods P1-P4 are pods of optical nodes respectively. For ease of understanding and simplifying the description, some pods of the first tier network T1 is not shown in FIG. 1.

Any one of the pods P1-P4 in the first tier network T1 includes a plurality of optical add-drop sub-systems (OADS) 200a-200e as optical nodes. OADSs are configured to transmit data, through a plurality of Top of Rack (ToR) switches ToRa and ToRb respectively, with servers in a corresponding plurality of racks 900a and 900b. As shown in FIG. 1, in some embodiments, each pod P1-P4 includes five OADSs respectively. For ease of description, there are only two sets of ToR switches ToRa, ToRb and racks 900a, 900b illustrated in the diagram.

In practice, the remaining OADSs are also connected to their corresponding servers through the corresponding ToR switches in order to perform data transmission. Further, the amount of OADSs included in each pod P1-P4 can be adjusted according to the actual requirement. FIG. 1 is merely exemplary and the present disclosure is not limited thereto.

Taking the OADS 200a as an example, any one of the OADSs in the pod P1 includes a first transmission module 210 and a second transmission module 220. The first transmission module 210 is configured to perform data transmission at a first frequency band. The second transmission module 220 is configured to perform data transmission at a second frequency band differed to the first frequency band. In some embodiments, the first transmission module 210 and the second transmission module 220 are optical transmission module respectively. The first frequency band is a wavelength band in a specific wavelength range, and the second frequency band is another wavelength band in another specific wavelength range. As shown in FIG. 1, in the same pod P1, the first transmission module of any one of the OADS (i.e., OADS 200a) is connected to the first transmission modules 210 of the adjacent the OADS (i.e., OADS 200b) to form a first transmission ring. Similarly, the second transmission module of any one of the OADS (i.e., OADS 200a) is connected to the second transmission modules 220 of the adjacent the OADS (i.e., OADS 200b) to form a second transmission ring. In some embodiments, the first transmission modules 210 in the first transmission ring are connected to each other through an optical fiber, and the second transmission modules 220 in the second transmission ring are connected to each other through an optical fiber.

It should be noted that, in some embodiments, the first frequency bands configured in the first transmission modules of each OADSs 200a-200e in the same pod are different from each other, and the second frequency bands configured in the second transmission modules of each OADSs 200a-200e are different from each other. The detail of the module, frequency band configuration and specific operation of the OADSs 200a-200e will be described in the following paragraphs with the corresponding diagrams.

As shown in FIG. 1, in some embodiments, the second tier network T2 comprises a plurality of optical switch interconnect sub-systems (OSIS) 400a-400e as optical nodes. Structurally, any two of the OSISs 400a-400e transmits a corresponding lateral transmission optical signal through the corresponding first line to implement communication between each of the OSISs 400a-400e. In other words, the OSISs 400a-400e are interconnected to each other with optical fiber in a structure which is similar to the mesh network, so that the fiber network between any pair of OSISs 400a-400e and the fiber network between any other pair of the OSISs 400a-400e operate independently to each other. In some embodiments, the optical fiber network between the OSISs 400a-400e can be implemented with ribbon fiber. Therefore, the connection between the OSISs 400a-400e also appears to be a ring-shaped mesh structure R2 in outward expression.

The OSISs 400a-400e are configured to receive, respectively, optical signals from the OADS of the first tier network T1, after performing route switching and optical wavelength switching transit downwardly to another OADS of the first tier network T1.

A Software-defined network controller (SDN controller) 500 is configured to output corresponding control signals to each of the ToR switches ToRa, ToRb, the OADSs 200a-200e and the OSISs 400a-400e in order to build optical tunnels and schedule the optical tunnels. Thus, the data transmission in the system between each server can be implemented by utilizing optical signals through the optical fiber networks in the first tier network T1 and the second tier network T2.

It should be noted that the amounts of OSISs and of OADSs illustrated in FIG. 1 are merely exemplary and the present disclosure is not limited thereto. In various embodiments, the amount of OSISs 400a-400e and OADSs 200a-200e of the intelligence-defined optical tunnel network system 100 can be incrementally increased and/or decreased in accordance with the actual requirement and the normal operation of the intelligence-defined optical tunnel network system 100 is maintained. Therefore, the intelligence-defined optical tunnel network system 100 has a high degree of deployment flexibility.

As a result, in the intelligence-defined optical tunnel network system 100, by selecting a particular wavelength combination of the OSISs 400a-400e, the OADSs 200a-200e and the optical signals, the optical tunnel (that is, the optical path pluses optical wavelength combination) for data exchange between racks and racks can be established to achieve an ultra-low latency of data transmission.

In addition, in some embodiments, the dense wavelength division multiplexing (DWDM) technology can be applied in the intelligence-defined optical tunnel network system 100. By utilizing DWDM transceiver, various optical wavelengths can be used for transmitting data at the same time in the intelligence-defined optical tunnel network system 100. However, intelligence-defined optical tunnel network system 100 in the present disclosure is not limited to DWDM technology. The intelligence-defined optical tunnel network system 100 may also be implemented with other wavelength division multiplexing (WDM) or other equivalent multiplexed optical transmission technology. In this way, the intelligence-defined optical tunnel network system 100 can achieve low latency, high bandwidth, low power consumption, and has better performance than the electrically-switching network system used in the existing data center.

For ease of description, the following paragraphs are the description with the relevant diagrams for the OADSs 200a-200e of the first tier network T1 and the design of its network structure, the OSISs 400a-400e of the second tier network T2 and the design of its network structure, the design of interconnect structure between the first tier network T1 and the second tier network T2, the design of protection path of the first tier network T1 and the design of protection path of the second tier network T2.

Figure 2:
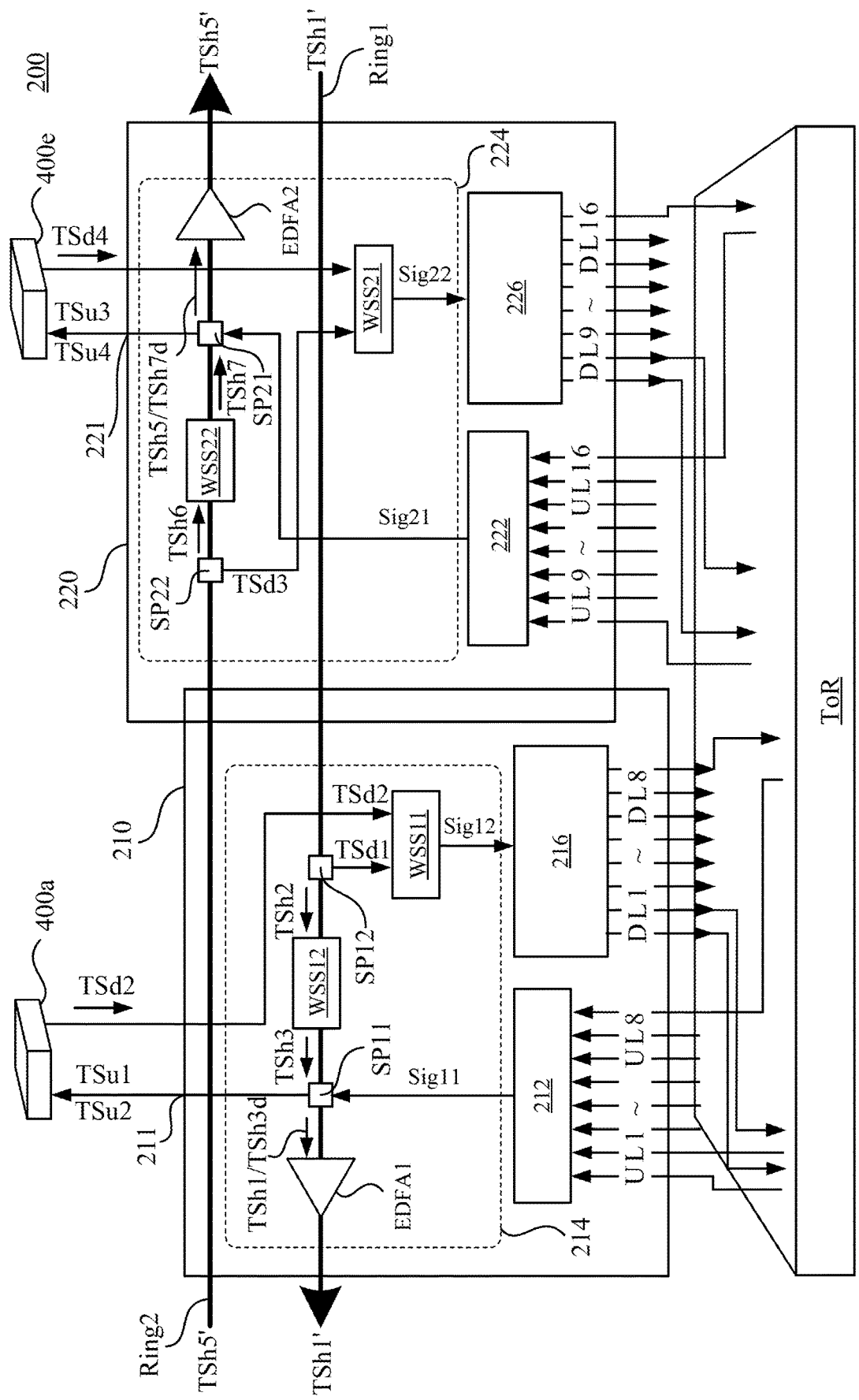
FIG. 2 is a schematic diagram of an optical add-drop sub-system (OADS) in accordance with some embodiments of the present disclosure.

Please refer to FIG. 2. FIG. 2 is a schematic diagram of the OADS 200 in accordance with some embodiments of the present disclosure. The OADS 200 is a core switch node for building optical tunnels between the racks of the first tier network T1 for data transmission. As shown in FIG. 2, the OADS 200 includes two or more independent transmission modules, such as a first transmission module 210 and a second transmission module 220. The first transmission module 210 and the second transmission module 220 use different wavelength band sequentially. In some embodiments, the wavelength bands used by the first transmission module 210 and the second transmission module 220 are adjacent to each other. Specifically, the wavelength band is a plurality of specific wavelength combinations arranged ascendingly by their frequency (i.e., frequency equals to the speed of light divided by wavelength).

As shown in FIG. 2, the first and second transmission modules 210 and 220, respectively, include multiplexers 212 and 222 as input sub-modules. In addition, the first and second transmission modules 210 and 220, respectively, include switching sub-modules 214 and 224 and demultiplexers 216 and 226 as output sub-modules. Specifically, the switching sub-module 214 in the first transmission module 210 includes a first splitter SP11, a second splitter SP12, an optical signal amplifier EFDA1, a first wavelength selective switch WSS11, and a second wavelength selective switch WSS12. Similarly, the switching sub-module 224 of the second transmission module 220 also includes a third splitter SP21, a fourth splitter SP22, an optical signal amplifier EFDA2, a third wavelength selective switch WSS21, and a fourth wavelength selective switch WSS22. The multiplexer 222 (the function and operation of which can be referred to the multiplexer 212 of the first transmission module 210 in the following embodiment), connected to the corresponding one of the ToRs, is configured to receive, through a plurality of add-ports, a plurality of second upstream optical signals (UL9-UL16) from the ToR switch, and combine the second upstream optical signals (UL9-UL16) into a second composite optical signal Sig21. The third splitter SP21 (the function and operation of which can be referred to the first splitter SP11 of the switching sub-module 214 in the following embodiment), deposited on the second transmission ring Ring2, is configured to receive and duplicate the second composite optical signal Sig21 as a fifth lateral transmission optical signal TSh5 and a third uplink transmission optical signal TSu3, transmit the fifth lateral transmission optical signal TSh5 through the second transmission ring Ring2 to the second transmission module 220 of another OADS in the same pod and transmit the third uplink transmission optical signal TSu3 through a second longitudinal port 221. The optical signal amplifier EFDA2 (the function and operation of which can be referred to the optical signal amplifier EFDA1 of the switching sub-module 214 in the following embodiment), deposited on the second transmission ring Ring2 and connected to the third splitter SP21, is configured to amplify the fifth lateral transmission optical signal TSh5 and output the amplified fifth lateral transmission optical signal TSh5' to the second transmission module 220 of another OADS in the same pod. The fourth splitter SP22 (the function and operation of which can be referred to the second splitter SP12 of the switching sub-module 214 in the following embodiment), deposited on the second transmission ring Ring2, is configured to receive and duplicate the fifth lateral transmission optical signal TSh5', received from the second transmission module 220 of another OADS in the same pod, as a third downlink transmission optical signal TSd3 and a sixth lateral transmission optical signal TSh6, and transmit the sixth lateral transmission optical signal TSh6 through the second transmission ring Ring2. The third wavelength selective switch WSS21 (the function and operation of which can be referred to the first wavelength selective WSS11 of the switching sub-module 214 in the following embodiment), coupled to the second transmission ring Ring2, is configured to receive the third downlink transmission optical signal TSd3 from the fourth splitter SP22 or receive a fourth downlink transmission optical signal TSd4 from the OSIS 400e, and selectively output the third downlink transmission optical signal TSd3 or the fourth downlink transmission optical signal TSd4. The fourth wavelength selective switch WSS22 (the function and operation of which can be referred to the second wavelength selective WSS12 of the switching sub-module 214 in the following embodiment), disposed on the second transmission ring Ring2, is configured to receive the sixth lateral transmission optical signal TSh6 and output a seventh lateral transmission optical signal TSh7 to the third splitter SP21. The third splitter SP21 is further configured to receive and duplicate the seventh lateral transmission optical signal TSh7 as an eighth lateral transmission optical signal TSh7d and a fourth uplink transmission optical signal TSu4, transmit through the second transmission ring Ring2 the eighth lateral transmission optical signal TSh7d, and transmit, through the second longitudinal port 221, the fourth uplink transmission optical signal TSu4 to the OSIS 400e. When the optical path from the OADS 200a to the OADS 200b on the first transmission ring Ring1 is cut off, the software-defined network controller 500 sets up correspondingly the ToR switch, the third wavelength selective switch WSS21 and the fourth wavelength selective switch WSS22 of the second transmission module 220 in order to build the optical tunnel from the OADS 200a to the OADS 200b on the second transmission ring Ring2.

The multiplexer 212 is as an input sub-module of the first transmission module 210. Similarly, the multiplexer 222 is as an input sub-module of the second transmission module 220. In structure, the multiplexer 212, 222 are connected to the one (i.e., ToR switch), corresponding to the OADS 200, of the ToR switches. The multiplexer 212, 222 having a plurality of add-ports, are configured to receive a plurality of first upstream optical signals UL1-UL8, a plurality of second upstream optical signals UL9-UL16, and combine the first upstream optical signals UL1-UL8 and the second upstream optical signals UL9-UL16 into a first composite optical signal Sigh 1 and a second composite optical signal Sig21.

Specifically, each add-port of the multiplexers 212 and 222 is coupled with optical fiber to a transmitter of the various DWDM transceivers on an input-output port of ToR switch in the rack, in which the DWDM transceiver is corresponding to the wavelength band of the add-port. In some embodiments, each add-port of the multiplexer 212 and 222 are configured to receive signals with a fixed wavelength. One add-port on the multiplexer 212 or 222 receives a signal with one specific wavelength.

As shown in FIG. 2, the first upstream optical signals UL1-UL8 have a plurality of wavelengths A1-A8 in the first frequency band respectively. Similarly, the second upstream optical signals UL9-UL16 have a plurality of wavelengths A9-A16 in the second frequency band respectively. In this way, the multiplexers 212 and 222 can receive, from the ToR switch, the optical signals of the wavelength band (i.e., wavelength A1-A8 and A9-A16) configured in the first transmission module 210 and the second transmission module 220, and combine the different optical wavelength signals into one optical fiber in order to be transmitted as the first composite optical signal Sig11 and the second composite optical signal Sig21.

The switching sub-module 214 of the first transmission module 210 includes the first splitter SP11, the optical signal amplifier EDFA1, the second splitter SP12, the first wavelength selective switch WSS11, and the second wavelength selective switch WSS12. Similarly, the second transmission module 220 of the switching sub-module 224 also includes the third splitter SP21, the optical signal amplifier EDFA2, the fourth splitter SP22, the third wavelength selective switch WSS21, and the fourth wavelength selective switch WSS22.

The main function of the switching sub-modules 214 and 224 is to successively upload the first composite optical signal Sig11 and the second composite optical signal Sig21 transmitted from the input sub-module (i.e., the multiplexers 212 and 222) to the OSIS 400a and 400e in the second tier network T2 or transmit, to East or West, to the other OADS 200 in same pod, and switch the optical signals transmitted from the other OADS 200 in same pod to the input sub-module (i.e., the demultiplexers 216 and 226). For example, the OADSs in the pod P2 in FIG. 1 can transmit/receive the optical signals to/from the other four OADSs in the same pod P2. In the same principle, the OADSs in each pod in FIG. 1 can transmit/receive the optical signals to/from the other four OADSs in the same pod.

For ease of explanation, in the following paragraphs, the first transmission module 210 will be taken as an example to describe the operation of each component. The components in the second transmission module 220 and the operation of the second transmission module 220 are similar to the first transmission module 210, and thus are not described herein.

As shown in FIG. 2, in structure, the first splitter SP11, disposed on the first transmission ring Ring1, is configured to receive and duplicate the composite optical signal SP11 as a first lateral transmission optical signal TSh1 and a first uplink transmission optical signal TSu1, transmit through the first transmission ring Ring1 the first lateral transmission optical signal TSh1, and transmit, through the first longitudinal port 211, the first uplink transmission optical signal TSu1 to the OSIS 400a.

In some embodiments, the optical signal amplifier EDFA1 can be implemented with erbium-doped fiber amplifier (EDFA). The optical signal amplifier EDFA1, disposed on the first transmission ring Ring1 and coupled to the first splitter SP11, is configured to amplify the first lateral transmission optical signal TSh1 and output the amplified first lateral transmission optical signal TSh1' to the first transmission module 210 of other OADSs in the same pod. Therefore, in the embodiment shown in FIG. 2, the optical signal amplifier EDFA1 can amplify the power of the optical signal transmitted to the West to ensure that it has sufficient power to be transmitted to the destination, but the present disclosure is not limited in the direction of transmission to the West. In actual applications, the transmission direction can be adjusted according to the network configuration.

As shown in FIG. 2, in structure, the second splitter SP12 disposed on the first transmit ring Ring1, is configured to receive and duplicate a first lateral transmission optical signal TSh1', received from the first transmission module 210 of other OADSs 200 in the same optical node pod, as a first downlink transmission optical signal TSd1 and a second lateral transmission optical signal TSh2, and transmit the second lateral transmission optical signal TSh2 through the first transmission ring Ring1.

The first wavelength selective switch WSS11, coupled to the first transmission ring Ring1, configured to receive the first downlink transmission optical signal TSd1 from the second splitter SP12 or receive a second downlink transmission optical signal TSd2 from the OSIS 400a, and selectively output the first downlink transmission optical signal TSd1 or the second downlink transmission optical signal TSd2 as the composite optical signal Sig12 to the demultiplexer 216.

Specifically, the first wavelength selective switch WSS11 is a 2×1 (2 input and 1 output) wavelength selective switch, being configured to select specific wavelength signal to pass in order to output the corresponding optical signal to the demultiplexer 216. In some embodiments, the 2×1 wavelength selective switch can be implemented by including two 1×1 wavelength selective switches and one 2×1 combiner, integrating, through the combiner, two optical signals selected by two 1×1 wavelength selective switches and outputting the combined composite optical signal Sig12 to the demultiplexer 216 of the receiving sub-module.

The second wavelength selective switch WSS12, disposed on the first transmission ring Ring1, configured to receive the second lateral transmission optical signal TSh2 and output a third lateral transmission optical signal TSh3 to the first splitter SP1. The first splitter SP1 is further configured to receive and duplicate the third lateral transmission optical signal TSh3 as a fourth lateral transmission optical signal TSh3d and a second uplink transmission optical signal TSu2. The fourth lateral transmission optical signal TSh3d is transmitted through the first transmission ring Ring1 by the first splitter SP11 and the second uplink transmission optical signal TSu2 is transmitted through the first longitudinal port 211 by the first splitter SP11 to the OSIS 400a.

In other words, the first splitter SP11 is a 2×2 (2 input 2 output) splitter, and includes two input ports and two output ports, one of which is configured to receive the first composite optical signal Sig11. The first splitter SP11 is configured to duplicate the received first composite optical signal Sig11 to the two output ports. The other input port is configured to receive the third lateral transmitted optical signal TSh3. The first splitter SP11 is configured to duplicate the third lateral transmission optical signal TSh3 to the two output ports. One output port of the first splitter SP11 is configured to output the first lateral transmission optical signal TSh1 or the fourth lateral transmission optical signal TSh3d, and the other output port is configured to output the first uplink transmission optical signal TSu1 or the second uplink transmission optical signal TSu2. The second splitter SP12 is 1×2 (1 input and 2 output) splitter and duplicates and splits the first lateral transmission optical signal TSh1', received from the first transmission module 210 of other OADSs in the same optical node pod, into two beams. In the embodiment shown in FIG. 2, in which one as the second lateral optical transmission optical signal TSh2 is transmitted continually to the West to other OADSs in the same pod P1 and the other as the first downlink transmission optical signal TSd1 is transmitted downwardly to the optical receiving module (i.e., the demultiplexer 216). However, the present disclosure is not limited in the direction of transmission to the West. In actual applications, the transmission direction can be adjusted according to the network configuration.

The second lateral transmission optical signal TSh2 passes through the 1×1 second wavelength selection switch WSS12, and the second wavelength selection switch WSS12 selects the specific optical wavelength signal of the second lateral transmission optical signal TSh2 as the third lateral transmission optical signal TSh3. Then, through the first splitter SP11 duplicating and splitting, in the embodiment shown in FIG. 2, one optical signal as the fourth lateral transmission optical signal TSh3d is transmitted continually to the West to the other OADSs in the same optical node pod, and the other optical signal as the second uplink transmission optical signal TSu2 is output to the corresponding OSIS 400a. However, the present disclosure is not limited in the direction of transmission to the West. In actual applications, the transmission direction can be adjusted according to the network configuration.

Figure 3A:
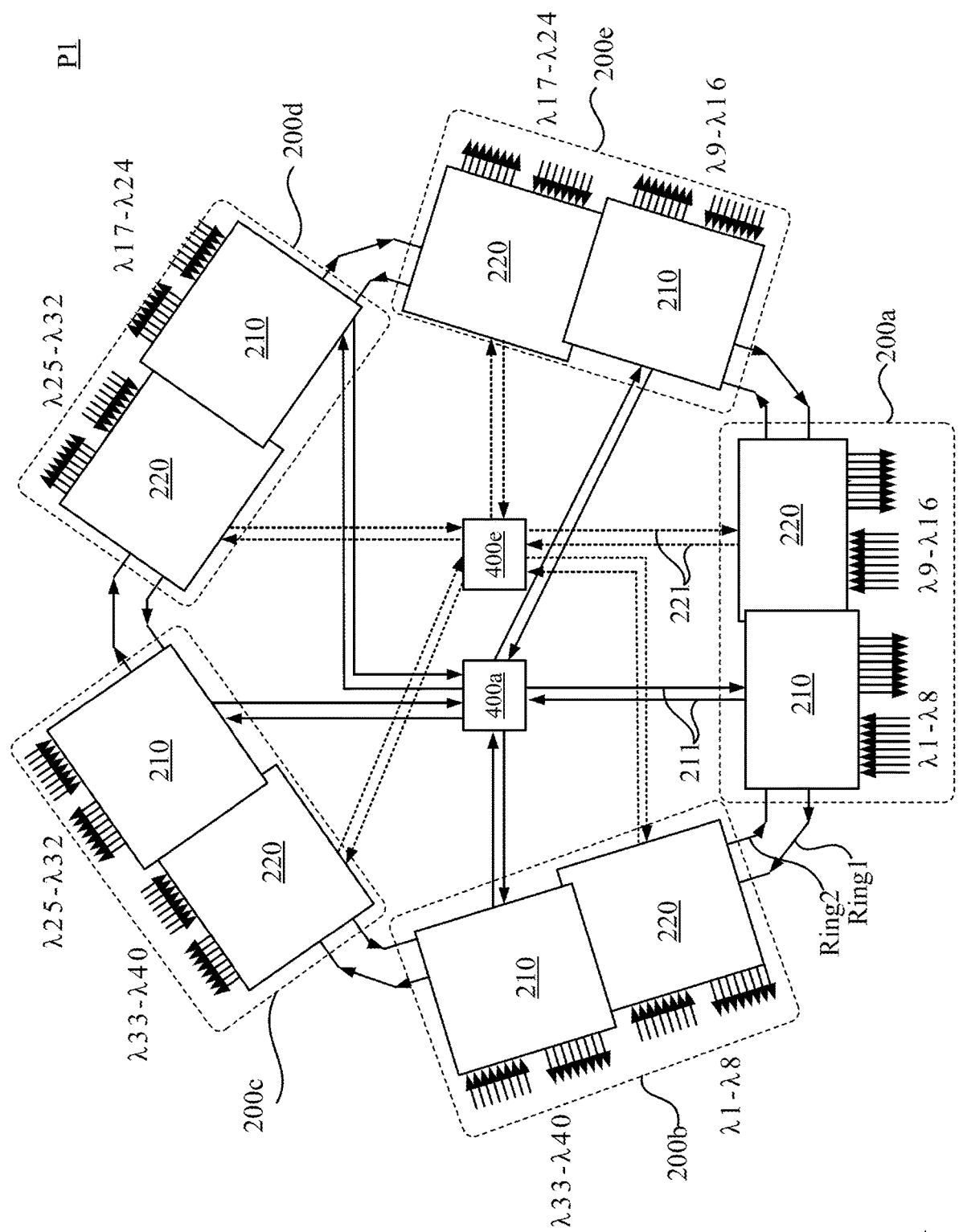
FIG. 3A is a connection relationship diagram of the transmission module of each OADS between the transmission module in the same pod in accordance with some embodiments of the present disclosure.

Please refer to the FIG. 3A together. FIG. 3A is a connection relationship diagram of the first transmission module 210 and the second transmission module 220 of each OADSs 200a-200e in the same pod in accordance with some embodiments of the present disclosure.

It should be noted that, as shown in FIG. 3A, in some embodiments, the first transmission module 210 and the second transmission module 220 of each of the OADSs 200a-200e transmit, through the first transmission ring Ring1 and the second transmission ring Ring2 respectively, the lateral transmission optical signals TSh1-TSh3 and TSh3d. The optical transmission directions in the first transmission ring Ring1 and the second transmission ring Ring2 are opposite to each other. For example, each of the first transmission modules 210 transmits signals in a Westward direction (i.e., a clockwise direction) with the first transmission ring Ring1, and each of the second transmission modules 220 transmits signals eastward (i.e., counter-clockwise direction) with the second transmission ring Ring2. But the disclosure is not limited thereto. In other embodiments, the first transmission ring Ring1 and the second transmission ring Ring2 can also transmit the lateral transmission optical signals TSh1-TSh3 and TSh3d in the same optical transmission direction.

In addition, as shown in FIG. 3A, the first transmission module 210 of the OADSs 200a-200e are coupled to the OSIS 400a through a plurality of corresponding first longitudinal ports (shown by solid arrows in the figure) respectively. The second transmission module 220 of the OADSs 200a-200e are coupled to, through a plurality of corresponding second longitudinal ports (shown by dashed arrows in the figure), the OSIS 400e which is adjacent to the OSIS 400a.

Please refer back to FIG. 2 again. As shown in FIG. 2, the demultiplexer 216 and 226 are as output sub-modules of the OADS 200. Structurally, the demultiplexer 216 and 226 are coupled to, respectively, the first wavelength selective switch WSS11 and WSS21, connected to the corresponding one of the ToR switches, are configured to receive and demultiplex the first downlink transmission optical signal TSd1 or the second downlink transmission optical signal TSd2 as a plurality of downstream optical signals DL1-DL8 and DL9-DL16 and transmit the downstream optical signals DL1-DL8 and DL9-DL16 to the ToR switch.

Specifically, the demultiplexer 216 and 226 including cyclic DEMUX individually, are configured to receive the composite optical signal Sig12 and Sig 22, which include each wavelength, from the wavelength selective switch WSS11 and WSS21, and selectively filter the optical signals with a specific wavelength to pass to enter a corresponding drop-port. For example, it is assumed that the intelligence-defined optical tunnel system totally uses 40 kinds of wavelength (which are arranged in ascending frequency $\lambda 1$-$\lambda 40$), and each wavelength band includes eight wavelengths, each individual first transmission module 210 and second transmission module 220 including eight drop-ports. Therefore, The cyclic DEMUX having eight channels may arrange the coming at most 40 wavelengths in order according to the period, and select the wavelength signal, by the wavelength selective switch WSS11 and WSS21, to enter into the demultiplexer 216 and 226. The eight wavelengths selected by the wavelength selective switch WSS11 and WSS21 enter into, individually, the corresponding eight drop-ports of the demultiplexer 216 of the first transmission module 210, in which only one corresponding wavelength signal been selected enters each drop-port at the same time. For instance, in one embodiment, the wavelength configuration of the cyclic demultiplexer is shown in table 1 below:

TABLE 1

(Wavelength Configuration of the Cyclic Demultiplexer)

| Drop-port | received wavelength | | | | |
|---|---|---|---|---|---|
| 1 | $\lambda 1$ | $\lambda 9$ | $\lambda 17$ | $\lambda 25$ | $\lambda 33$ |
| 2 | $\lambda 2$ | $\lambda 10$ | $\lambda 18$ | $\lambda 26$ | $\lambda 34$ |
| 3 | $\lambda 3$ | $\lambda 11$ | $\lambda 19$ | $\lambda 27$ | $\lambda 35$ |
| 4 | $\lambda 4$ | $\lambda 12$ | $\lambda 20$ | $\lambda 28$ | $\lambda 36$ |
| 5 | $\lambda 5$ | $\lambda 13$ | $\lambda 21$ | $\lambda 29$ | $\lambda 37$ |
| 6 | $\lambda 6$ | $\lambda 14$ | $\lambda 22$ | $\lambda 30$ | $\lambda 38$ |
| 7 | $\lambda 7$ | $\lambda 15$ | $\lambda 23$ | $\lambda 31$ | $\lambda 39$ |
| 8 | $\lambda 8$ | $\lambda 16$ | $\lambda 24$ | $\lambda 32$ | $\lambda 40$ |

As shown in Table 1 in the present embodiment, the first wavelength of each wavelength band ($\lambda 1$, $\lambda 9$, $\lambda 17$, $\lambda 25$, $\lambda 33$) enters into the first drop-port, the second wavelength ($\lambda 2$, $\lambda 10$, $\lambda 18$, $\lambda 26$, $\lambda 34$) enters into the second drop-port, and so on. Each drop-port is connected to the optical fiber to a receiver of the DWDM transceivers on an input-output port of ToR switch in the rack, in which the DWDM transceiver is corresponding to the module wavelength band of the drop-port. For example, the first drop-port may be connected to the receiver of the DWDM transceiver with the first wavelength λ1 in the frequency band of the input-output port of ToR switch in the rack. In this way, each drop-port of the demultiplexer 216 and 226 can receive a plurality of optical signals with wavelength cyclic number.

Figure 3B:
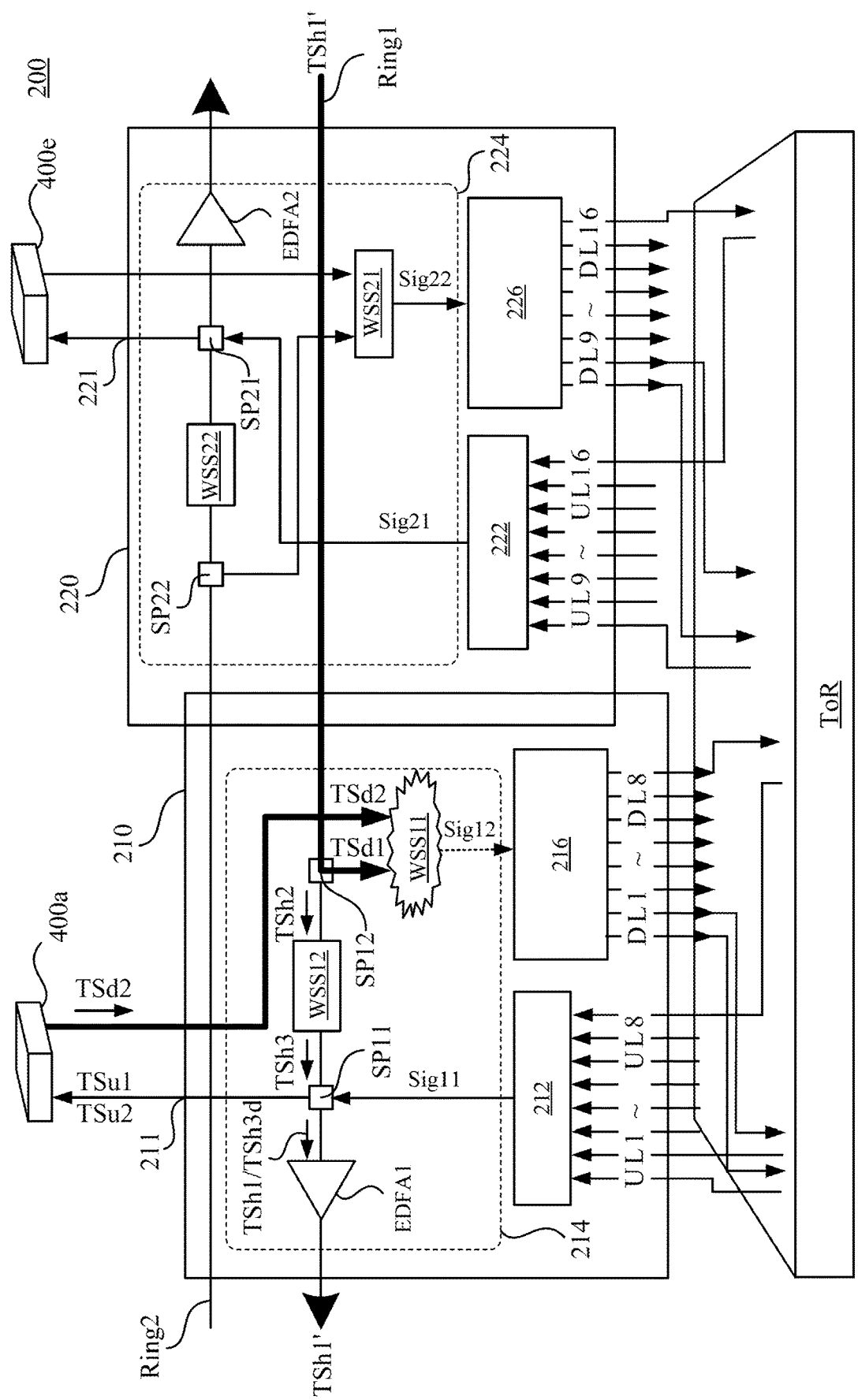
FIG. 3B and FIG. 3C are schematic diagrams of the conflict caused by a combiner and the conflict caused by a demultiplexer respectively.
Figure 3C:
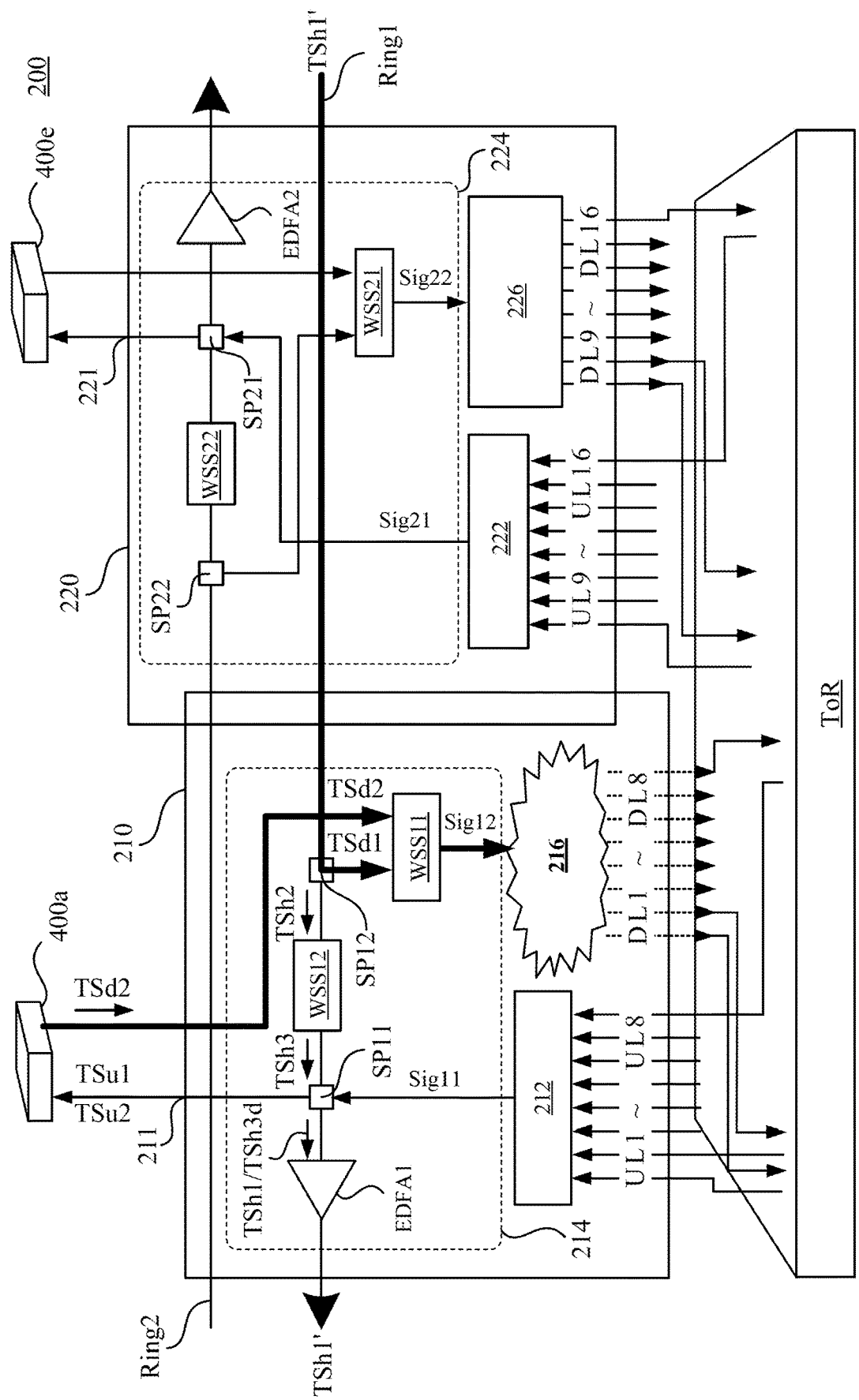

It should be noticed that, if the optical signals with the same wavelength are transmitted through the same optical fiber of the first transmission module 210 and the second transmission module 220 at the same time, the interference of signals may raise to cause conflict. Please refer to FIG. 3B and FIG. 3C together. FIG. 3B and FIG. 3C are schematic diagrams of the conflict caused by a combiner and the conflict caused by a demultiplexer respectively. As shown in FIG. 3B, when the first wavelength selective switch WSS11 receives the first downlink transmission optical signal TSd1 from the second splitter SP12, and receives the optical signals, including the same wavelength (i.e., λ1), in the second downlink transmitted optical signal TSd2 from the OSIS 400a, and if the two 1×1 wavelength selective switches in the 2×1 first wavelength selective switch WSS11 select λ1 to pass, the two optical signals with the wavelength λ1 may be combined simultaneously to one optical fiber through the 2×1 combiner and output to the demultiplexer 216 to cause conflict.

As shown in FIG. 3C, the second type of conflict is a conflict caused by the demultiplexer 216. Due to the design of the cyclic demultiplexer, each drop-port may receive five kinds of wavelength arranged according to the order of the wavelength cycle (shown in the preceding table 1). It is assumed that the first wavelength selective switch WSS11 receives the first downlink transmission optical signal TSd1 from the second splitter SP12, and the second downlink transmission optical signal TSd2 the OSIS 400a, and selects, respectively, the optical signal with wavelength λ1 in the first downlink transmission optical signal TSd1 and the optical signal with wavelength λ9 in the second downlink transmission optical signal TSd2 to pass. Even though the two beams with different wavelengths can be combined into one optical fiber as the composite optical signal Sig12 successfully and transmitted to the demultiplexer 216, after passing through the demultiplexer 216, the optical signal with wavelength λ1 and with wavelength λ9 may be introduced into the same drop-port (i.e., the first drop-port). Finally, the optical signal wavelength with λ1 and with wavelength λ9 may arrive at the same receiver of the DWDM transceiver. Because the receiver of the same DWDM transceiver can only receive one wavelength signal at the same time, otherwise the interference may occur. A conflict will occur at this point. Thus, in some embodiments, due to the design of the receiving of the demultiplexer 216, even two optical tunnels using different wavelengths λ1, λ9 may cause conflicts. Therefore, performing the tunnel scheduling control of the optical tunnel network through the software-defined network controller (SDN Controller) 500 is needed to prevent conflict conditions occur and optimize the utilization rate of the optical tunnel network.

The description above is for the internal modules and operations of the OADS 200. Then, the following paragraphs are the description for the design of the network structure of the interconnection of the OADSs 200a-200e to form the pod P1. Please refer to FIG. 3A again. As shown in FIG. 3A, the OADSs 200a-200e form a pod P1 with optical fiber connection in series. As described above, an amount of the OADSs 200a-200e being connected in series in one pod depends on the amount of wavelengths configured in each independent first transmission module 210 and a second transmission module 220 and the total amount of wavelength types supported by the intelligence-defined optical tunnel network system 100. The first transmission module 210 and the second transmission module 220 of each OADSs 200a-200e may be connected in series to the corresponding first transmission module 210 and the second transmission module 220 of adjacent OADS 200a-200e, forming a ring-shaped network. Therefore, a pod will include a plurality of independent ring networks.

The frequency band wavelength used by each transmission module (i.e., the first transmission module 210) belonging to the same transmission ring (i.e., the first transmission ring Ring1) cannot be repeated to each other and be arranged in counterclockwise ascendingly according to the wavelength frequency. In addition, because the transmission rings are independent of each other, the same wavelength can be reused on different rings. Alternately, in some embodiments, the types and amounts of wavelengths used on the first transmission ring Ring1 and the second transmission ring Ring2 are the same.

Taking structure of the pod P1 in FIG. 3A as an example, two optical fibers are used to connect in series the corresponding first transmission module 210 and the second transmission module 220 in the OADSs 200a-200e respectively. Among them the first transmission ring Ring1 transmits the optical signal to the West (i.e., a clockwise direction), and the second transmission ring Ring2 transmits the optical signal to the East (i.e., counterclockwise direction). The first transmission module 210 of the first OADS 200a in the first transmission ring Ring1 uses the frequency band including wavelength λ1-λ8. The first transmission module 210 of the next OADS 200e in the East uses the frequency band including wavelength λ9-λ16. The first transmission module 210 of the one after next OADS 200e in the East uses the frequency band including wavelength λ17-λ24, and so on.

It should be noticed particularly, the wavelength frequency band used by each second transmission module 220 in the second transmission ring Ring2 may be shifted and adjacent to the one used by the first transmission module 210. For example, the second transmission module 220 of the first OADS 200a uses wavelength λ9-λ16 (shifted and adjacent to the wavelength λ1-λ8 used by the first transmission module 210 of the OADS 200a). The second transmission module 220 of the next OADS 200e in the East uses wavelength λ17-λ24 (shifted and adjacent to the wavelength λ9-λ16 used by the first transmission module 210 of the OADS 200e). The second transmission module 220 of the one after the next OADS 200d in the East uses wavelength λ25-A32, and so on. In other words, In the same pod P1, the first frequency band configured in the first transmission module 210 in the OADS 200a and the second frequency band configured in the second transmission module 220 in the OADS 200b include same wavelength combination.

Such a configuration allows each of the OADSs 200a-200e to support 16 wavelength bandwidths. The maximum amount of OADS 200 that can be connected in series in a pod P1 depends on the type of wavelength used by the system. Taking the structure in FIG. 1 as an example, assuming the intelligence-defined optical tunnel network system 100 supports a total of 40 kinds of wavelengths, then five independent series modules with different wavelength bands can be connected in series on an independent ring. It is equivalent to connecting five OADSs 200a-200e (as shown in FIG. 3A) in series in one pod P1.

In addition, the types and amounts of transmission wavelengths used in each of the transmission rings Ring1 and Ring2 are the same, so forty wavelengths (λ1-λ40) are used in the first transmission ring Ring1, and the second transmission ring Ring2 is also used λ1-λ40. In this ring-shape design structure, a OADSs 200a-200e can transmit the optical signals to East or West and receive the optical signals from the other OADS in the same pod P1.

In addition, the pod ring network structure includes two design features, which are the incremental structure design and feature of wavelength reuse. The specific content will be described in detail in the following paragraphs.

The spirit of the incremental structure design is manifested in two deployment modes. The first one is to gradually increase and concatenate the nodes of the required OADSs 200a-200e in a pod according to the required amount of racks. The second is to gradually increase the amount of independent transmission rings Ring1 and Ring2 in a pod P1.

For example, since the OADS utilizes a modular design, and each pod of the first tier network T1 utilizes a ring-shaped design structure, it is possible to connect different amounts of OADSs 200a-200e in one pod flexibly. In other words, as the demand increases, the required OADSs 200a-200e can be gradually added and concatenated in a pod according to the required amount of racks. For example, when the amount of required racks is small (i.e., three racks), there can be only three OADSs 200a-200c connected in a ring-shape series in pod P1. When the amount of required racks increases (i.e., five racks), the pod P1 can be expanded to include five OADSs 200a-200e in a ring-shaped series.

In addition, the amount of independent transmission rings Ring1 and Ring2 can be added in the same pod. For example, when the amount of servers in the rack increases or the bandwidth is upgraded, the network traffic load generated on behalf of the entire rack also rises relatively. There are two ways to solve this situation. The first method is that when the amount of wavelengths used by the OADSs 200a-200e is the same, based on a characteristic of data rate transparency of the intelligence-defined optical tunnel network system, the DWDM transceiver with higher speed data rate can be used instead to support the network traffic load generated on behalf of the increasing amount of the servers or the upgrade of the bandwidth. For example, the transmission speed of each wavelength may upgrade to from 10 Gbit/s to 100 Gbit/s to increase the flexibility of application of the system transmission rate and save the mass cost for upgrading hardware devices.

The second method is that when the transmission speed of wavelength is the same, the amount of transmission modules in the OADS 200 can be gradually increased to increase the amount of wavelengths that can be selectively used by the racks. Since the transmission modules are independent of each other, it is equivalent to gradually increasing the amount of transmission rings in one pod to support the network traffic load generated by the increase in the amount of servers in the rack or the bandwidth upgrade. An amount of independent transmission ring can be formed in one pod depends on the amount of wavelengths used by independent transmission modules and the type of wavelength used by the system. For example, when the intelligence-defined optical tunnel network system 100 uses 40 kinds of wavelength, one OADS 200 can include at most five independent modules with a different frequency band, using bands of λ1-λ8, λ9-λ16, λ17-λ24, λ25-λ32, and λ33-λ40 respectively. Correspondingly, one pod can form at most five transmission rings.

In other words, in some embodiments, any one of the OADS 200 may include N pieces of the transmission modules independent of each other; so that the OADSs in the same pod can be connected to each other through a respective N transmission rings. N transmission modules of one OADS 200 are coupled to two adjacent OSISs in the second tier network T2 through the corresponding optical paths. One of the N transmission modules of one OADS 200 may be coupled to, through the corresponding optical paths, the corresponding transmission modules of adjacent OADSs in the same optical node pod in the first tier network T1, in which the number N is a positive integer greater than or equal to two.

In summary, the two methods of the pod incremental structure design in the first tier network T1, by connecting in series the corresponding independent transmission modules in the nodes of the required OADS 200 with optical fiber to form a ring-shaped network structure, thus reduce the wiring complexity of system structure upgrade.

Further, as described in the previous paragraph, the same wavelength can be reused in the first tier network T1. This is the wavelength reusability feature in the first tier network T1. Specifically, wavelength reusability features are represented in two aspects of the network structure. First, a plurality of independent transmission ring Ring1 and Ring2 of each Pod may use the same wavelength combination repeatedly. Second, the intra-Pod optical signals of different pods can reuse the same wavelength combination repeatedly.

Every transmission ring in the same pod can use the optical signals with the same wavelength (i.e., λ1) repeatedly to perform transmission. In different pods, optical signals with the same wavelength (i.e., λ1) can be reused without conflict.

Through the design of the above network structure, a large number of inter-rack data transmission can be supported by using only a few wavelength types. Meanwhile, the restriction on that each type of wavelength in the optical fiber of the intelligence-defined optical tunnel network system 100 can be configured to transmit a corresponding optical signal to pass, and the upper limit (i.e., 40 kinds of wavelength) of the type of wavelength which can be used in whole network system can be conquered.

Figure 3D:
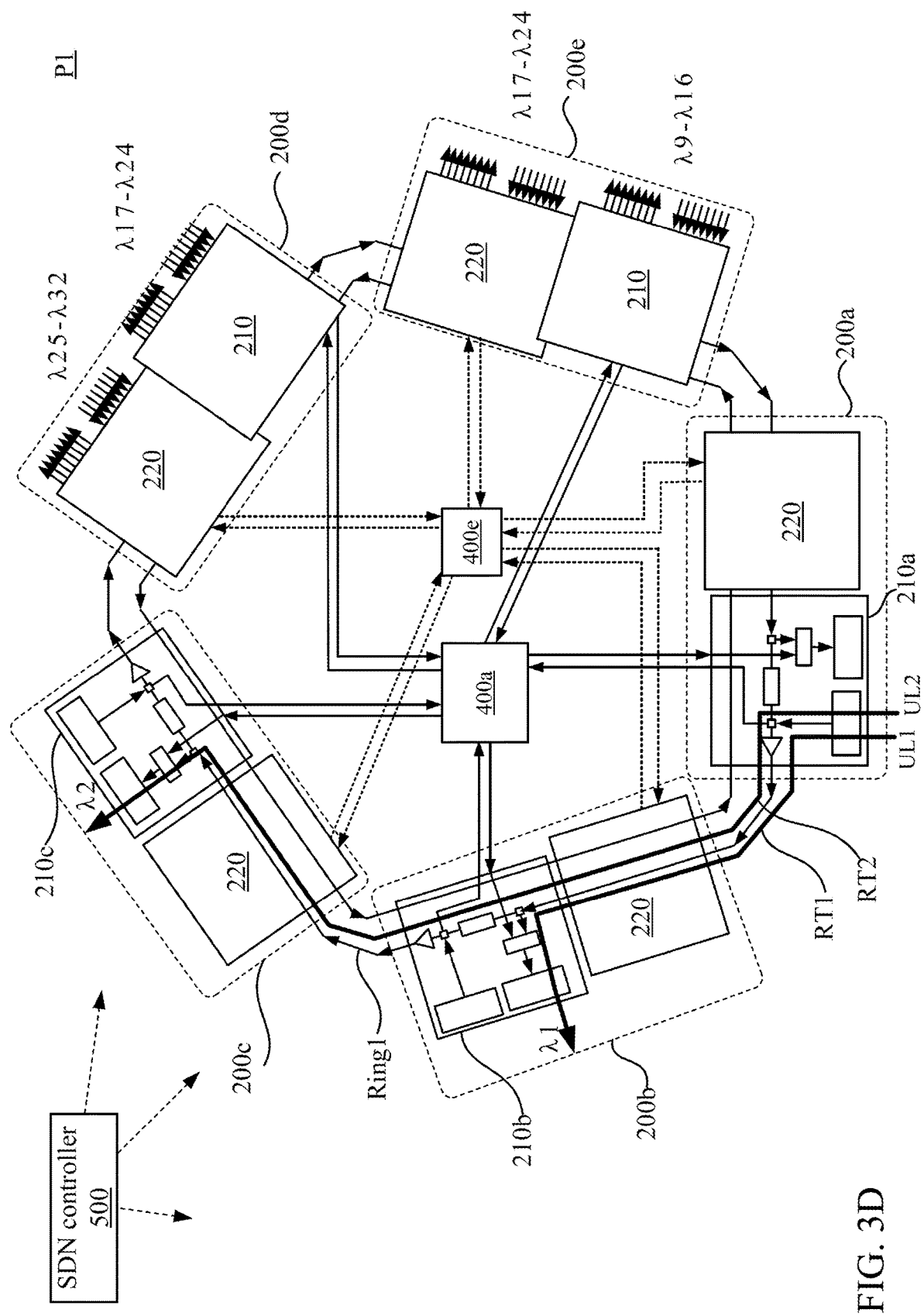
FIG. 3D is a schematic diagram of intra-Pods and the orientation of the optical signal in the pod in accordance with some embodiments of the present disclosure.

Please refer to FIG. 3D. FIG. 3D is a schematic diagram of intra-Pods and the orientation of the optical signal in the pod in accordance with some embodiments of the present disclosure. In the following paragraph, the required setting of the wavelength selective switch in the OADSs 200a-200e for building intra-Pod optical tunnels and the orientation of the optical signals will be described according to FIG. 3D.

As shown in FIG. 3D and FIG. 2, the unit corresponding to the OADS 200a would like to use the first transmission module 210 to transmit data to the unit corresponding to the OADS 200b in same pod P1 and the unit corresponding to the OADS 200c. In order to transmit two portions of information respectively, the software-defined network controller 500 can be configured to build two intra-Pod optical tunnels. One uses the route RT1 from the OADS 200a to the OADS 200b and selects to use wavelength λ1. The other uses the route RT2 from the OADS 200a to the OADS 200c and selects to use wavelength λ2. For building the optical tunnels, the wavelength selective switches on the route which should be set to select a specific wavelength to pass. Thus, the route RT1 only has to set the 2×1 first wavelength selective switch (as the first wavelength selective switch WSS11 shown in FIG. 2) in the first transmission module 210 of the OADS 200*b* at the destination and the optical tunnels can be built. The route RT2 has to set the 1×1 second wavelength selective switch (as the second wavelength selective switch WSS12 shown in FIG. 2) at West-East orientation in the first transmission module 210 of the OADS 200*b* and the 2×1 first wavelength selective switch (as the first wavelength selective switch WSS11 shown in FIG. 2) in the first transmission module 210 of the OADS 200*c* at the destination.

In the process of optical signal transmission, first, the optical signals with the wavelength λ1 and the wavelength λ2 are transmitted to, through the corresponding DWDM transceiver on the input-output port of the ToR switches of the corresponding racks, the corresponding add-port of the first transmission module 210*a* of the OADS 200*a*, combined to an optical fiber by the multiplexer 212, and are duplicated, split and transmitted to the West through the 2×2 first splitter SP11. At this time, the optical signals will be transmitted, the optical power being amplified by the optical signal amplifier EDFA1, through the first transmission ring Ring1 to the first transmission module 210*b* of the OADS 200*b*. After the optical signals are transmitted to the first transmission module 210*b*, the optical signal with wavelength λ1 and the wavelength λ2 will be duplicated and split into two optical signals by the second splitter SP12. One optical signal is transmitted downwardly. The other optical signal is transmitted to the West to the OADS 200*c*. Among them, the optical signal transmitted downwardly will pass through the 2×1 first wavelength selective switch WSS11 which selects the optical signal with wavelength λ1 to pass and transmits to the demultiplexer 216, and finally be transmitted to, through the first drop-port of the demultiplexer 216, the receiver of the corresponding DWDM transceiver on the input-output port of the ToR switch of the corresponding rack. The optical transmission from rack to rack is completed.

On the other hand, the optical signal transmitted to the West will pass through the 1×1 second wavelength selective switch WSS12 which selects the optical signal with wavelength λ2 to pass, and is duplicated, split and transmitted to the West through the 2×2 first splitter SP11. At this time, the optical signals will be transmitted, the optical power being amplified by the optical signal amplifier EDFA1, through the first transmission ring Ring1 to the first transmission module 210*c* of the OADS 200*c*. After the optical signals are transmitted to the first transmission module 210*c*, the optical signal with wavelength λ2 will be duplicated and split into two optical signals by the 1×2 second splitter SP12. One optical signal is transmitted downwardly. The other optical signal is transmitted to the West. The optical signal transmitted downwardly will pass through the 2×1 first wavelength selective switch WSS11 which selects the optical signal with wavelength λ2 to pass and transmits to the demultiplexer 216, and be transmitted to, through the second drop-port of the demultiplexer 216, the receiver of the corresponding DWDM transceiver on the input-output port of the ToR switch of the corresponding rack. The optical transmission from rack to rack is completed.

In addition, the software-defined network controller 500 can be configured to set a 1×1 second wavelength selective switch in the first transmission module 210*c* (refer to the second wavelength selective switch WSS12 in FIG. 2) to filter and block the optical signal with the wavelength λ2 transmitted to the West in order to prevent the optical signal with the wavelength λ2 from continuing to be transmitted to the next OADS 200*d*.

Through this, it is possible to build different optical tunnels on the same transmission ring Ring1 by using different wavelengths to transmit data to different optical nodes respectively. Thus, in the first tier network T1, the data transmission between the servers on different racks corresponding to each one of the OADSs 200*a*-200*e* in the same pod can be implemented.

Please refer to FIG. 1 again. As previously shown in FIG. 1, the first tier network T1 includes a plurality of pods P1-P4. The pods P1-P4 via being interconnected to the second tier network T2 can be formed a network structure with larger scale.

Structurally, any one of the OSISs (i.e., the OSIS 400*a*) of the second tier network T2 is connected to two adjacent pods in the first tier network T1 at the same time (i.e., Pod P1 and Pod P2). Thereby, data transmission between servers corresponding to different pods can be implemented through the OSISs 400*a*-400*e* in the second tier network T2.

Specifically, the first transmission modules 210 of the OADSs 200*a*-200*e* in the pod P1 are coupled to the OSIS 400*a* through a plurality of first longitudinal ports respectively. The second transmission modules 220 of the OADSs 200*a*-200*e* are coupled to, through a plurality of second longitudinal ports to the OSIS 400*e* respectively. In addition, the second transmission modules 220 in the pod P2 are coupled to the OSIS 400*a* through a plurality of second longitudinal ports respectively.

Alternately, any one of the OSISs 400*a*-400*e* in the second tier network T2 is connected to the first transmission module 210 and the second transmission module 220 corresponding to different transmission rings of the OADSs 200*a*-200*e* in two adjacent pods in the first tier network T1. The OADSs 200*a*-200*e* in the same pod in any one of the first tier networks T1 are coupled to the adjacent two of the OSISs 400*a*-400*e* in the second tier network T2 at the same time. Through the dissimilar first transmission module 210 and the second transmission module 220.

As such, accompanied with the interconnect network between the OSISs 400*a*-400*e*, any OADSs 200*a*-200*e* can be built a plurality of end-to-end optical tunnels between each pod of the first tier network T1. Further through one or more OSIS 400*a*-400*e*, each pod of the first tier network T1 is connected to OADSs 200*a*-200*e* of the other pods for transmission.

Figure 4:
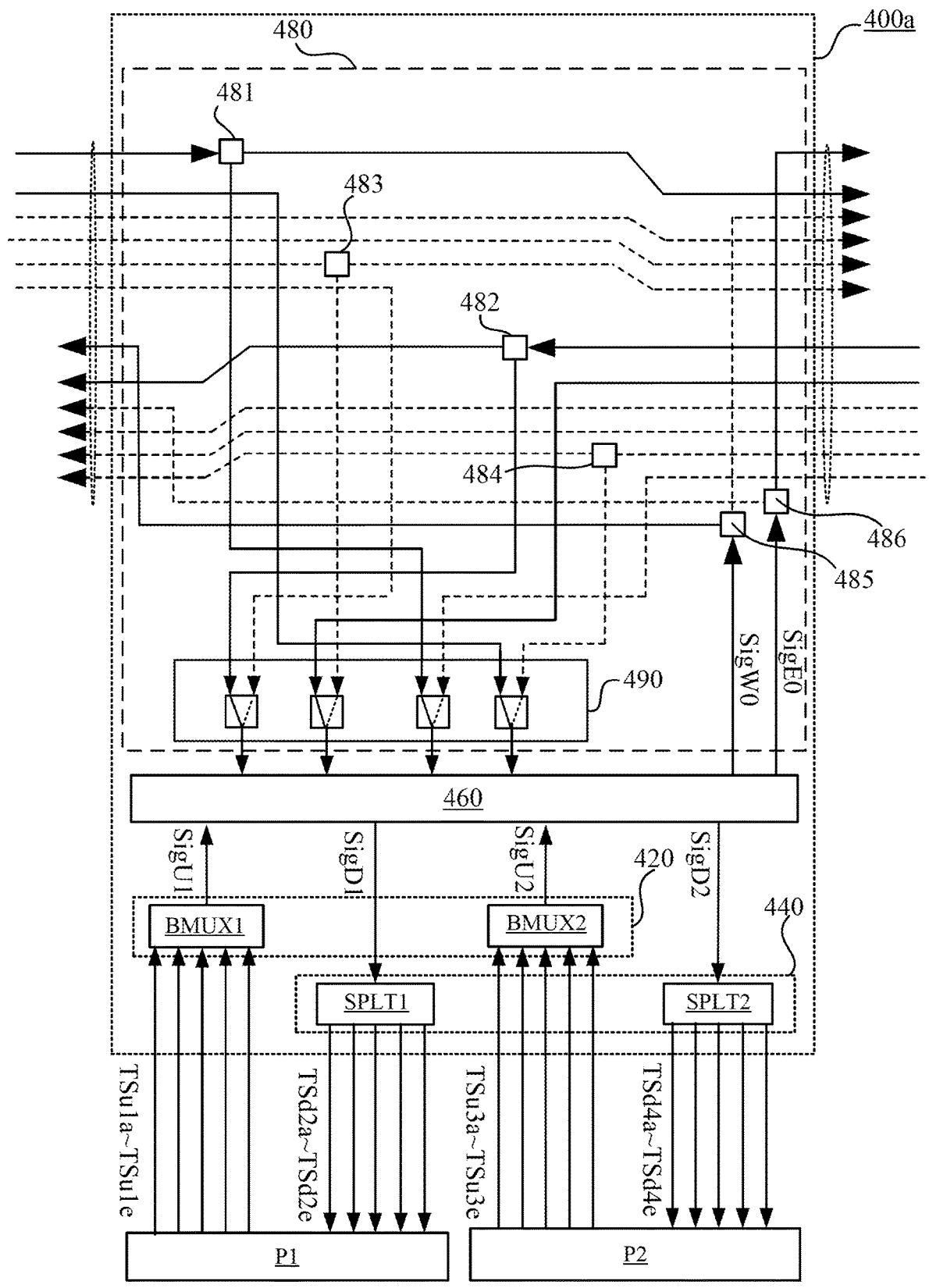
FIG. 4 is a schematic diagram illustrating an optical switch interconnect sub-system (OSIS) in accordance with some embodiments of the present disclosure.

For ease of description, the following paragraphs are the description with the relevant diagrams for the internal specific structure of the OSIS 400*a* and the relevant operation of an implement of optical signal transmission. Please refer to FIG. 4. FIG. 4 is a schematic diagram of an optical switch interconnect sub-system 400*a* in accordance with some embodiments of the present disclosure. It should be noticed that although FIG. 4 illustrates the structure and operation of the OSIS 400*a* as an example, the structures and operations of the remaining OSISs 400*b*-400*e* are similar, and therefore will not be described again.

The OSIS 400*a* is mainly used as a relay node for building optical tunnels between different pods. As shown in FIG. 4, the internal design of the OSIS 400*a* can be divided into a receiving sub-module 420, an output sub-module 440, an optical switching sub-module 460, and an interconnection fabric module 480. The interconnection fabric module 480 further includes a failover sub-module 490.

The OSIS 400*a* includes a plurality of add-ports and drop-ports. The amounts of them are equal and corresponsive to the amounts of the OADS 200 in each pod in the first tier network T1. For example, when each pod includes five OADSs 200a-200e respectively, the OSIS 400a should be connected to ten OADSs in adjacent pod P1 and P2. Thus, ten add-ports and ten drop-ports are needed.

As shown in the figure, the receiving sub-module 420, coupled to each add-port, is configured to receive a plurality of first uplink transmission optical signals TSu1a-TSu1e from a plurality of first OADSs 200a-200e corresponding to the first pod P1 of the OSIS 400a, and a plurality of third uplink transmission optical signals TSu3a-TSu3e from a plurality of second OADSs 200a-200e corresponding to the second pod P2.

The OSIS 400a respectively is connected to all the OADSs 200a-200e in the two adjacent pods P1 and P2 in the first tier network T1 with optical fibers. In order to combine and filter the optical signals uploaded from the OADSs 200a-200e, in some embodiments, the receiving sub-module 420, including two wavelength band multiplexers (band MUX) BMUX1 and BMUX2, is configured to receive, respectively, the first uplink transmission optical signals TSu1a-TSu1e, the third uplink transmission optical signals TSu3a-TSu3e with different wavelength bands transmitted by the OADSs 200a-200e in the pods P1 and P2, and combine them into the composite signal SigU1 and SigU2 to one optical fiber to enter into the optical switching sub-module 460.

In some embodiments, the two wavelength band multiplexers BMUX1 and BMUX2 are connected to different transmission rings of the OADSs of different pods P1 and P2. For example, as shown in FIG. 1 and FIG. 4, the wavelength band multiplexer BMUX1 is connected downwardly to the first transmission module 210 of each of the OADSs 200a-200e in the pod P1. The wavelength band multiplexer BMUX2 is connected downwardly to the second transmission module 220 of each of the OADSs 200a-200e in the pod P2. For ease of understanding, the connection between the first tier network T1 and the second tier network T2 will be described in detail in the following paragraphs.

Therefore, in the embodiment shown in FIG. 1, if a pod P1 includes at most five OADSs 200a-200e and the first transmission module 210 and the second transmission module 220 of corresponding OADSs 200a-200e on each transmission ring use different wavelength frequency bands, the wavelength band multiplexers BMUX1 and BMUX2 configured in the OSIS 400a are five-band multiplexer separately to allow the optical signals with five different wavelength frequency band to pass through five add-ports, respectively. For example, for the optical signals entering into the wavelength band multiplexers BMUX1 through the first add-port, only the optical signals with wavelength $\lambda1$-$\lambda8$ can pass, and the optical signals with remaining wavelength are filtered out by the wavelength band multiplexers BMUX1. For the optical signals entering into the wavelength band multiplexers BMUX1 through the second add-port, only the optical signals with wavelength $\lambda9$-$\lambda16$ can pass, and so on.

The output sub-module 440, coupled to each drop-port, is configured to transmit the composite optical signals SigD1 and SigD2 transmitted from the optical switching sub-module 460 to the pod P1 and P2 in the first tier network T1. Specifically, the output sub-module 440 mainly includes splitters SPLT1 and SPLT2. In structure, the splitter SPLT1 is connected to the OADSs 200a-200e in pod P1. The splitter SPLT2 is connected to the OADSs 200a-200e in pod P2. The splitter SPLT1 and SPLT2 are configured to duplicate and split the composite optical signal SigD1 and SigD2 transmitted downwardly by the optical switching sub-module 460 as the second downlink transmission optical signals TSd2a-TSD2e and the fourth downlink transmission optical signals TSd4a-TSD4e to each OADSs 200a-200e of the pod P1 and P2 in the first tier network T1.

Therefore, in the embodiment shown in FIG. 1, if a pod P1 includes at most five OADSs 200a-200e, the 1×5 splitter SPLT1 duplicates the composited optical signal SigD1 into five the second downlink transmission optical signal TSd2a-TSd2e and outputs, to the first transmission module 210 of the five OADSs 200a-200e in the pod P1, respectively. The other 1×5 splitter SPLT2 duplicates the composited optical signal SigD2 into five the fourth downlink transmission optical signal TSd4a-TSd4e and outputs, to the second transmission module 220 of the five OADSs 200a-200e in the pod P2, respectively.

In structure, the optical switching sub-module 460, coupled to the receiving sub-module 420, the output sub-module 440 and the interconnection fabric module 480, is configured to receive the optical signals transmitted between the sub-module 420, the output sub-module 440 and the interconnection fabric modules 480.

In some embodiments, the optical switching sub-module 460 includes an N×M wavelength selective switch for wavelength selection, so that the OSIS 400a can transmit the optical signals which are transmitted from the first tier network T1 to the East and the West to other OSISs (such as OSISs 400b-400e) or downwardly to other pods in the first tier network T1, and can also receive optical signals from other OSISs 400b-400e in East and West direction and transmit them to the pod P1 and P2 in the first tier network T1. N and M are any positive integers greater than or equal to two and depend on the amount of transmission modules included in one OADS 200 and the amount of the OSISs 400a-400e included in the second tier network T2, in which the OSISs 400a-400e are connected to each other.

Taking the embodiment shown in FIG. 1 as an example, since one OADS 200 includes two independent first transmission modules 210 and second transmission modules 220, the OSIS 400a is configured with two pods of multiplexer BMUX1, BMUX2. Correspondingly, the optical switching sub-module 460 includes a first uplink input terminal and a second uplink input terminal, which are, respectively coupled to the multiplexer BMUX1 and the multiplexer BMUX2, configured to receive a composite optical signal SigU1 and a composite optical signal SigU2, respectively.

In addition, since there are five OSISs 400a-400e connected in the second tier network T2, each OSIS (such as the OSIS 400a) has four lines connected from the other four OSIS 400b-400e. Therefore, the optical switching sub-module 460 includes a plurality of corresponding downlink input terminals coupled to the interconnection fabric module 480 and configured to receive the lateral transmission optical signals transmitted by the remaining OSISs 400b-400e. Thus, in this embodiment, the amount of input terminals of the optical switching sub-module 460 is two uplink input terminals plus four downlink input terminals, and the value of N is six.

On the other hand, since the OSIS 400a is configured to transmit data downwardly to two pods P1, P2, the OSISs 400a is configured with two splitters SPLT1, SPLT2. Correspondingly, the optical switching sub-module 460 includes a first downlink output terminal and a second downlink output terminal, which are respectively coupled to the splitter SPLT1 and the splitter SPLT2. The splitter SPLT1 is configured to output the second downlink transmitted optical signal TSd2a-TSd2e. The splitter SPLT2 is configured to output the fourth downlink transmission optical signals TSd4a-TSd4e.

In addition, the OSIS 400a is further configured to output signals in East and West direction to the remaining OSIS 400b-400e. Therefore, the optical switching sub-module 460 includes a first uplink output terminal and a second uplink output terminal, which are, respectively coupled to the interconnection fabric module 480, configured to output the lateral transmission optical signal to the remaining OSISs 400b-400e. As a result, in this embodiment, a total of four outputs are required, and the value of M is 4.

In this structure, the 6×4 (6 in and 4 out) optical switching sub-module 460 simplifies the fabric design compared to the existing optical switching sub-module. Not only is the usage of line less, but also the optical switching sub-module 460 can be configured to be used with the failover sub-module for detecting the intensity of optical signals (please refer to FIG. 6).

Figure 5:
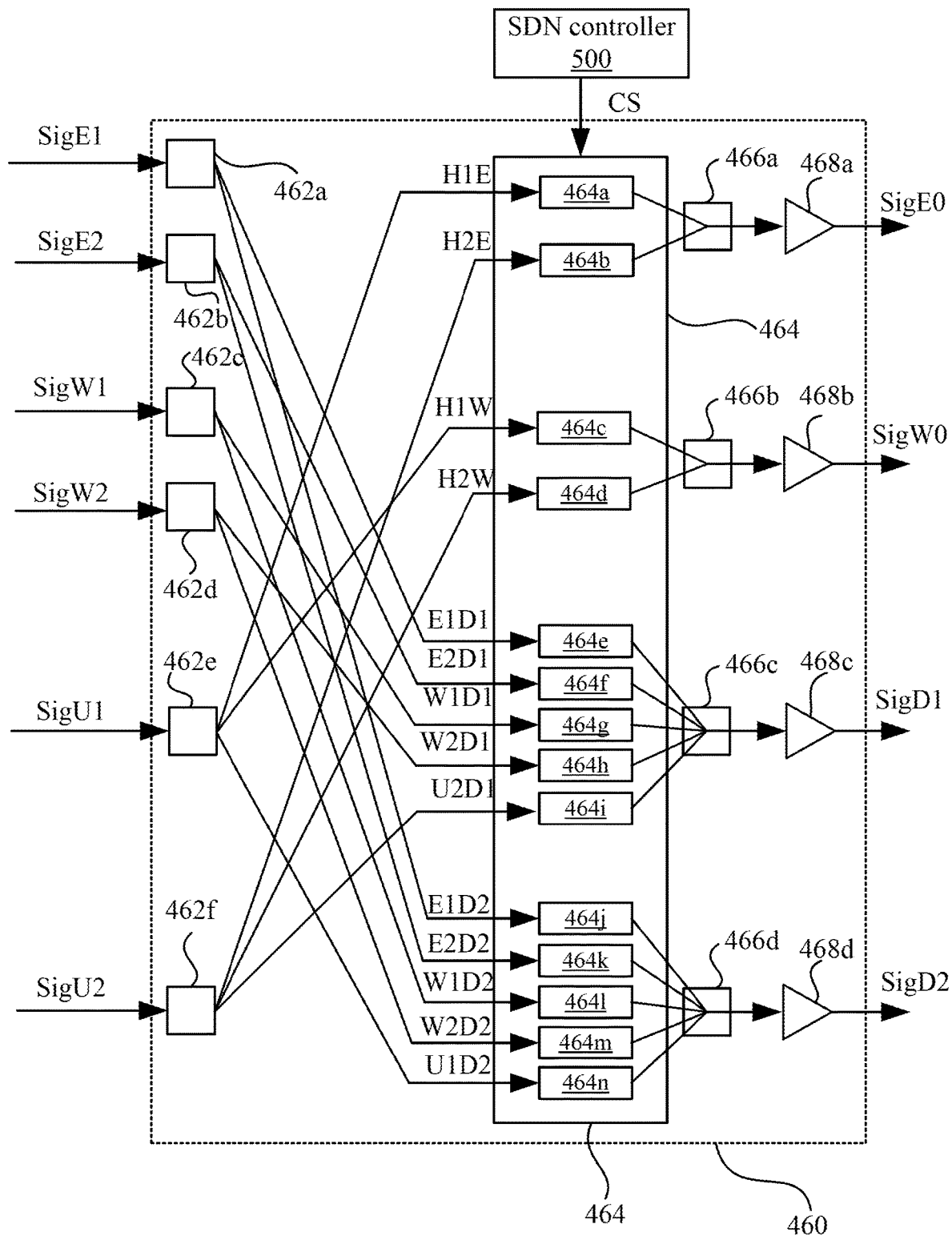
FIG. 5 is a schematic diagram of internal design of an optical switching sub-module in accordance with some embodiments of the present disclosure.

Please refer to FIG. 5. FIG. 5 is a schematic diagram of the internal design of the optical switching sub-module 460 in accordance with some embodiments of the present disclosure. As shown in FIG. 5, the 6×4 optical switching sub-module 460 includes a plurality of input splitters 462a-462f, a wavelength selective switch array 464, a plurality of output combiners 466a-466d, and a plurality of optical signal amplifiers 468a-468d. Precisely, in the optical switching sub-module 460, the amount of input splitters 462a-462f corresponds to the N pieces of input terminals, the number of output combiners 466a-466d and the optical signal amplifiers 468a-468d correspond to the number of output terminals M. In this embodiment, the 6×4 optical switching sub-module 460 includes six input splitters 462a-462f, four output combiner 466a-466d, and four optical signal amplifiers 468a-468d. The wavelength selective switch array 464 is an array combined with fourteen 1×1 wavelength selective switches 464a-464n. In this embodiment, the six input splitters 462a-462f include four downlink transmission input splitters 462a-462d and two uplink transmission input splitters 462e-462f. The fourteen wavelength selective switches 464a-464n include four laterally transmission wavelength selective switches 464a-464d, the downlink transmission wavelength selective switches 464e-464i in the first part, and the downlink transmission wavelength selective switches 464j-464n in the second part. Four output optical combiners 466a-466d include two lateral transmission output combiners 466a-466b and two downlink transmission output combiner 466c-466d.

In operation, the input splitters 462a-462f, coupled to the downlink input terminal, the first uplink input terminal, or the second uplink input terminal respectively, are configured to duplicate and correspondingly output a plurality of first optical signals to a plurality of wavelength selective switches 464a-464n in the wavelength selective switch array 464. The wavelength selective switches 464a-464n are respectively configured to receive and select, according to a control signal CS outputted by the software-defined network controller 500, the corresponding wavelength of the first optical signal as the second optical signal to the corresponding output combiners 466a-466d. The output combiners 466a-466d are respectively configured to receive and combine two or more of the second optical signals to output a plurality of third optical signals to the optical signal amplifiers 468a-468d. Thereby, the optical signal amplifiers 468a-468d can amplify the third optical signal and output the amplified third optical signal as composite optical signal SigD1, SigD2, SigE0 and SigW0 through the first downlink output terminal, the second downlink output terminal, the first uplink output terminal or the second uplink output terminal respectively. The following paragraphs describe the operation of each device unit separately.

Specifically, the uplink transmission input splitter 462e is coupled to the first uplink input terminal, and the uplink transmission input splitter 462f, coupled to the second uplink input terminal, is configured to receive the composite signal SigU1 and SigU2 from the multiplexer BMUX1 and the multiplexer BMUX2. The uplink transmission input splitter 462e and the uplink transmission input splitter 462f are configured to duplicate and split the composite signal SigU1 and SigU2 into three beams and be connected to the three different 1×1 wavelength selective switches 464a-464n in the wavelength selective switch array 464, respectively. As shown in the figure, the uplink transmission input splitter 462e is coupled to the wavelength selective switches 464a, 464c, 464n, and correspondingly outputs a first lateral transmission signal H1E, a second lateral transmission signal H1W and the third downlink transmission signal U1D2. The uplink transmission input splitter 462f is coupled to the wavelength selective switches 464b, 464d, 464i, and correspondingly outputs a first lateral transmission signal H2E, a second lateral transmission signal H2W and the third downlink transmission signal U2D1.

The downlink input terminals are configured to receive optical signals from each two OSIS at the East and the West respectively. For example, for the optical switching sub-module 460 in the OSIS 400a, the downlink input terminals are configured to receive the lateral optical signals SigE1 and SigE2 transmitted from the optical switching sub-module 460b and 460c at the East and the lateral optical signals SigW1 and SigW2 transmitted from the optical switching sub-module 460e and 460d at the West. The optical signal SigE1, SigE2, SigW1, and SigW2 are respectively transmitted to the 1×2 downlink transmission input splitters 462a, 462b, 462c, 462d through the downlink input terminal with the optical fiber connection in order to be duplicated and split into two beams and connected to the corresponding one of the 1×1 wavelength selective switches 464a-464n.

Specifically, any one of the downlink transmission input splitters 462a-462d coupled to the corresponding one of the downlink input terminal, is configured to duplicate the lateral optical signal SigE1, SigE2, SigW1, and SigW2 received from the corresponding OSIS 400b-400e and outputted the corresponding first downlink transmission signal E1D1, E2D1, W1D1, W2D1 and the second downlink transmission signal E1D2, E2D2, W1D2 and W2D2 to the corresponding one of the wavelength selective switches 464a-464n in the wavelength selective switch array 464.

As shown in the figure, in an embodiment, the downlink transmission input splitter 462a is connected to and outputs the first downlink transmission signal E1D1 and the second downlink transmission signal E1D2 to the corresponding wavelength selective switches 464e, 464j. The downlink transmission input splitter 462b is connected and outputs the first downlink transmission signal E2D1 and the second downlink transmission signal E2D2 to the corresponding wavelength selective switches 464f, 464k. The downlink transmission input splitter 462c is connected and outputs the first downlink transmission signal W1D1 and the second downlink transmission signal W1D2 to the corresponding wavelength selective switches 464g, 464l. The downlink transmission input splitter 462d is connected and outputs a first downlink transmission signal W2D1 and a second downlink signal W2D2 to the corresponding wavelength selective switches 464h, 464m.

In the fourteen wavelength selective switches 464a-464n in the wavelength selective switch array 464, among them, four lateral transmission wavelength selective switches 464a, 464b, 464c, 464d are configured to, respectively, perform wavelength selection to the lateral transmission signal H1E, H2E, H1W, and H2W transmitted to the other optical switching sub-module 460 in East and West direction in the second tier network T2 in order to select the corresponding wavelength to be output as the third optical signal. The downlink transmission wavelength selective switches 464e-464i in the first part and the downlink transmission wavelength selective switches 464j-464n in the second part are configured to perform wavelength selection to the downlink transmission signals transmitted downwardly in the adjacent pods in the first tier network T1.

Specifically, the downlink transmission wavelength selective switches 464e-464i in the first part are configured to, respectively, select the downlink transmission signal E1D1, E2D1, W1D1, W2D1 and the corresponding wavelength of the downlink transmission signal U2D1 and output as the corresponding third optical signal. The downlink transmission wavelength selective switches 464j-464n in the second part are configured to, respectively, select the downlink transmission signal E1D2, E2D2, W1D2, W2D2 and the corresponding wavelength of the downlink transmission signal U1D2 and output as the corresponding third optical signal. Thus, the downlink transmission wavelength selective switches 464e-464i in the first part can perform wavelength selection to the optical signal transmitted to the pod P1 downwardly. The downlink transmission wavelength selective switches 464j-464n in the second part can perform wavelength selection to the optical signal transmitted to the pod P2 downwardly.

In summary, after the operation of the wavelength selection is completed by the fourteen wavelength selection switches 464a-464n in the wavelength selective switch array 464, the third optical signals outputted by the wavelength selective switch array 464 have four transmission direction, to East, to West, to the pod P1 and the pod P2 respectively. Each wavelength selective switch 464a-464n with same transmission direction is connected to the corresponding one of the output combiner 466a-466d to combine the optical signals into one optical path.

As shown in the embodiment in FIG. 5, the lateral transmission output combiner 466a is configured to combine the third optical signals output from the lateral transmission wavelength selective switch 464a and 464b. The other lateral transmission output combiner 466b is configured to combine the third optical signals output from the lateral transmission wavelength selective switch 464c and 464d. The downlink transmission output combiner 466c is configured to combine the third optical signals output from the downlink transmission wavelength selective switches 464e-464i in the first part. The downlink transmission output combiner 466d is configured to combine the third optical signals output from the downlink transmission wavelength selective switches 464j-464n in the second part.

Finally, the output combiner 466a-466d are respectively connected to the corresponding one of optical signal amplifiers 468a-468d in order to enhance optical signal intensity to ensure that the composite optical signal SigD1, SigD2, SigE0 and SigW0 have sufficient power to be transmitted to the destination.

It should be noticed that similar to the optical communication in the first tier network T1, when the optical signals with the same wavelength enter into the optical switching sub-module 460 at the same time, the conflict may be caused by the optical signals with the same wavelength passing through the same output combiner 466a-466d.

For example, when the optical signals SigU1 and SigU2 from the pod P1 and the pod P2 are both transmitted to the East if wavelengths of both signals are A5, the two optical signals with wavelength A5 are combined into one optical fiber through the output combiner 466a and conflict occurs. Similarly, if the optical signal SigU1 and SigU2 are both transmitted to the West, the conflict occurs by the output combiner 466b. Furthermore, when the wavelengths of the two optical signal sigE1 and SigW1 from the first OSIS 400b and 400e at the East and the West are both wavelength A6, the composite optical signal passing to the pod P1 through the 5×1 output combiner 466c will cause conflict. Similarly, if the optical signal is transmitted to the pod P2, the conflict occurs by the 5×1 (5 input and 1 output) output combiner 466d.

Figure 6:
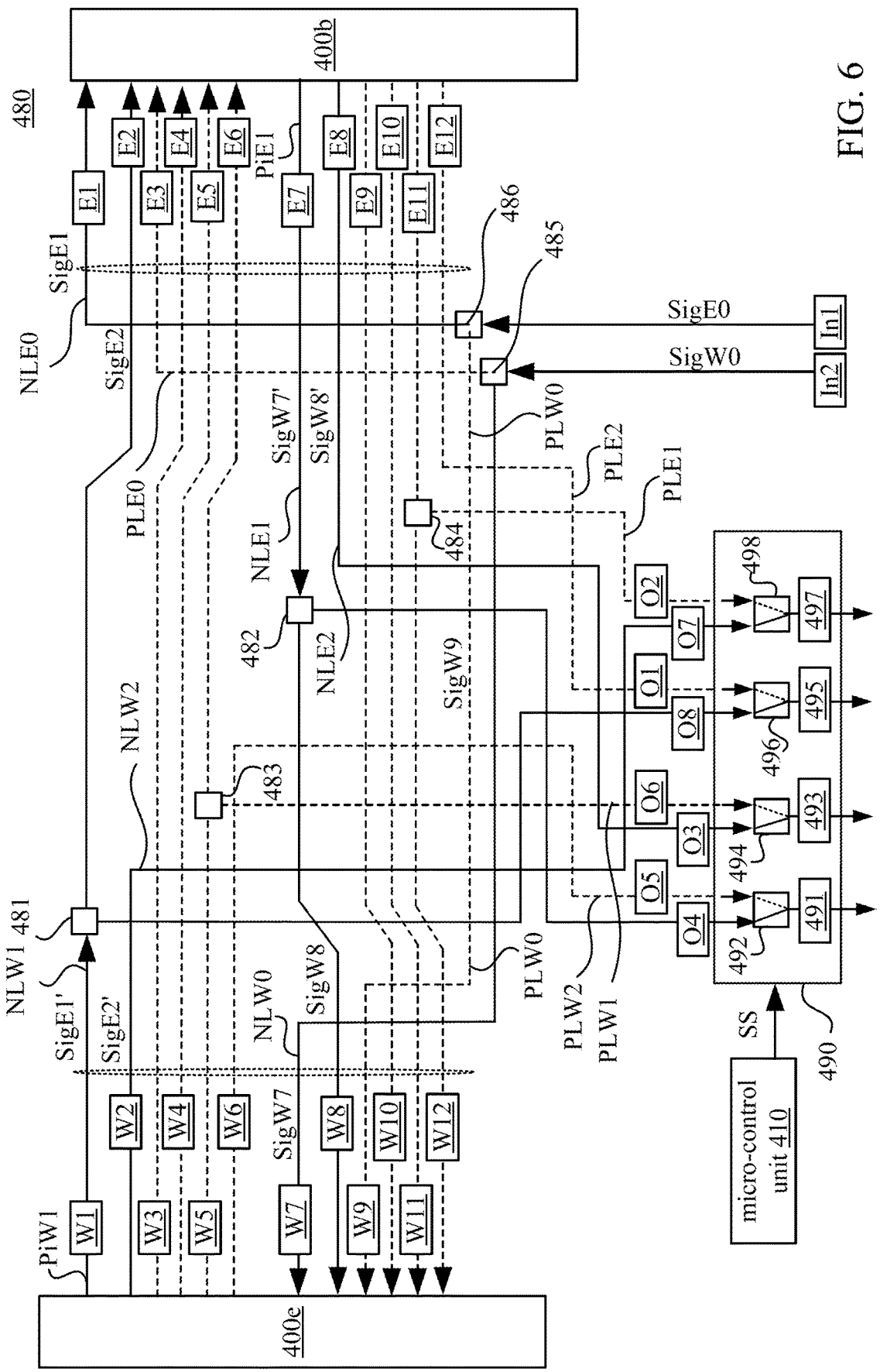
FIG. 6 is a schematic diagram of an interconnection fabric module and a failover sub-module in accordance with some embodiments of the present disclosure.

Please refer to FIG. 6. FIG. 6 is a schematic diagram of the interconnection fabric module 480 in accordance with some embodiments of the present disclosure. The interconnection fabric module 480 is configured to connect the OSISs 400a-400e. Any two of the OSISs 400a-400e transmit the corresponding lateral transmission optical signal between each other through the corresponding first line (i.e., the normal fabric). In some embodiments, any two of the OSISs 400a-400e are connected to each other with the second line (i.e., the protection fabric) which is different from the first line. The interconnection fabric module 480 includes the failover sub-module 490.

Specifically, The interconnection fabric module 480 includes upload terminal In1, In2, East output terminal E1, E2, East protection output terminal E3-E6, East input terminal E7-E8, East protection input terminal E9-E12, West input terminal W1, W2, West protection input terminal W3-W6, West output terminal W7, W8, West protection output terminal W9-W12, interconnect splitters 481-486 and the failover sub-module 490.

The interconnection fabric module 480 includes the internal fabrics for the OSIS 400a to connect to the other OSISs 400b-400e in East and West direction. As shown in the figure, the interconnect fabrics include the normal fabric and the protection fabric. The normal fabric (as shown with the solid line) is configured to transmit the optical signals under the normal condition of the system. The protection fabric (as shown with the dash line) is configured to transmit the optical signals in reverse direction under the condition of the normal fabric being cut off. The amount of interconnect circuits depends on the total amount of OSISs 400a-400e to which the system is connected. For example, the present embodiment is a fabric diagram of the interconnect situation of five OSISs 400a-400e. In fact, the interconnect structure between the OSISs 400a-400e in the second tier network T2 is essentially a mesh structure. Thus, there will be one output line NLE0 to the East, one output line NLW0 to the West, two input line NLE1, NLE2 from the OSIS (i.e., OSIS 400b and OSIS 400c) from the East, two input line NLW1, NLW2 from the OSIS (i.e., OSIS 400e and OSIS 400d) from the West. There are a total of two normal solid lines connected to the optical switching sub-module 460 and a total of four normal solid lines connected to the failover sub-module 490.

On the other hand, there will be at least six protection output line PLW0, PLE0 and protection input line PLE1, PLE2, PLW1, PLW2 (dash line) because of one-to-one correspondence with the normal lines. The remaining lines are transition lines. Some lines utilize interconnect splitters 481-486 to duplicate and split the optical signals and transmits to the OSIS and next OSIS at the same time. The other transits this OSIS directly and is connected to the next OSIS in East-West direction.

The input lines NLE1, NLE2, NLW1, NLW2 and the protection input lines PLE1, PLE2, PLW1, and PLW2 are coupled to the failover sub-module 490. As the embodiment shown in FIG. 6, the input lines NLE1, NLE2, NLW1, NLW2 and the protection input lines PLE1, PLE2, PLW1, and PLW2 are directly connected to the failover sub-module 490. However, the present disclosure is not limited therein. In other embodiments, the input lines NLE1, NLE2, NLW1, NLW2 and the protection input lines PLE1, PLE2, PLW1, and PLW2 can be connected to the failover sub-module 490 indirectly. On the other hand, the output lines NLE0 and NLW0 are connected to the optical switching sub-module 460.

For the signals to be output from the pod P1 or the pod P2 to the other OSISs 400b-400e, firstly, from the optical switching sub-module 460, two optical fibers from the OSIS to the East and the West will be connected to the first upload terminal In1 and the second upload terminal In2 of the interconnection fabric module 480 respectively.

The first upload terminal In1 and the second upload terminal In2 are connected to a 1×2 interconnect splitter 485 and 486. The interconnect splitter 485 is configured to duplicate and output the composite optical signal SigW0 received from the optical switching sub-module 460 as a lateral transmission optical signal SigW7 through the first West output terminal W7 (i.e., line NLW0) and as another lateral transmission optical signal through the first East protection terminal E3 (i.e., line PLE0). Similarly, The interconnect splitter 486 is configured to duplicate and output the composite optical signal SigE0 received from the optical switching sub-module 460, through the first East output terminal E1 (i.e., line NLE0) as a lateral transmission optical signal SigE1 and through the first West protection output terminal W9 (i.e., line PLW0) as a lateral transmission optical signal SigW9.

In other words, the interconnect splitters 485 and 486 are configured to duplicate and split the optical signal into two beams, respectively, one being transmitted in the normal direction (which are the normal fabric NLW0 and NLE0) to the OSISs 400e, 400d, 400b and 400c, the other being transmitted in reverse direction (which are the protection input lines PLE0 and PLW0).

As shown in the figure, the interconnection fabric module 480 transmits the corresponding lateral transmission optical signal SigE1 to the OSISs 400b and 400c in a first direction (i.e., eastward) and the corresponding lateral transmission optical signal SigW7 to the OSISs 400e and 400d in a second direction (i.e., westward) which is different with the first direction. In other words, in the normal path, the interconnection fabric module 480 transmits the optical signals to the remaining OSIS 400b-400e in two different directions.

Similarly, for the signals received from the other OSISs 400b-400e and output to the pod P1 or the pod P2, there are the normal fabric and the protection fabric separately. In the aspect of the normal fabric, the normal fabrics NLE1 and NLW1, connected through two input ports, a first East input PiE1 and a first West input PiW1, are configured to receive signals from the first OSIS 400b at the East and the first OSIS 400e at the West.

The first east input terminal E7 and the first west input terminal W1 receive, respectively, the lateral transmission optical signals SigW7' and SigE1' from the first west output terminal W7 and first East output terminal E1 of the interconnection fabric module 480 of the adjacent OSISs 400b and 400e. On the normal fabric, the normal fabrics NLE1 and NLW1 are connected to a interconnect splitters 482 and 481 respectively to duplicate and split the lateral transmission optical signals SigW7' and SigE1' into two beams, one being transmitted continually westward and eastward, the other being transmitted to the local failover sub-module 490.

As shown in the figure, the two lines eastward and westward are finally connected to the position of the output port shifted downwardly. In other words, the interconnect splitter 481 is configured to duplicate a lateral transmission optical signal SigE1' received from the first west input terminal W1 and output it as a lateral transmission optical signal SigE2 through the second east output terminal E2. The interconnect splitter 482 is configured to duplicate a lateral transmission optical signal SigW7' received from the second west input terminal W8 and output it as a lateral transmission optical signal SigW8 through the second west output terminal W8. In addition, the two lines transmitting to the local failover sub-module 490 are connected to output ports O4 and O8 respectively.

The second pod of normal fabrics NLE2, NLW2, connected from, the second east input terminal E8 and a second west input terminal W2 respectively, are configured to receive the lateral transmission optical signals SigW8' and SigE2' transmitted from the second OSIS 400c at the east and the second OSIS 400d at the west, connected to the output ports O3, O7 respectively and are connected directly to the local failover sub-module 490.

In the aspect of protection fabric, the basic design principle is to configure the fabric corresponding to the normal lines but in reverse transmission direction in order to be connected to the node of the OSIS at the same destination of the normal (solid line) path.

Different with the normal fabric, under the condition of five OSISs 400a-400e interconnected with each other, the protection path needs to pass two nodes of the OSISs in reverse direction and then reaches the node of the OSIS at the same destination of the normal path.

For example, assuming that the line of the present OSIS at the east is cut off, the optical signals of two OSISs at the east must be transmitted westward through the protection path (the two OSIS at the west is not affected, using the original normal path). The optical signal must bypass two OSIS and then reach the two OSIS at the east. It is not necessary for the system to receive the optical signal when they bypass the two OSIS at the west.

Thus, there is no splitter configured in every two optical fibers on the protection path eastward and westward in the OSIS 400a. As shown in the figure, the first east protection input terminal E9 and the first west protection input terminal W3 are configured to, respectively, receive the lateral transmission optical signals from the first west protection output terminal W9 and the first east protection output terminal E3 in the interconnection fabric module 480 of the adjacent OSISs 400b and 400e and output the lateral transmission optical signals through the second west protection output terminal W10 and the second east protection output terminal E4.

Similarly, the second east protection input terminal E10 and the second west protection input terminal W4 are configured to, respectively, receive the lateral transmission optical signals from the second west protection output terminal W10 and the second east protection output terminal E4 in the interconnection fabric module 480 of the adjacent OSISs 400b and 400e and output the lateral transmission optical signals through the third west protection output terminal W11 and the third east protection output terminal E5.

The third east protection input terminal E11 and the third west protection input terminal W5 are configured to, respectively, receive the lateral transmission optical signals from the third west protection output terminal W11 and the third east protection output terminal E5 in the interconnection fabric module 480 of the adjacent OSISs 400b and 400e.

The interconnect splitters 484 and 483, coupled to the third east protection input terminal E11 and the third west protection input terminal W5, are configured to duplicate the received lateral transmission optical signals, be connect to the position of the output port shifted downwardly, transmit optical signals through the fourth west protection output terminal W12 and the fourth east protection output terminal E6 and output the lateral transmission optical signals through the output terminals O2 and O6 to the failover sub-module 490.

Finally, the fourth east protection input terminal E12 and the fourth west protection input terminal W6 are configured to, respectively, receive the lateral transmission optical signals from the fourth west protection output terminal W12 and the fourth east protection output terminal E6 in the interconnection fabric module 480 of the adjacent OSISs 400b and 400e and output the lateral transmission optical signals through the output terminals O1 and O5 to the failover sub-module 490.

As shown in the figure, the failover sub-module 490 is coupled to the interconnect splitters 483, 484, the fourth east protection input terminal E12 and the fourth west protection input terminal W6. Furthermore, the failover sub-module 490 is coupled to the interconnect splitters 481, 482 on the normal path, the second east protection input terminal E8 and the second west protection input terminal W2. In this way, the failover sub-module 490 can be configured to receive selectively the lateral transmission optical signal transmitted from the normal path or the protection path. The failover sub-module 490 can output the lateral transmission optical signal to the optical switching sub-module 460 from the normal path through interconnect splitters 481 and 482, the second east input terminal E8 and the second west input terminal W2 or selectively output the lateral transmission optical signal to the optical switching sub-module 460 from the protection path through interconnect splitters 483 and 484, the fourth east protection input terminal E12 and the fourth west protection input terminal W6.

As shown in the figure, the failover sub-module 490 includes a plurality of optical switches 492, 494, 496, and 498. The optical switches 492, 494, 496, and 498 receive, through the first line (which is the normal fabric) and the second line (which is the protection fabric), the first lateral transmission optical signal (transmitted via the normal fabric) and the second lateral transmission optical signal (transmitted via the protection fabric) from the corresponding one of the remaining OSISs 400b-400e. The first lateral transmission optical signal and the second lateral transmission optical signal here refer to the lateral transmission optical signal transmitted between different OSISs 400a-400e in the ring-shaped mesh structure R2. One of the first lateral transmission optical signal and the second lateral transmission optical signal is outputted to the optical switching sub-module 460, corresponding to a select signal SS output from the micro-control unit 410 (MCU). Transmitting lateral optical signals in the ring-shaped mesh structure R2 will be further described in the following embodiment.

Figure 7A:
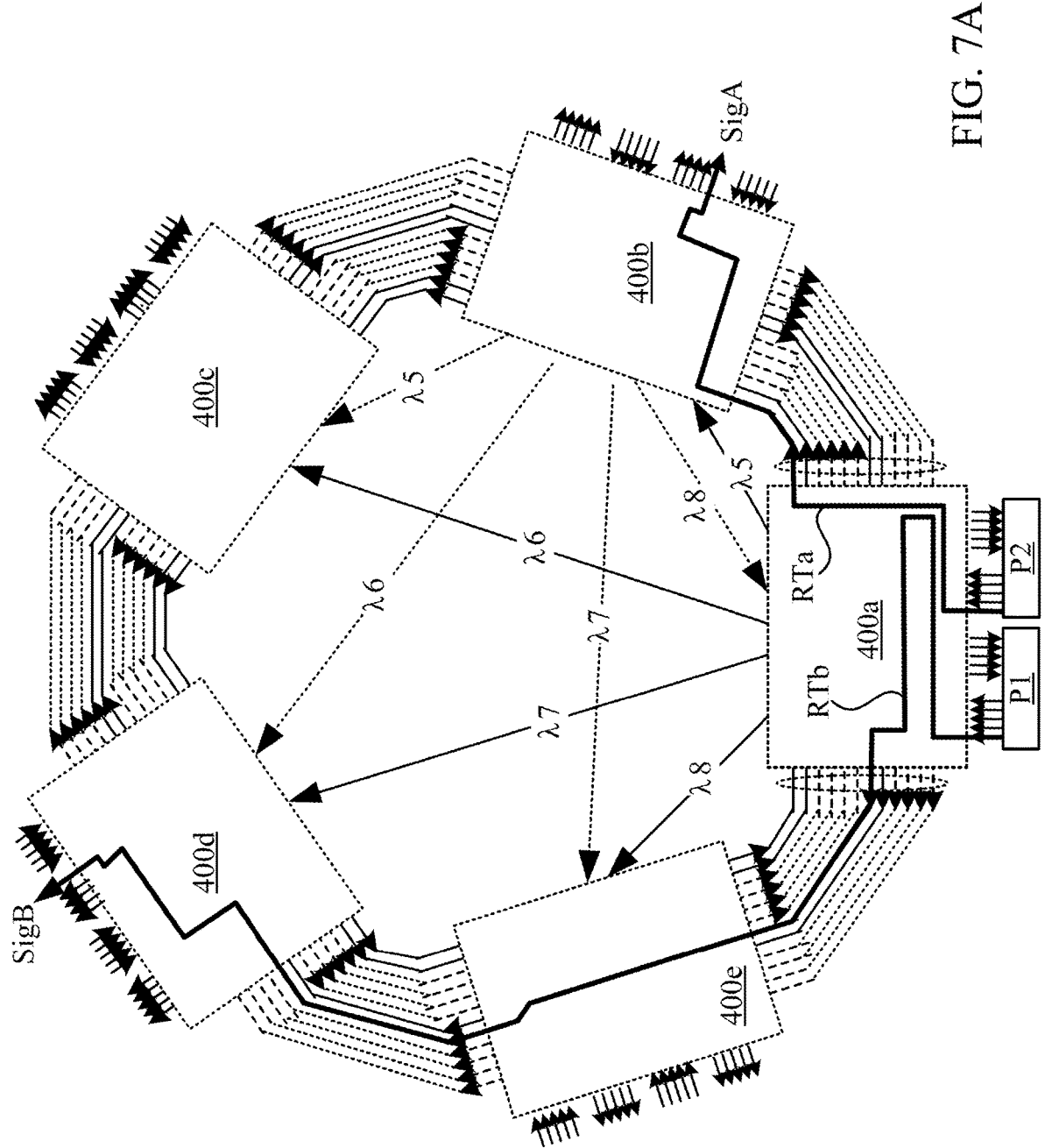
FIG. 7A is a schematic diagram of an interconnection network between optical switch interconnect sub-systems in a second tier network in accordance with some embodiments of the present disclosure.
Figure 7B:
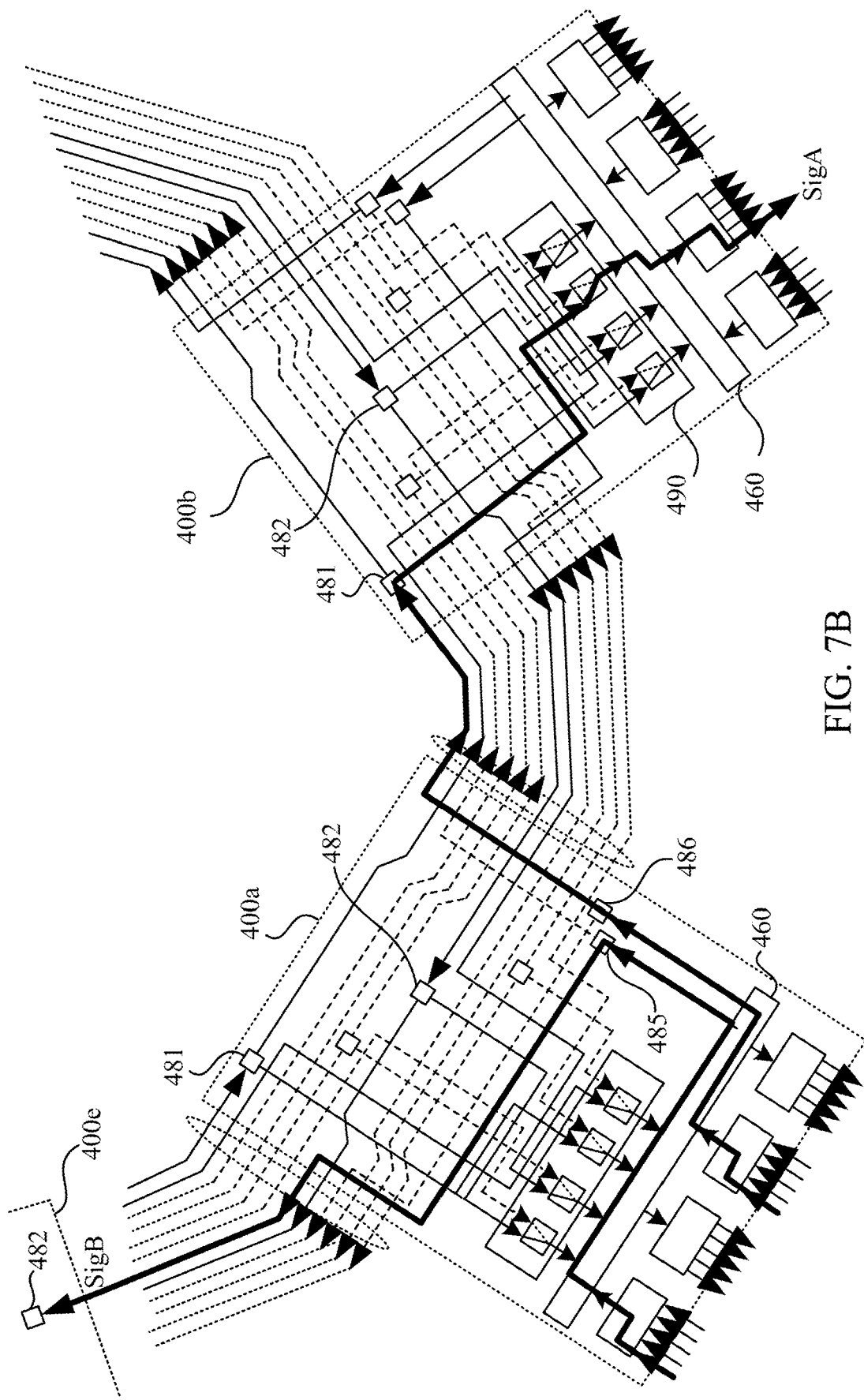
FIG. 7B is a partially enlarged schematic view of FIG. 7A.

Please refer to FIG. 7A and FIG. 7B. FIG. 7A is a schematic diagram of an interconnection network between the OSISs 400a-400e in a second tier network T2 in accordance with some embodiments of the present disclosure. FIG. 7B is a partially enlarged schematic view of FIG. 7A.

The interconnection network is mainly configured to build the optical tunnel for transmission between the OSIS 400a-400e, such that each pod in the first tier network T1 to which each OSISs 400a-400e is connected can transmit optical signals to each other. As mentioned above, the interconnection network between the OSISs 400a-400e is essentially in a mesh structure. Through some optical fibers in the Ribbon fiber, the connections from every OSISs 400a-400e to other OSIS are independent of each other. For example, the connection between the OSIS 400a and the other OSIS 400b-400e and the connection between the OSIS 400b and the other OSIS 400a, 400c-400e are independent of each other.

Since the ribbon fiber is adopted, all the OSISs 400a-400e are connected in a ring structure in appearance, which simplifies the wiring complexity. In addition, because of this mesh network architecture, data transmission between pairs of different OSISs 400a-400e can be simultaneously transmitted using the same wavelength combination without conflict, highlighting the characteristics of wavelength reusability.

Please refer to FIG. 4 and FIG. 6 for a better understanding of the interconnect network between OSISs 400a-400e illustrated in FIG. 7A and FIG. 7B.

As shown in FIG. 7A, under normal circumstances, the 400a will transmit and receive optical signals from the normal path to/from the OSISs 400b, 400c at the two nodes in the east and to/from the OSISs 400d, 400e at the two nodes in the west. Accompanied by the design of the internal interconnection fabric module 480 shown in FIG. 6, when the OSISs 400a-400e are interconnected via optical fibers, the optical paths of the east output terminals E1-E6 and the east input terminals E7-E12 the interconnection fabric of OSIS 400a are connected via optical fibers and correspond to the optical paths of the west input terminals W1-W6 and the west output terminals W7-W12 in the interconnection fabric of the next OSIS 400b, and so on.

Furthermore, since the factor of the interconnect structure between the OSISs 400a-400e, they can utilize the same wavelength combination ($\lambda 5, \lambda 6, \lambda 7, \lambda 8$) to transmit optical signals to each other without conflict, having the characteristics of wavelength reusability. As shown in the figure, the OSIS 400a can transmit optical signals to the OSISs 400b-400e, respectively, in wavelength combinations $\lambda 5, \lambda 6, \lambda 7,$ and $\lambda 8$. The OSIS 400b can also transmit optical signals to the OSISs 400c-400e, 400a, respectively, in wavelength combinations $\lambda 5, \lambda 6, \lambda 7, \lambda 8$ without causing conflicts. Similarly, the same wavelength combination $\lambda 5, \lambda 6, \lambda 7$ and $\lambda 8$ may be reused for transmitting optical signals to other OSISs in other OSISs 400c to 400e, and the contents thereof are not described herein.

In the example shown in FIG. 7A, the path RTa represents that the optical signal SigA with the wavelength $\lambda 5$ of the pod P2 in the first tier network T1 is transmitted from the OSIS 400a through the normal path to a first node (the OSIS 400b) at the east side. During the transmission, the 6×4 wavelength selective switch (i.e., optical switching sub-module 460) of the OSIS 400a selects the optical signal SigA from the pod P2 to be transmitted eastward, duplicated via the 1×2 internal interconnect splitter 486, split and transmitted to the next node (the OSIS 400b) in the normal direction (i.e., east). When the optical signal SigA enters into the internal interconnect circuit of the destination OSIS 400b, the optical signal SigA is duplicated, split and transmitted to the failover sub-module 490 of the OSIS 400b via the 1×2 interconnect splitter 481. At this time the failover sub-module 490 passes the optical signals which are on the normal path and transmits them to the 6×4 wavelength selective switch (i.e., the optical switching sub-module 460) of the OSIS 400b for wavelength selection and reception. The specific details of transmission of the optical signals are shown in FIG. 7B and will not be described here.

One the other hand, the path RTb represents that the optical signal SigB with the wavelength λ7 of the pod P1 in the first tier network T1 is transmitted from the OSIS 400a through the normal path to a second node (the OSIS 400d) at the west side. During the transmission, the 6×4 wavelength selective switch (i.e., optical switching sub-module 460) of the OSIS 400a selects the optical signal SigB from the pod P1 to be transmitted westward, duplicated via the 1×2 internal interconnect splitter 485, split and transmitted to the next node (the OSIS 400e) in the normal direction (i.e., west).

When the optical signal SigB enters into the internal interconnect fabric of the OSIS 400e, the optical signal SigB is duplicated, split and transmitted to the next node (OSIS 400d) continuously via the 1×2 internal interconnect splitter 482. When the optical signal SigB enters into the internal interconnect circuit of the destination OSIS 400d, the optical signal SigB is transmitted directly to the failover sub-module 490 of the OSIS 400d. At this moment, the failover sub-module 490 passes the optical signals which are on the normal path and transmits them to the 6×4 wavelength selective switch (i.e., the optical switching sub-module 460) of the OSIS 400d for wavelength selection and reception.

Figure 8A:
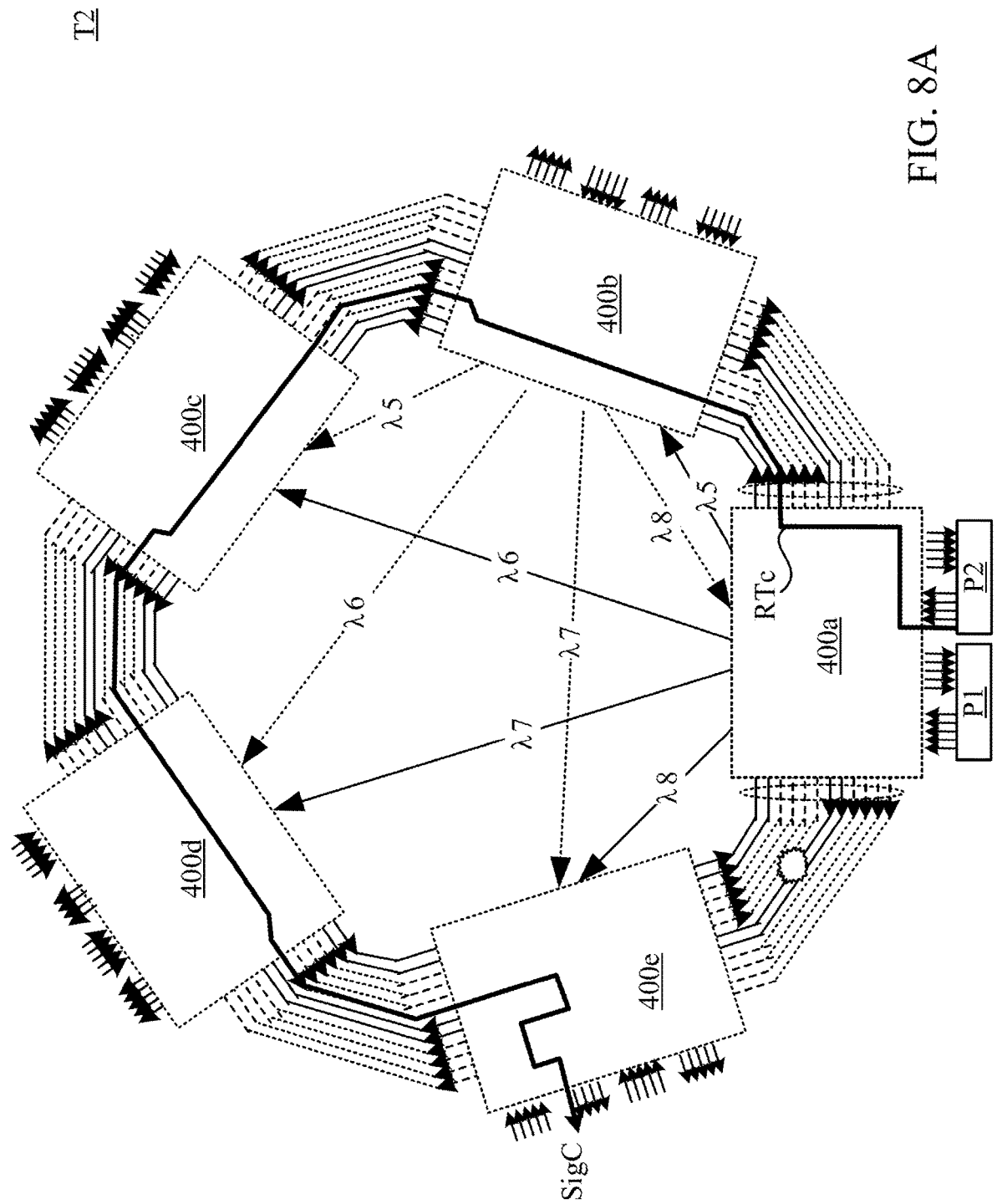
FIG. 8A is a schematic diagram of operation of a protection fabric in accordance with some embodiments of the present disclosure.

Please refer to FIG. 8A. FIG. 8A is a schematic diagram of the operation of a protection fabric in accordance with some embodiments of the present disclosure. As shown in FIG. 8A, it is assumed that the ribbon fiber between the OSIS 400a and the OSIS 400e is disconnected, thereby causing the OSIS 400a to be not able to transmit the optical signal SigC to the west through the normal path to the OSIS 400e and the optical signals to the OSIS 400d. At this time the failover sub-module 490 of the OSIS 400e detects that the intensity of the light of the first OSIS at the east becomes weaker, thus automatically switches the connection to the protection path RTc.

In fact, if the ribbon fiber between the OSISs 400a and 400e is disconnected, it will also affect the signal transmission of other OSISs.

In the present embodiment, the statuses of every OSISs 400a-400e receiving the optical signals from other two OSISs at the east/west are shown as table 2 below.

TABLE 2

(Receiving optical signals statuses of the OSIS)

| optical signal receiving status | First OSIS at the east | Second OSIS at the east | First OSIS at the west | Second OSIS at the west |
|---|---|---|---|---|
| 400a | O | O | X | X |
| 400b | O | O | O | X |
| 400c | O | O | O | O |
| 400d | O | X | O | O |
| 400e | X | X | O | O |

In Table 2, mark O represents that optical signals may be received through the normal path, and mark X represents that optical signals may not be received through the normal path and it is necessary to, by the failover sub-module 490, switch the connection to the protection path in order to receive optical signals. Therefore, only OSIS 400c is not affected by the disconnection of the ribbon fibers. Some of receiving paths of the other OSISs are affected by the disconnection of ribbon fiber, and it is needed to switch the connection to the protection paths via the failover sub-module 490.

In fact, under normal circumstances, the optical signal SigC will be duplicated into two beams through the interconnect splitter 485 of the OSIS 400a and simultaneously sent to the normal path (i.e., the first lateral transmission optical signal to the west) and the protection path (i.e., the path RTc to the east of the second lateral transmission optical signal). When the optical signal SigC is transmitted to the east via the protection path, it will transit two nodes (the OSISs 400b and 400c) without passing through its internal interconnect splitters, and then transmitted to the OSIS 400d. When the optical signal SigC enters into the internal interconnect circuit of the OSIS 400d, it is duplicated, split to the east via the 1×2 interconnect splitter 483 and continuously transmitted to the next node (the OSIS 400e).

Finally, when the optical signal SigC enters into the internal interconnect circuit of the OSIS 400e as the destination, it is directly transmitted to the failover sub-module 490 of the OSIS 400e. At this time, the failover sub-module 490 switches the connection to the protection path, so the optical signal SigC will pass through and be transmitted to the 6×4 wavelength selective switch (i.e., the optical switching sub-module 460) of the OSIS 400e for wavelength selection and reception.

Accordingly, the optical switches 492, 494, 496 and 498 of the failover sub-module 490 in the OSIS 400a can receive respectively, through the normal fabric, the first lateral transmission optical signal from the corresponding one of the other OSISs 400b-400e. By receiving the second lateral optical signal via the protection fabric, one of the first lateral transmission optical signal and the second lateral transmission optical signal can be output, corresponding to the selective signal SS, to the optical switching sub-module 460. In this way, when the normal fabric is disconnected, or other failures causes the first lateral transmission optical signal disappeared, or intensity decreased, the corresponding optical switches 492, 494, 496 and 498 can switch to the protection path and perform signal transmission with the second lateral transmission optical signal.

Please refer to FIG. 6 again. As shown in FIG. 6, except the optical switches 492, 494, 496 and 498 in the failover sub-module 490, there are four tap photodetectors (tap PD) 491, 493, 495 and 497 disposed in the failover sub-module 490. As mentioned in the previous paragraphs, the 2×1 optical switches 492, 494, 496 and 498 are configured to receive the optical signals from the normal path (solid line) and the protection path (dash line) of each two OSISs in the east and the west, respectively.

As shown in the figure, the optical signals entering into the normal path and the protection path of the same 2×1 optical switches 492, 494, 496 and 498 are transmitted in the normal direction and reverse direction from the source terminal by being duplicated and split via utilizing the interconnect splitter 485 and 486. Thus, the data carried by the two optical signals is the same. The default switch setting of each 2×1 optical switch 492, 494, 496 and 498 is to allow the optical signals in the normal path to pass.

In addition, in some embodiments, the function of the tap PDs 491, 493, 495 and 497 is to convert around 2% of optical input power into the corresponding current value and then through analog-to-digital converter convert to the corresponding voltage value, such that the optical switches 492, 494, 496 and 498 can perform switch according to the voltage value respectively.

For example, when the voltage value is lower than a threshold value (i.e., a wire disconnected or a poor signal is detected), a micro-control unit (MCU) 410 in the OSIS 400a outputs signal SS to switch the corresponding 2×1 optical switches 492, 494, 496 and 498 to change to pass the optical signals of the protection path. Accordingly, the micro-control unit 410 can be configured to output the selective signal SS to the failover sub-module 490 in order to control the failover sub-module 490 to output the second lateral transmission optical signal when the intensity of the first lateral transmission optical signal is lower than the threshold value.

Figure 8B:
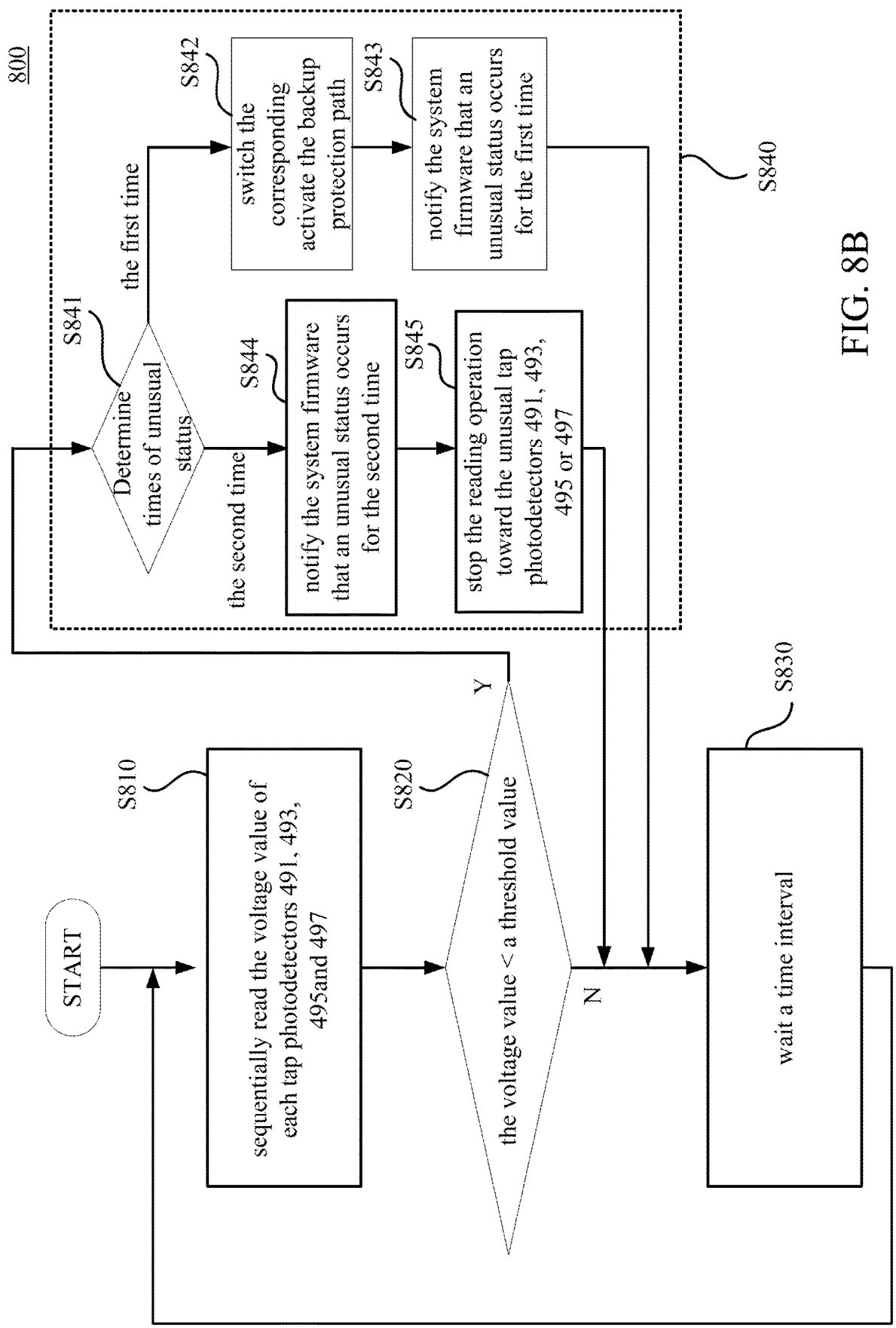
FIG. 8B is a flow chart of the determination method of the micro-control unit 410 in the polling mechanism in accordance with some embodiments of the present disclosure.

Specifically, there are two different ways for the micro-control unit 410 to determine when to activate the optical path switch. First, the first diagnostic mechanism for determining is a polling mechanism. Please refer to the FIG. 8B. FIG. 8B is a flow chart of the determination method 800 of the micro-control unit 410 in the polling mechanism in accordance with some embodiments of the present disclosure. In the polling mechanism, the micro-control unit 410 can continuously and actively supervise the voltage status of each tap PD 491, 493, 495 and 497. If the disconnection occurs, optical switches are performed to be switched. In some embodiments, the micro-control unit 410 can execute a driver program to perform the corresponding operation of the determination method 800.

As shown in FIG. 8B, the determination method 800 includes steps S810-S840. First, in step S810, it is to utilize the driver program in the micro-control unit 410 to read the voltage value of each tap PD 491, 493, 495 and 497 sequentially. Moreover, in step S820, it is to compare the voltage values read by the tap PDs 491, 493, 495 and 497 with the default threshold values respectively.

When the voltage values are larger than the threshold value, step 830 is performed and steps S810-S830 are repeated with a time interval (i.e., five seconds).

When the voltage values are less than the threshold value, step S840 is performed to execute the unusual processing procedure. Step S840 further includes steps S841-S845. First, in step S841, the number of times of unusual status is determined based on the system record of the system firmware. In other words, the driver program can determine whether the unusual status was detected for the first time or the second time.

When it is the first time that the driver program detects the voltage value of one of the tap PDs 491, 493, 495 and 497 is less than the default threshold value, the corresponding normal receiving path can be regarded as a fault condition and the step S842 and step S843 are performed. In the step S842, the micro-control unit 410 outputs the selective signal SS to switch the corresponding 2×1 optical switches 492, 494, 496 and 498, such that the optical signals of the backup protection path can pass. In S843, the micro-control unit 410 outputs the unusual information signal to notify the system firmware that one of the tap PDs 491, 493, 495 and 497 occurs an unusual status for the first time.

When it is the second time that the driver program detects the voltage value of one of the tap PDs 491, 493, 495 and 497 is continuously less than the default threshold value, the micro-control unit 410 won't perform switch to the corresponding 2×1 optical switches 492, 494, 496 and 498 and the step S844 and step S845 are performed. In the step S844, the micro-control unit 410 outputs the unusual information signal to notify the system firmware that one of the tap PDs 491, 493, 495 and 497 occurs an unusual status for the second time. Afterward, in step S845, the micro-control unit 410 stops the operation of polling toward the unusual tap PD 491, 493, 495 or 497 to read its status.

When the ribbon fiber is repaired, the system firmware notifies the driver to perform the recovery operation for switching all 2×1 optical switches 492, 494, 496 and 498 to the original normal path. It should be noted that in the determination method 800 because the micro-control unit 410 continuously interrogates the voltage status and makes a determination whether the path is disconnected, some of the computing resources of the micro-control unit 410 are consumed.

On the other hand, the second diagnostic mechanism for determining is a interrupt mechanism. In the interrupt mechanism, the micro-control unit 410 does not usually supervise the status of the tap PDs 491, 493, 495 and 497. When the disconnection occurs, the micro-control unit 410 is interrupted and triggered to confirm the states of the tap PDs 491, 493, 495 and 497 and the path switching of the corresponding 2×1 optical switches 492, 494, 496 and 498 is performed.

Figure 8D:
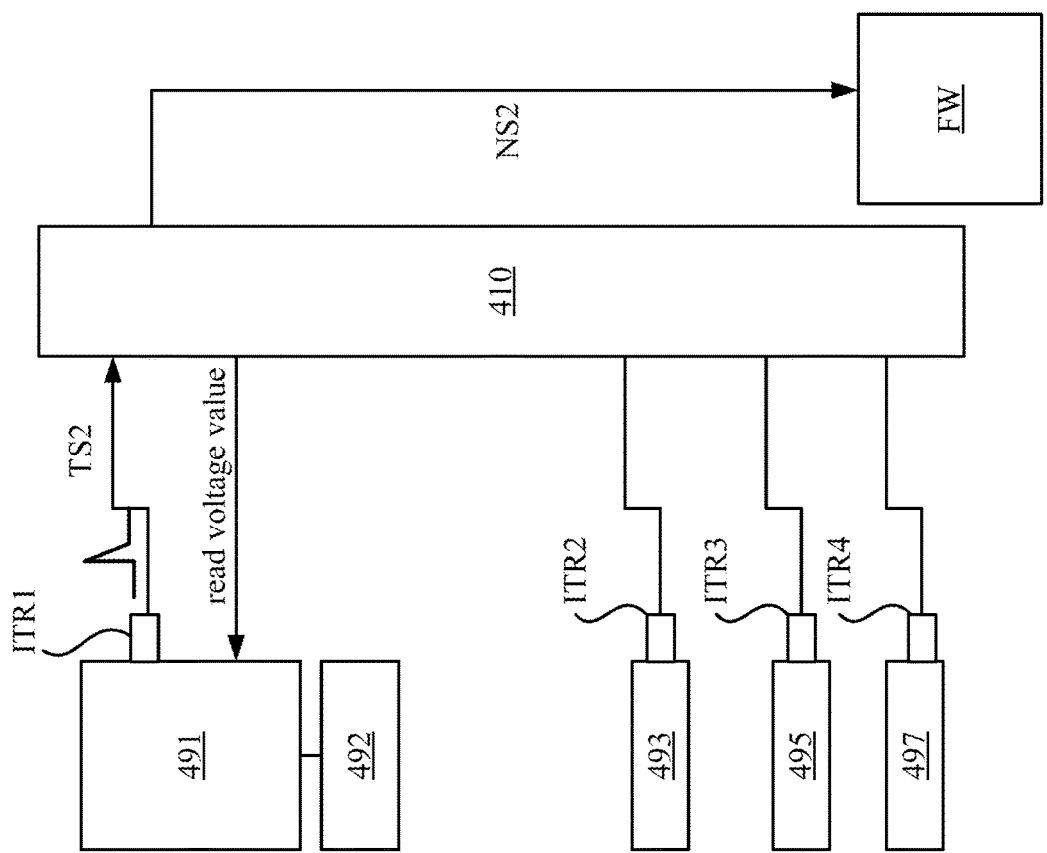
FIG. 8C and FIG. 8D are schematic diagrams of operations of the micro-control unit executing the interrupt mechanism in accordance with some embodiments of the present disclosure.
Figure 8C:
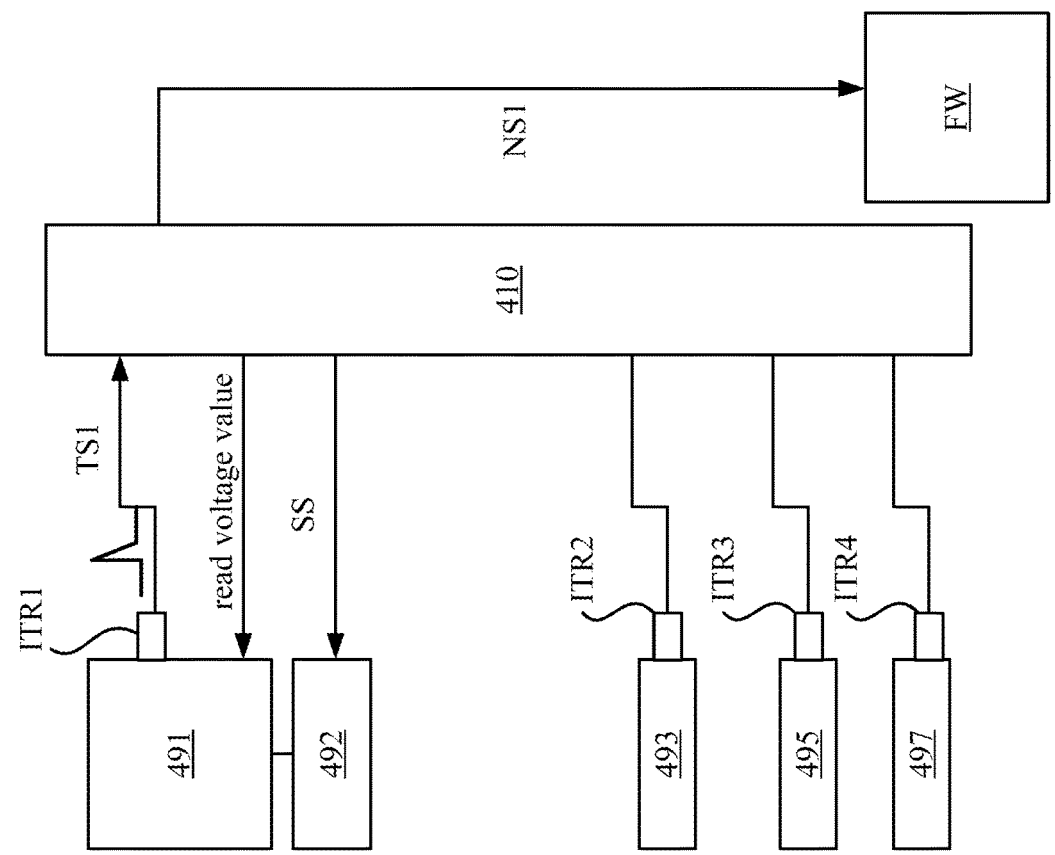

Please refer to FIG. 8C and FIG. 8D. FIG. 8C and FIG. 8D are schematic diagrams of operations of the micro-control unit 410 executing the interrupt mechanism in accordance with some embodiments of the present disclosure. As shown in FIG. 8C, the tap PDs 491, 493, 495, and 497 include interrupt pins ITR1-ITR4 connected to the micro-control unit 410 respectively. Taking the tap PD 491 as an example, when the voltage value of the tap PD 491 is less than the threshold value for the first time, the corresponding interrupt pins ITR1-ITR4 are triggered and a trigger signal TS1 is output to notify the micro-control unit 410. Upon receiving the trigger signal TS1, the micro-control unit 410 executes a corresponding driver program to perform operations similar to the determination method 800.

Specifically, at this time, the micro-control unit 410 first reads the voltage value of the tap PD 491 to confirm that it is less than the threshold value. When the voltage value is less than the threshold value, the micro-control unit 410 determines the amount of unusual status according to the system record of the system firmware FW.

When it is the first time that the micro-control unit 410 detects the voltage value of the tap PD 491 is less than the default threshold value, the normal receiving path can be regarded as a fault condition and the step S842 and step S843 are performed. In the step S842, the micro-control unit 410 outputs the selective signal SS to switch the corresponding 2×1 optical switches 492, such that the optical signals of the backup protection path can pass. In S843, the micro-control unit 410 outputs the unusual information signal NS1 to notify the system firmware FW that the tap PD 491 occurs an unusual status for the first time.

Similarly, as shown in FIG. 8D, when the voltage value of the tap PD 491 is less than the threshold value for the second time, the interrupt pin ITR1 is triggered again and a trigger signal TS2 is output to notify the micro-control unit 410. At this time, the micro-control unit 410 reads the voltage value of the tap PD 491 again to confirm that the value is less than the threshold value.

When it is the second time that the micro-control unit 410 detects the voltage value of one of the tap PD 491 is continuously less than the default threshold value, the micro-control unit 410 will not perform switch to the 2×1 optical switch 492 and the step S844 and step S845 are performed. In the step S844, the micro-control unit 410 outputs the unusual information signal NS2 to notify the system firmware FW that the tap PD 491 occurs an unusual status for the second time.

Similarly, when the ribbon fiber is repaired, the system firmware FW notifies the micro-control unit 410 and performs the recovery operation through the driver program to switch all 2×1 optical switches 492, 494, 496 and 498 to the original normal path.

In summary, through the polling mechanism illustrated in FIG. 8B or the interrupt mechanism illustrated in FIG. 8C and FIG. 8D, the micro-control unit 410 can control the failover sub-module 490 to selectively perform the optical signal transmission via the normal path or the protection path in order to implement an interconnect protection path design between the OSISs 400a-400e in the second tier network T2.

Such a result, when one ribbon fiber of the second tier network T2 is disconnected, the optical signals can still be transmitted to the destination OSISs 400a-400e via the protection path, so that the transmission of optical signals will not be affected.

Figure 9:
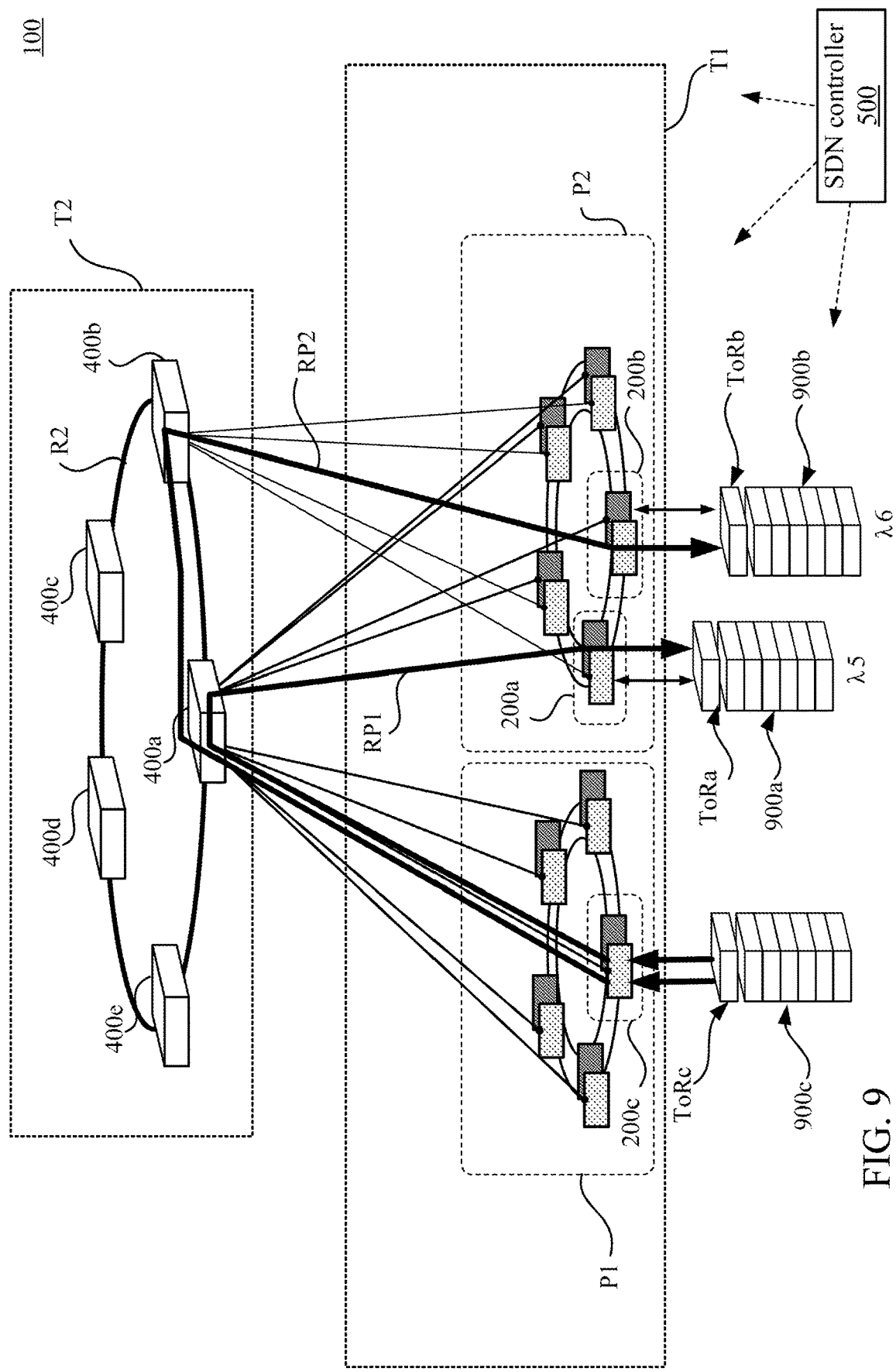
FIG. 9 is a schematic diagram of inter-Pods optical tunnel paths between the pods in accordance with some embodiments of the present disclosure.

Please refer to FIG. 9. FIG. 9 is a schematic diagram of inter-Pods tunnel paths between the pods in accordance with some embodiments of the present disclosure. In the embodiment in FIG. 9, the rack 900c in pod P1 will transmit optical signals to the racks 900a and 900b in another pod P2. The software-defined network controller 500 can be configured to build two inter-Pod optical tunnels. Specifically, the optical tunnel includes an optical transmission path and a selected wavelength. The optical tunnel between the rack 900c and the rack 900a is a path RP1 via the rack 900c passing through the ToR switch TORc, the OADS 200c, the OSIS 400a, the OADS 200a, and the ToR switch TORa to the rack 900a, and is formed by selecting wavelength λ5 to transmit optical signals.

On the other hand, the optical tunnel between the rack 900c and the rack 900b is a path RP2 via the rack 900c passing through the ToR switch TORc, the OADS 200c, the OSIS 400a, the OSIS 400b, the OADS 200b and the ToR switch TORb to the rack 900b, and is formed by selecting wavelength λ6 to transmit optical signals.

In order to build the two optical tunnels, it is necessary to set the OADSs 200a-200c along the path and the 6×4 wavelength selective switches (i.e., the optical switching sub-module 460) of the OSISs 400a and 400b to select a specific wavelength to pass.

Figure 10A:
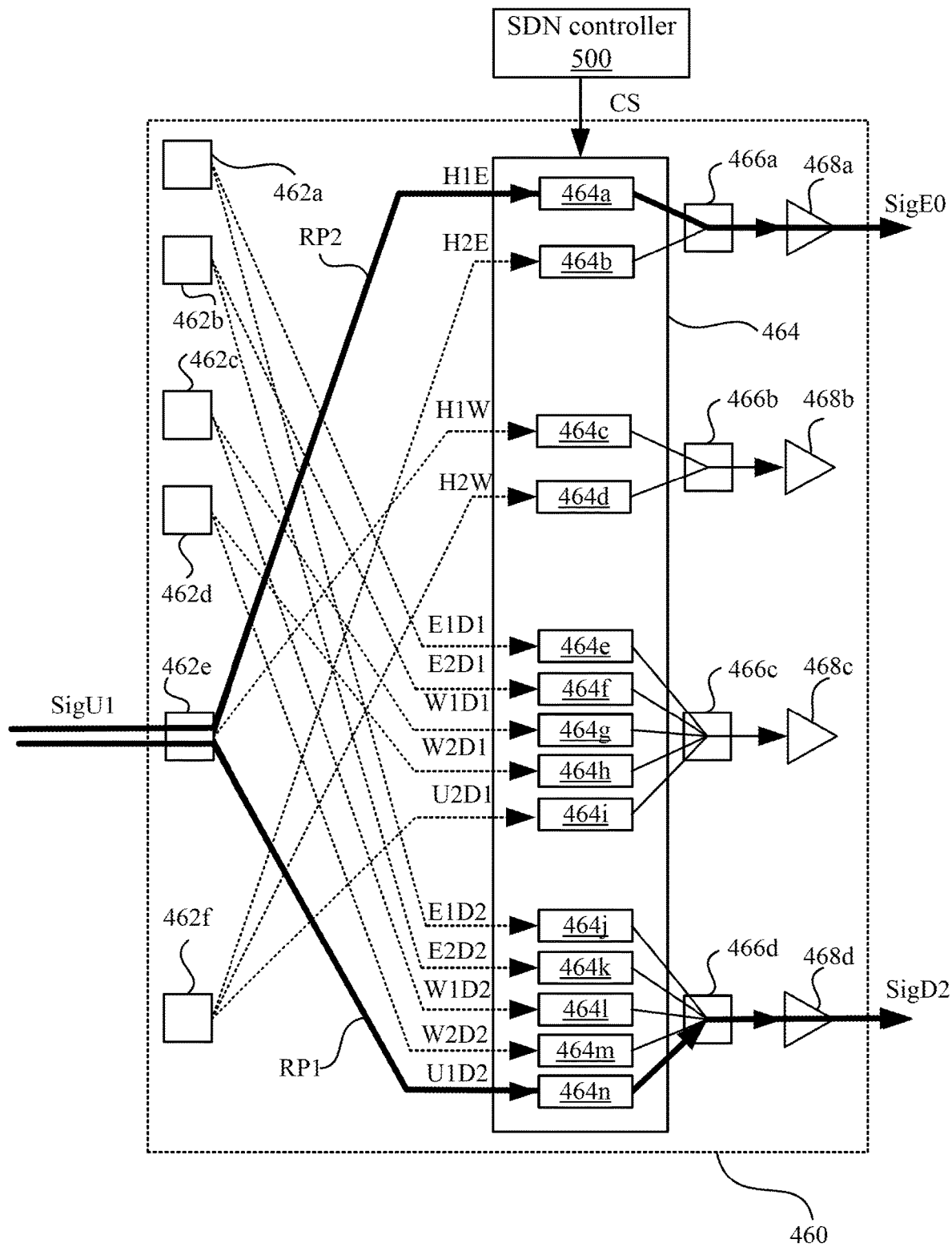
FIG. 10A and FIG. 10B are schematic diagrams of setup of the optical switching sub-modules of the optical switch interconnect sub-system, respectively, in accordance with some embodiments of the present disclosure.
Figure 10B:
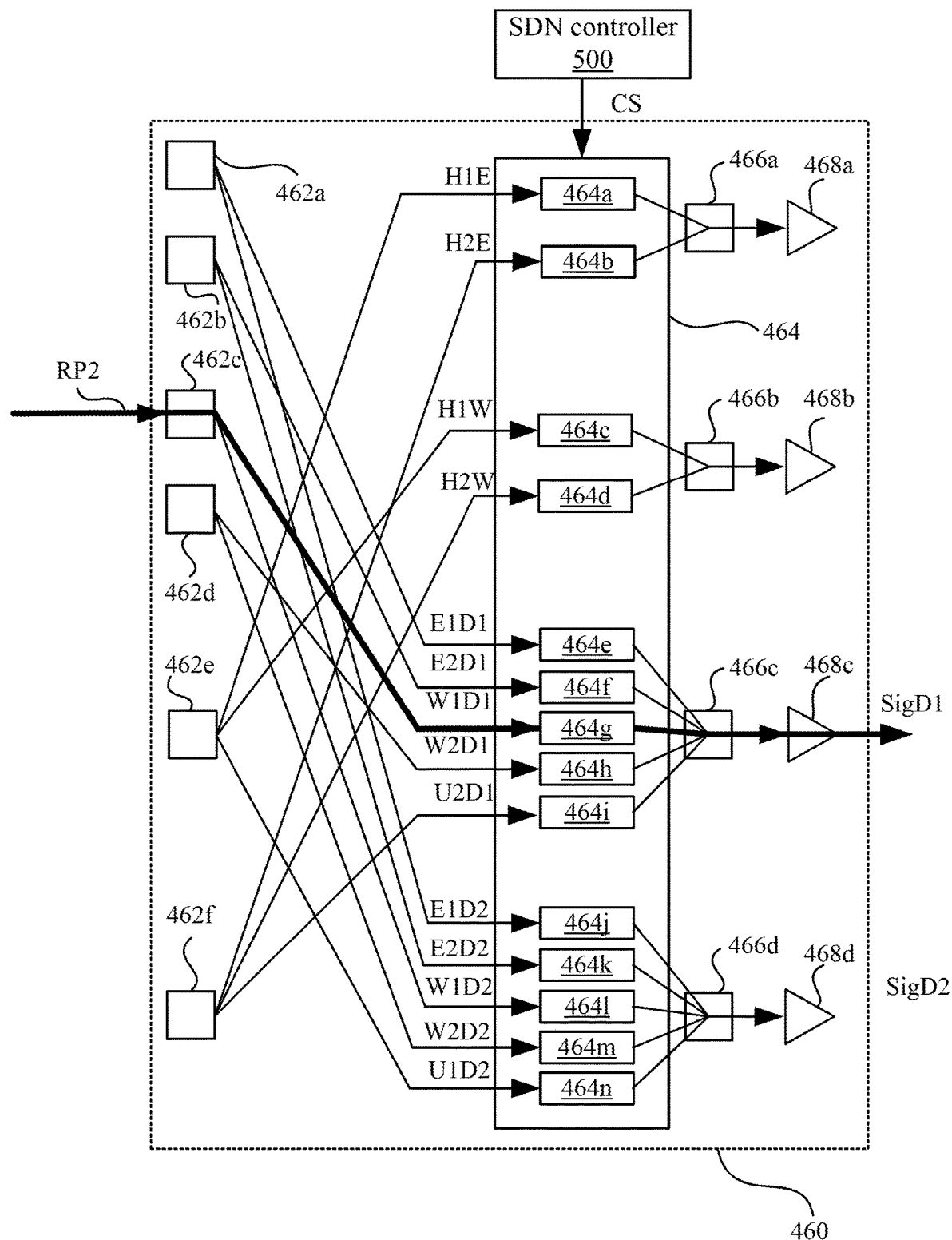

Please refer to FIG. 10A and FIG. 10B. FIG. 10A and FIG. 10B are schematic diagrams of the setup of the OSIS 400a and the optical switching sub-module 460 of the OSIS 400b, respectively, in accordance with some embodiments of the present disclosure. As shown in FIG. 10A, for the path RP1, the optical tunnel can be built by setting one 1×1 wavelength selective switch 464n of the OSIS 400a and one 1×1 wavelength selective switch corresponding to the 2×1 wavelength selective switch WSS21 in the second transmission module 220 of the OADS 200a at the destination.

On the other hand, as shown in FIG. 10A and FIG. 10B, for the path RP2, the optical tunnel can be built by setting the 1×1 wavelength selective switch 464a of the OSIS 400a, the 1×1 wavelength selective switch 464g of the OSIS 400b and one 1×1 wavelength selective switch corresponding to the 2×1 wavelength selective switch WSS11 in the first transmission module 210 of the OADS 200b at the destination.

In this way, in the process of transmission, first, the optical signals with the wavelengths λ5 and λ6 are transmitted, via the corresponding DWDM transceivers on the input-output port of the ToR switch ToRc on the rack 900c, to the corresponding add-port of the first transmission module 210 of the OADS 200c, combined into one optical fiber through the multiplexer 212, duplicated, split via 2×2 first splitter SP11, transmitted northward to the corresponding add-port in the OSIS 400a and after being combined into one composite optical signal SigU1 by the multiplexer BMUX1, transmitted to the optical switching sub-module 460. At this time, the optical signals with wavelength λ5 and λ6 are duplicated and split through the splitter 462e into three beams. One beam is transmitted eastward to other OSISs, another is transmitted westward to other OSISs, and finally the other is transmitted southward to the OADSs 200a and 200b at the destination pod P2.

The optical signal transmitted by the OADS 200a to the south destination pod P2 passes while the wavelength selective switch 464n selects the wavelength λ5 to pass, then duplicated and combined, by the 5×1 output combiner 466d, into one optical path, and then the optical power is amplified by the optical signal amplifier 468d. The splitter SPLT2 duplicates, splits the composite signal SigD2 and transmits it to each OADS in the destination pod P2.

As shown in FIG. 9, the optical signal transmitted to the second transmission module 220 of the OADS 200a passes while the 1×1 wavelength selective switch corresponding to a reception in the 2×1 wavelength selective switch (please refer to the wavelength selective switch WSS21 in FIG. 2) selects the wavelength λ5 to pass, and is transmitted to the demultiplexer 226. The optical signal with wavelength λ5 is transmitted from the fifth drop-port of the demultiplexer (can be referred to the demultiplexer 226 of the second transmission module 220 in FIG. 2) in the second transmission module 220 of the OADS 200a to the receiver of the corresponding DWDM transceiver on the input-output port of the ToR switch ToRa on the rack 900a. The optical signal transmission from rack 900c to 900a is accomplished.

On the other hand, the optical signal transmitted eastward passes while the wavelength selective switch 464a selects the wavelength λ6 to pass, then duplicated and combined, by the 2×1 output combiner 466a, into one optical path, and then the optical power is amplified by the optical signal amplifier 468a as the composite optical signal SigE0. The optical signal is transmitted eastward via the interconnection fabric module 480 between the OSIS 400a and 400b to the OSIS 400b.

As shown in FIG. 10B, after the optical signal is transmitted to the optical switching sub-module 460 of the OSIS 400b, the optical signal with wavelength λ6 is duplicated and split, by the 1×2 splitter 462c, into two beams. One beam of the optical signal is transmitted southward to each OADS in the destination pod P2, and the other beam of the optical signal is transmitted southward to each OADS in another pod.

The optical signal transmitted southward to the destination pod P2 passes while the wavelength selective switch 464g selects the wavelength λ6 to pass then duplicated and combined, by the 5×1 output combiner 466c, into one optical path, and then the optical power is amplified by the optical signal amplifier 468c as the composite optical signal SigD1. The splitter SPLT1 duplicates, splits the composite signal SigD1 and transmits it to each OADS in the destination pod P2.

The optical signal transmitted to the first transmission module 210 of the OADS 200b passes while the 1×1 wavelength selective switch corresponding to a reception in the 2×1 wavelength selective switch (please refer to the wavelength selective switch WSS11 in FIG. 2) selects the wavelength λ6 to pass, and is transmitted to the demultiplexer 216. The optical signal with wavelength λ6 is transmitted from the sixth drop-port of the demultiplexer (can be referred to the demultiplexer 216 of the first transmission module 210 in FIG. 2) to the receiver of the corresponding DWDM transceiver on the input-output port of the ToR switch ToRb on the rack 900b. The optical signal transmission from rack 900c to 900b is accomplished.

Figure 11A:
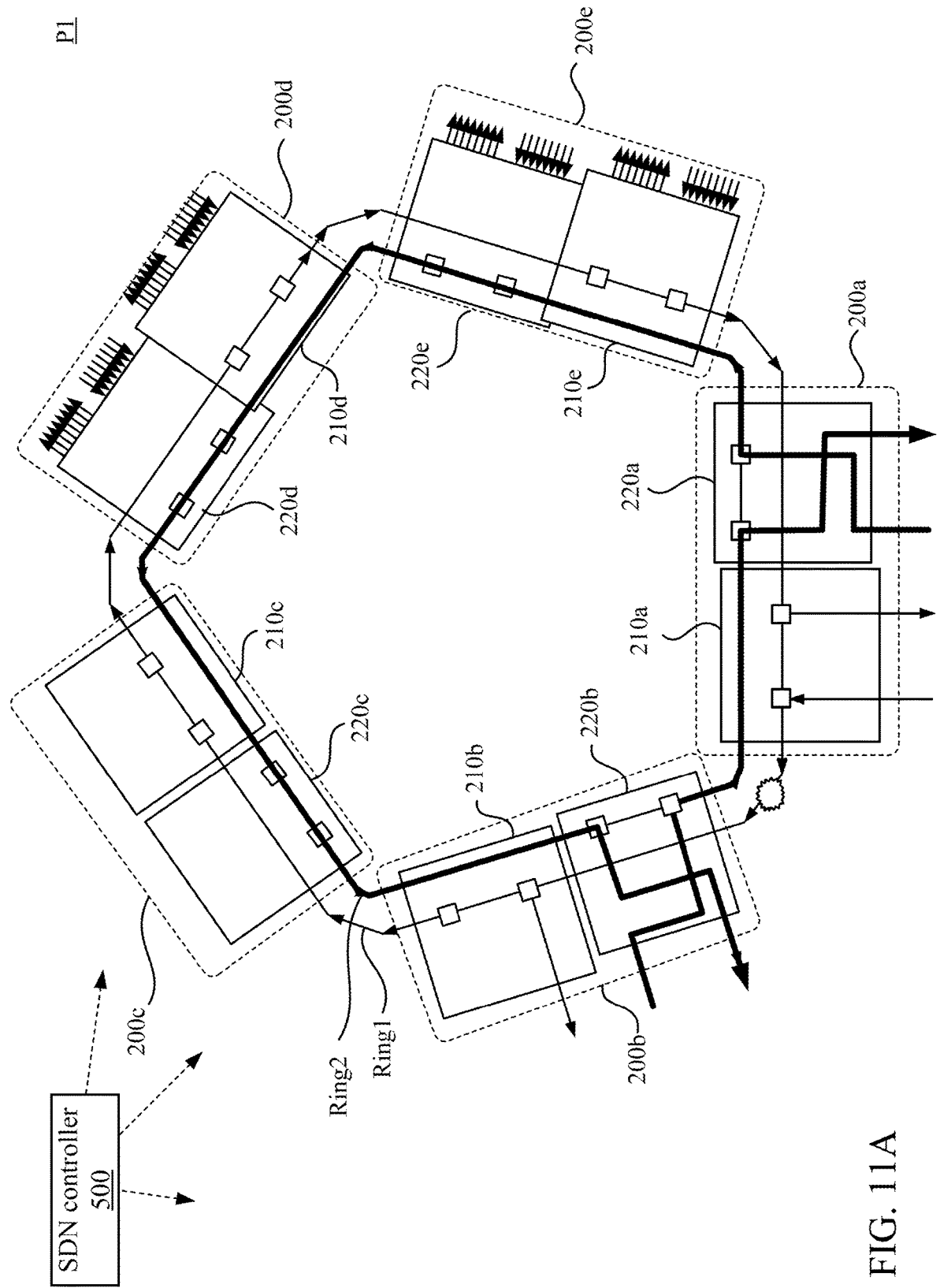
FIG. 11A is a schematic diagram of a design of a protection path in the pod of the first tier network in accordance with some embodiments of the present disclosure.

In addition, it should be noticed that except the protection paths of the OSISs 400a-400e in the foregoing second tier network T2, the path protection can also be implemented through the independent transmission rings Ring1 and Ring2 between each OADSs 200a-200e in the same pod P1 in the first tier network T1 and between the first tier network T1 and the second tier network T2. When the fiber is disconnected or the fiber connector is damaged, the protection path can be used to transmit the optical signal to ensure that the entire optical tunnel network is not affected by the fiber disconnected. For the sake of explanation, please refer to FIG. 11A. FIG. 11A is a schematic diagram of a design of a protection path in the pod P1 of the first tier network T1 in accordance with some embodiments of the present disclosure.

As shown in FIG. 11A, since each pod P1 in the first tier network T1 includes a plurality of independent transmission rings Ring1 and Ring2, when one of the rings (for example, the transmission ring Ring1) is disconnected, the optical signal transmission can be carried out through other transmission ring Ring2 to achieve the purpose of protection path. In addition, since the fibers of the transmission rings Ring1 and Ring2 are independently separated, the probability of simultaneous disconnection of the two independent fibers is very low.

In this embodiment, when the optical fiber of the transmission ring Ring1 corresponding to each of the first transmission modules 210 in the pod P1 is disconnected, the first transmission module 210 of some OADSs cannot transmit optical signals westward to other OADSs. For example, the first transmission module 210 of the OADS 200a cannot transmit optical signals westward to other OADSs 200b-200e in the same pod P1. At this time, the OADSs 200a-200e that cannot transmit the optical signals by utilizing the transmission ring Ring1, by the software-defined network controller 500 setting the corresponding ToR switch and the wavelength selective switch through which optical signals must pass on the path, transmit the optical signal via the second transmission module 220 using the transmission ring Ring2 to transmit optical signals eastward to other OADSs 200a-200e.

Furthermore, in fact, when the transmission ring Ring1 and Ring2 are simultaneously disconnected and the position where the disconnection meets specific criteria, by resetting the wavelength selective switches WSS11, WSS12, WSS21, WSS22 of each OADS in the pod and each ToR switch through the software-defined network controller 500, all the OADSs 200a-200e can interconnect with each other.

Figure 11B:
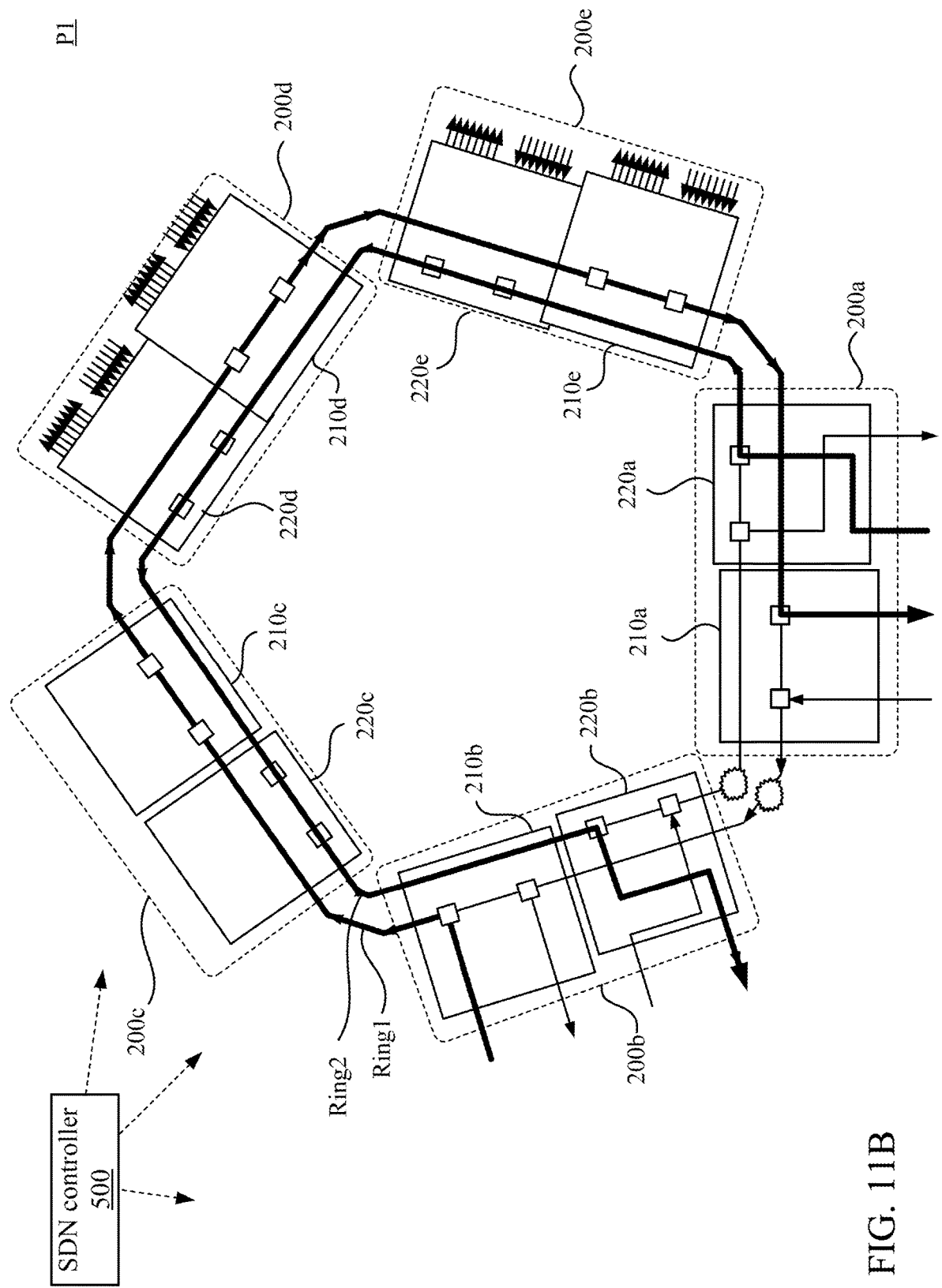
FIG. 11B is a schematic diagram of a design of a protection path in the pod of the first tier network T1 in accordance with some embodiments of the present disclosure.

Please refer to FIG. 11B. FIG. 11B is a schematic diagram of a design of a protection path in the pod P1 of the first tier network T1 in accordance with some embodiments of the present disclosure. As shown in FIG. 11B, when the transmission ring Ring1 and Ring2 are disconnected at the same connection point (i.e., between the OADSs 200a and 200b), and there is only one connection point in one pod P1 at which the two transmission rings Ring1 and Ring2 are disconnected at the same time, the affected OADSs 200a-200e can be reset, by the software-defined network controller 500 setting the ToR switch and the wavelength selective switch through which the optical signals pass on the path, and interconnect to other OADSs 200a-200e. Taking the OADSs 200a and 200b as examples, when the transmission ring Ring1 is disconnected, for the OADS 200a, the software-defined network controller 500 can set the ToR switch and the wavelength selective switch through which the optical signals pass on the path, so that the optical signal is transmitted with the wavelength of the second transmission module 220a eastward by the transmission ring Ring2 to the OADS 200b. On the other hand, for the OADS 200b, the software-defined network controller 500 can set the ToR switch and the wavelength selective switch through which the optical signals pass on the path, so that the optical signal is transmitted with the wavelength of the first transmission module 210b westward by the transmission ring Ring1 to the OADS 200a, and so on.

In other words, the software-defined network controller 500 can be configured to set correspondingly, when optical path of the OADS 200a to the OADS 200b on the transmission ring Ring1 is disconnected, the ToR switch and the wavelength selective switch through which the optical signals pass on the path in order to build the optical tunnel from the OADS 200a to the OADS 200b on the transmission ring Ring2 through the second transmission modules 220a-220e. In some embodiments, the software-defined network controller 500 can be configured to set correspondingly, when optical path of the OADS 200b to the OADS 200a on the transmission ring Ring2 is disconnected, the ToR switch and the wavelength selective switch through which the optical signals pass on the path in order to build the optical tunnel from the OADS 200b to the OADS 200a on the transmission ring Ring1 through the first transmission modules 210a-210e.

Figure 12:
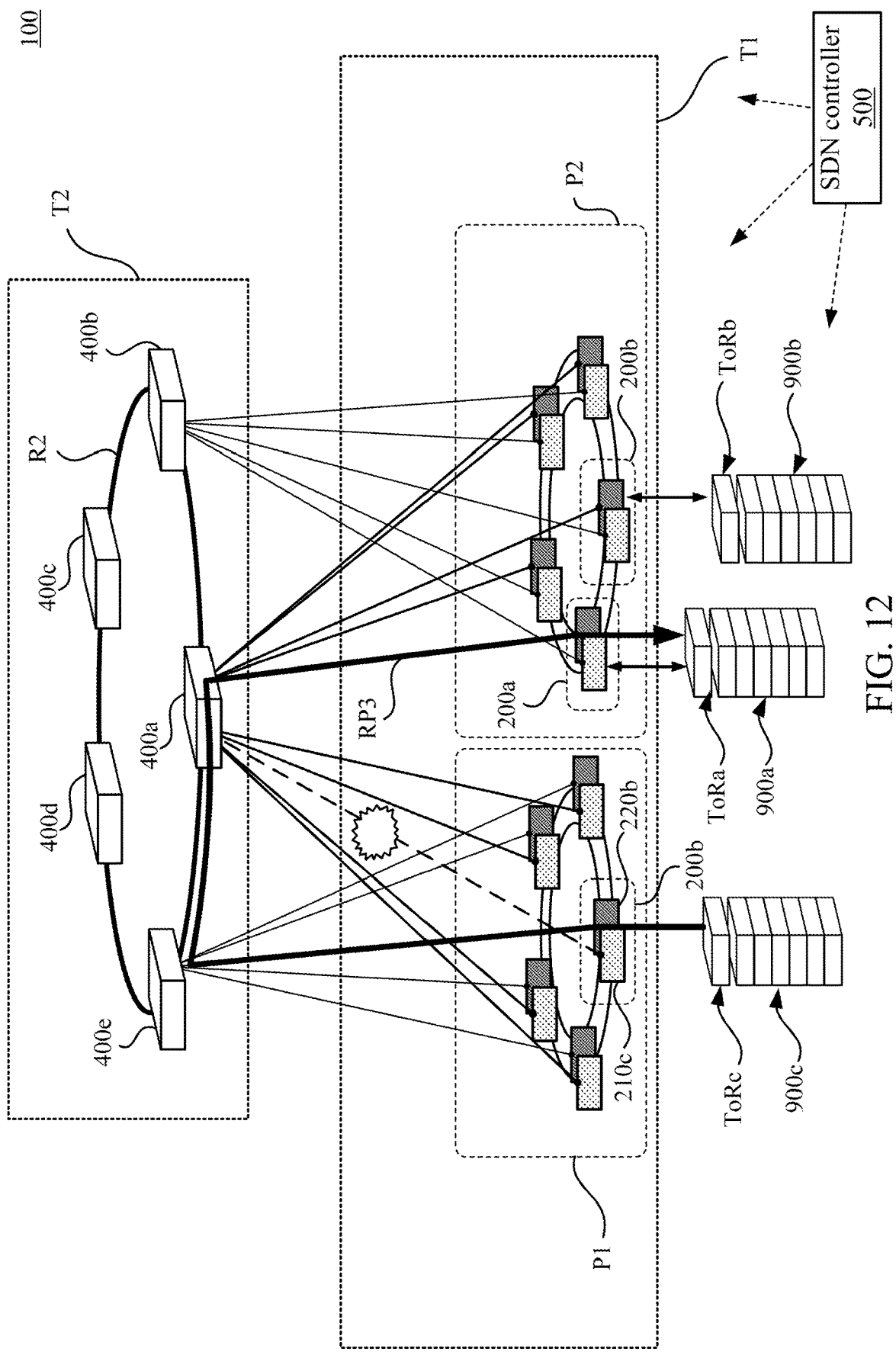
FIG. 12 is a schematic diagram of a design of a protection path between the first tier network and the second tier network in accordance with some embodiments of the present disclosure.

Please refer to FIG. 12. FIG. 12 is a schematic diagram of a design of a protection path between the first tier network T1 and the second tier network T2 in accordance with some embodiments of the present disclosure. As mentioned in the previous paragraphs, each OADSs 200a-200e is connected to the adjacent two OSISs 400a-400e in the second tier network T2 via optical fibers. For example, the first transmission module 210c and the second transmission module 220c of the OADS 200c having one pair of optical fiber separately are connected to the two adjacent OSISs 400a and 400e respectively. Thus, when the optical fiber connecting the OADS 200c to the OSIS 400a is disconnected, the OADS 200c can utilize another optical path to transmit the optical signals to the another OSIS 400e and then transit them to the destination OSIS 400a to achieve another purpose of the protection path.

Taking FIG. 12 as an example, the same with the embodiment in FIG. 9, in the present embodiment, the rack 900c in the pod P1 will transmit optical signals to the rack 900a in another pod P2. It is assumed that the optical fiber connecting the first transmission module 210c of the OADS 200c and the OSIS 400a is disconnected. The optical signals can be transmitted, through the software-defined network controller 500 setting the ToR switch and the wavelength selective switch through which the optical signals pass on the path to select the wavelength of the second transmission module 220 to transmit the optical signal, to another OSIS 400e and transited to the destination OADS 200a. As the path RP3 shown in the figure, under some circumstance, the optical signals may be transmitted first from the OSIS 400e to another OSIS 400a, and then from the OSIS 400a to the destination OADS 200a. The specific details of end-to-end transmission are described in the previous paragraphs and will not be described again.

In other words, the software-defined network controller 500 can further be configured to, when the optical path from the OADS 200c to the OSIS 400a is disconnected, correspondingly set the ToR switch ToRc to build the optical tunnel from the OADS 200c to the OSIS 400a (i.e., the path RP3). Similarly, the software-defined network controller 500 can also be configured to, when the optical path from the OADS 200c to the OSIS 400e is disconnected, correspondingly set the ToR switch ToRc to build the optical tunnel from the OADS 200c to the OSIS 400a.

As a result, whether the optical fiber inside the first tier network T1 is disconnected, the optical fiber inside the second tier network T2 is disconnected, or the longitudinal transmission fiber between the first tier network T1 and the second tier network T2 is disconnected, the intelligence-defined optical tunnel network system 100 can build optical tunnels through the redundant path to realize signal transmission between the optical nodes to achieve data transmission between different servers in different racks.

In some embodiments of the present disclosure, each of the wavelength selective switches may be implemented by an array design consisted of one or more 1×1 (1 input and 1 output) wavelength blockers (WB). The wavelength blocker can be used by digital light processor (DLP) technology to increase the switching speed. In some embodiments, the array switching time is only about 100 microseconds (ps), so there is a faster and more instant all-optical data center network switching capability.

In summary, in various embodiments of the present disclosure, a new network structure is proposed, so that the intelligence-defined optical tunnel network system 100 can utilize the same wavelength repeatedly to save wavelength resources. In addition, in the first tier network T1, a ring-shaped structure is adopted, the amount of optical nodes in a single pod can be multiplied arbitrarily without replacing the internal structure, and the amount of transmission rings in the same pod can be multiplied as well. The incremental structure with more flexibility is achieved and has better expandability. For example, in the embodiment shown in FIG. 1, the first tier network T1 includes four pod P1-P4, but the present disclosure is not limited thereof. If the whole system needs to accommodate the information exchange between more racks, the amount of the pod can be increased under the condition of not changing the whole network structure, for instance, adding the fifth pod or furthermore adding the sixth pod, and so on. Furthermore, in the embodiment shown in FIG. 1, the amount of optical nodes included in the pod P1 is five, for example, five OADSs 200a-200e, but the present disclosure in not limited thereof. If the whole system needs to accommodate the information exchange between more racks, one or more nodes can be added to some pods (or all pods) under the condition of not changing the whole network structure. For example, when there is a need for expansion, the pod P1 can further include a new optical node, having a total of six optical nodes, and the pods P2-P4 can remain having five optical nodes. If there is a need for expansion, new optical nodes can be added to other pods (i.e., the pod P2), and so on. Through this, the incremental structure is disposed.

On the other hand, the optical switch paths in the second tier network T2 are simplified, and the protection paths between each of optical fibers transmission are designed. Whether the optical fiber inside the first tier network T1, inside the second tier network T2 or between the first tier network T1 and the second tier network T2 is disconnected, the intelligence-defined optical tunnel network system 100 can perform optical signal transmission through the protection paths.

In this way, the intelligence-defined optical tunnel network system 100 with low latency, high bandwidth, and low power consumption can be realized. Provide property of reliability, expandability and wavelength reusability, and low wiring complexity. In addition, based on the characteristic of data rate transparency of the optical transmission system, the optical tunnel network can carry optical signals of any transmission rate within a certain range without changing the design of the optical component. Therefore, during upgrading the system, the intelligence-defined optical tunnel network system 100 only needs to replace the 10G DWDM transceiver with 1000 DWDM transceiver for upgrading the wavelength transmission rate from 10 Gbit/s to 100 Gbit/s, which dramatically increases the flexibility of system transmission rate and saves a lot cost of hardware equipment for upgrading.

Figure 13:
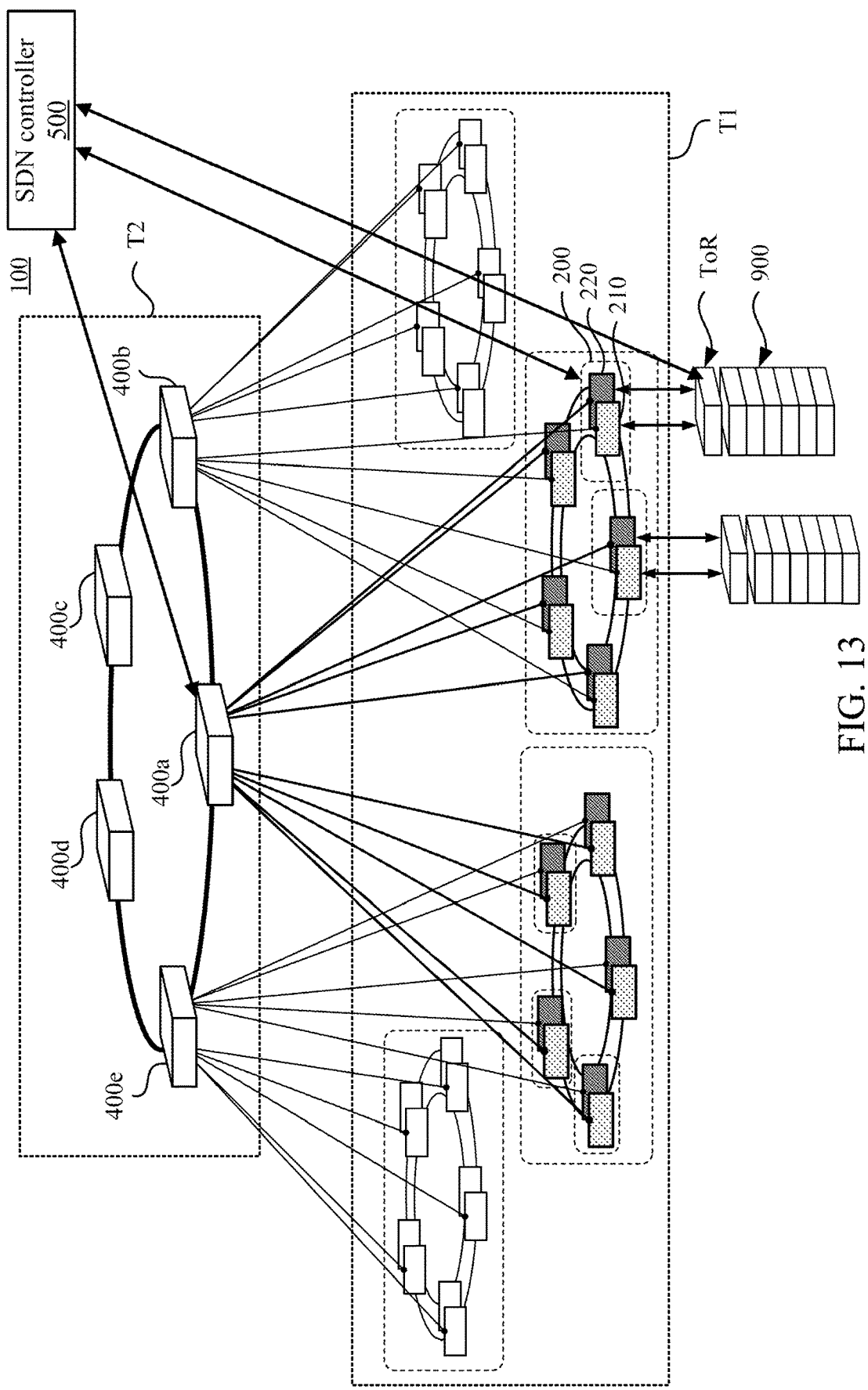
FIG. 13 is a schematic diagram of an intelligence-defined optical tunnel network system in accordance with some embodiments of the present disclosure.

Please refer to FIG. 13. FIG. 13 is a schematic diagram of an intelligence-defined optical tunnel network system 100 in accordance with some embodiments of the present disclosure. As shown in FIG. 13, the intelligence-defined optical tunnel network system 100 further includes a software-defined networking controller (SDN controller) 500. Operationally, the SDN controller 500 sends commands to the optical switches (e.g., optical switch interconnect sub-system 400a, optical add-drop sub-system 200) and the top-of-rack switch ToR.

In some embodiments, the SDN controller 500 may be an integrated circuit such as a micro controller, a central processing unit (CPU), a microprocessor, a digital signal processor (DSP), an application specific integrated circuit (ASIC), a complex programmable logic device (CPLD), a field-programmable gate array (FPGA), a logic circuit or computer, configured to perform calculations or data processing.

Configurationally, the SDN controller 500 coupled to the optical switch interconnect sub-system, the optical add-drop sub-system and the top-of-rack switch, as the optical switch interconnect sub-system 400a, the optical add-drop sub-system 200 and the top-of-rack switches TOR illustrated in figure. For the convenience and clarity, the coupling relationship between the SDN controller 500 and some elements are not illustrated in FIG. 13. Specifically, the SDN controller 500 may be coupled to all the optical switch interconnect sub-systems, the optical add-drop sub-systems and top-of-rack switches through Ethernet cables. In addition, in the description contents and figures of the following embodiments, for the convenience and clarity, the optical switch interconnect sub-system OSIS is used to represent any not specific optical switch interconnect sub-system, and the optical add-drop sub-system OADS is used to represent any not specific optical add-drop sub-system OADS. For example, the optical switch interconnect sub-system OSIS may be any one of the 5 optical switch interconnect sub-systems 400a-400e in FIG. 1. The optical add-drop sub-system OADS may be any one of the 25 optical add-drop sub-systems 200 in FIG. 1.

Figure 14:
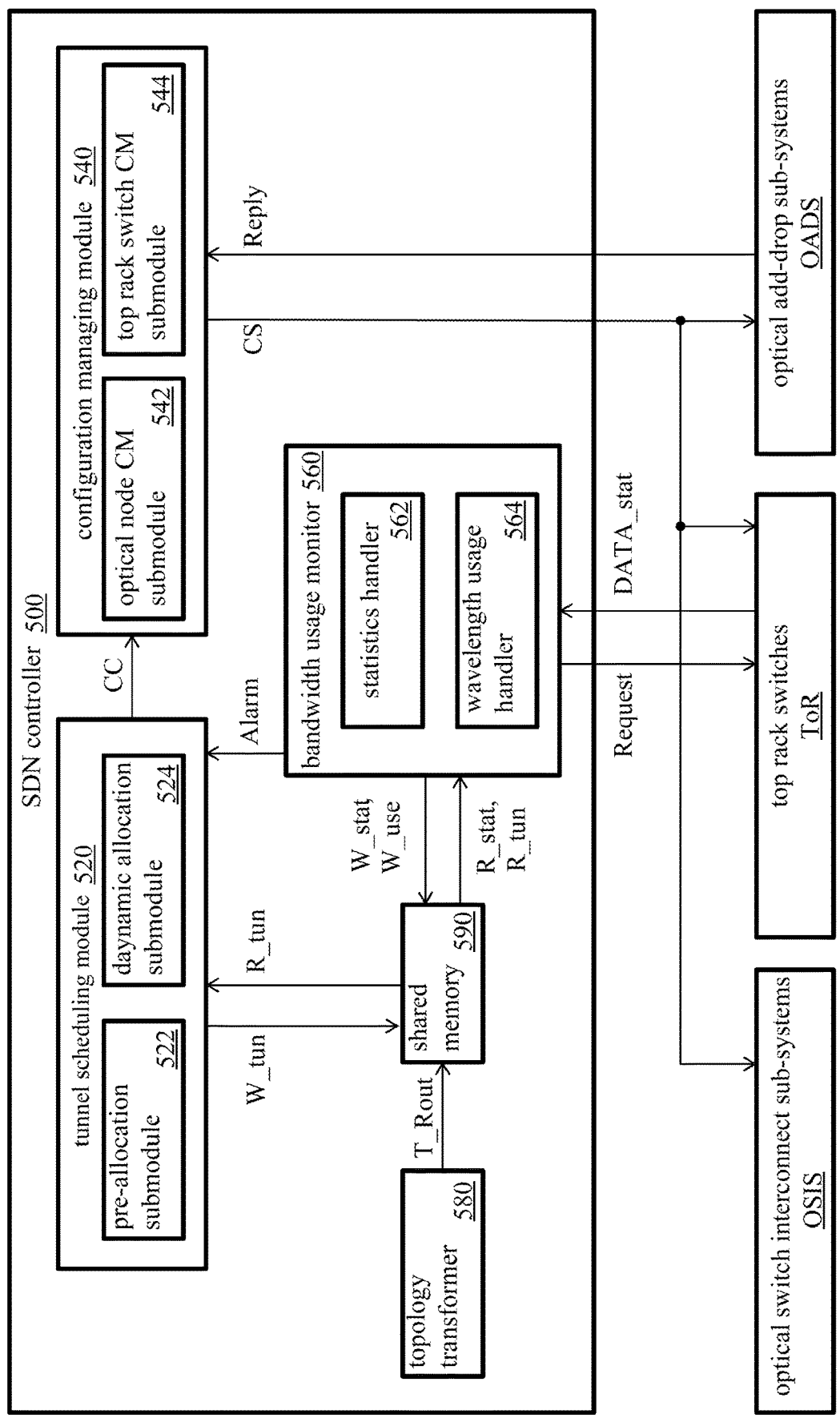
FIG. 14 is a functional block diagram of a SDN controller in accordance with some embodiments of the present disclosure.

Please refer to FIG. 14. FIG. 14 is a functional block diagram of a SDN controller 500 in accordance with some embodiments of the present disclosure. As shown in FIG. 14, the SDN controller 500 includes a tunnel scheduling module 520, a configuration managing module 540, a bandwidth usage monitor 560, a topology transformer 580 and a shared memory 590. The tunnel scheduling module 520 includes pre-allocation submodule 522 and a dynamic allocation submodule 524. The configuration managing module 540 includes an optical node CM submodule 542 and a top-of-rack switch CM submodule 544. The bandwidth usage monitor 560 includes a statistics handler 562 and a wavelength usage handler 564.

Configurationally, the tunnel scheduling module 520 is coupled to the configuration managing module 540, the bandwidth usage monitor 560 and the shared memory 590. The bandwidth usage monitor 560 is coupled to the tunnel scheduling module 520 and the shared memory 590. The topology transformer 580 is coupled to the shared memory 590. In some embodiments, the configuration managing module 540 and the bandwidth usage monitor 560 include executable software logic instructions, the software logic instructions are loaded to the processing circuit (e.g., processor, control unit or system on a chip (SoC)) of the SDN controller 500 and performed by the processing circuit. The processing circuit performing the configuration managing module 540 are coupled to the optical switch interconnect sub-systems OSIS—optical add-drop sub-systems OADS and top-of-rack switches ToR, The processing circuit performing the bandwidth usage monitor 560 are coupled to the top-of-rack switches ToR. The configuration managing module 540 and the bandwidth usage monitor 560 may be performed by the same or the different processing circuit.

Operationally, the topology transformer 580 is configured to calculate a routing path table T_Rout according to a topology data, and to store the routing path table T_Rout and the topology data to the shared memory 590. The topology data includes a number of optical nodes and a distribution of optical nodes. For example, in the embodiments of FIG. 13, the intelligence-defined optical tunnel network system 100 includes at least 30 optical nodes, 5 optical switch interconnect sub-systems OSIS and 25 optical add-drop sub-systems OADS, respectively. The routing path table T_Rout includes multiple routing paths of any one of the optical add-drop sub-systems OADS to another one. One routing path is one transmitting path of the optical signal in one optical tunnel, as the path RP1 shown in FIG. 9. In other words, the routing path table T_Rout includes all the routing paths that may exist between any one of the optical add-drop sub-systems and the other optical add-drop sub-systems in the intelligence-defined optical tunnel network system 100. About the routing path table T_Rout will be described in following.

The tunnel scheduling module 520 is configured to plan and build the optical tunnel network according to the routing path table T_Rout, and to transmit a control command CC to the configuration managing module 540 according to the data of the routing paths and the wavelengths of the optical tunnels in the optical tunnel network that is planned and built. The configuration managing module 540 is configured to output control signal CS to the optical switches (i.e., optical switch interconnect sub-system OSIS and optical add-drop sub-system OADS) according to the control command CC. The bandwidth usage monitor 560 is configured to receive a flow statistics DATA_stat of the intelligence-defined optical tunnel network system 100 from the top-of-rack switches ToR, and to calculate a bandwidth usage rate according to the flow statistics DATA_stat. If the bandwidth usage rate exceeds a preset interval (i.e., when the bandwidth usage rate is too high or too low), the bandwidth usage monitor 560 is configured to transmit a load notification Alarm to the tunnel scheduling module 520. The tunnel scheduling module 520 is further configured to replan the optical tunnel network according to the bandwidth usage rate and the optical tunnel load notification to adjust the control command CC.

Furthermore, the tunnel scheduling module 520 is further configured to store an optical tunnel network configuration to the shared memory 590 and/or to read the optical tunnel network configuration from the shared memory 590. The optical tunnel network configuration includes multiple optical tunnels. Each of the optical tunnels includes one routing path and one wavelength. In other words, the optical tunnel network configuration includes the routing paths and wavelengths used by the optical tunnels in the whole intelligence-defined optical tunnel network system 100, and the optical tunnels passed through the dataflows. The optical tunnel network configuration is configured to arrange the optical tunnels passed through the dataflows. Specifically, the tunnel scheduling module 520 stores the optical tunnel network configuration to the shared memory 590 via a writing command W_tun. The tunnel scheduling module 520 read the optical tunnel network configuration from the shared memory 590 via a reading command R_tun. The bandwidth usage monitor 560 is also configured to store the flow statistics DATA_stat and the bandwidth usage rate to the shared memory 590 and/or to read the flow statistics DATA_stat and the optical tunnel network configuration from the shared memory 590. Specifically, the bandwidth usage monitor 560 stores the flow statistics DATA_stat to the shared memory 590 via a writing command W_stat, and writes the bandwidth usage rate into the shared memory 590 via a writing command W_use. The bandwidth usage monitor 560 reads the flow statistics DATA_stat from the shared memory 590 via a reading command R_stat, and obtains the optical tunnel network configuration via the reading command R_tun.

About the detailed description of the tunnel scheduling module 520, please refer to FIG. 15A and FIG. 15B. The FIG. 15A and FIG. 15B are detailed functional block diagram of a SDN controller 500 in accordance with some embodiments of the present disclosure. As shown in FIG. 15A, when the intelligence-defined optical tunnel network system 100 is initialized, the pre-allocation submodule 522 in the tunnel scheduling module 520 is configured to plan the initial preset optical tunnel network according to the routing path table T_Rout. The initial preset optical tunnel network that is planned includes multiple optical tunnels. The multiple optical tunnels include multiple sets of routing paths and wavelengths. Next, the pre-allocation submodule 522 transmits the optical node control command CC_opt to the optical node CM submodule 542 according to the initial preset optical tunnel network that is planned, and receives a reply message Reply representing successfully constructed and returned by the optical node CM submodule 542. Next, the pre-allocation submodule 522 transmits a top-of-rack switch control command CC_ToR to the top-of-rack switch CM submodule 544 according to the routing paths and wavelengths of the optical tunnels that is planned. In addition, after the optical tunnels are built, the pre-allocation submodule 522 stores the optical tunnel network configuration to the shared memory 590 via the writing command W_tun.

For example, please refer to FIG. 16. FIG. 16 is a schematic diagram of optical tunnels between any one of the optical add-drop sub-system OADS(x) and another one of the optical add-drop sub-system OADS(x+1)~OADS(x+24) in the optical tunnel network build by the pre-allocation submodule 522 in accordance with some embodiments of the present disclosure. In this embodiment, one pod includes 5 optical add-drop sub-systems (e.g., the pod P1 includes OADSx, OADSx+1, OADSx+2, OADSx+3, and OADSx+4). The intelligence-defined optical tunnel network system 100 has total 5 pods P1~P5. Each of the optical add-drop sub-system OADS uses 8 different wavelengths and 8 corresponding paths to build 8 optical tunnels. As shown in FIG. 16, the optical add-drop sub-system OADS(x) uses 8 wavelengths, b1, b2, r3, r4, b5, b6, r7 and r8, to build 8 optical tunnels. It should be noted that, the source terminal and the destination terminal of each optical tunnel are used the same independent transmission ring (e.g., the first transmission ring Ring1 or the second transmission ring Ring2 in FIG. 3A). In the embodiment, for the convenience and clarity of explanation, merely two transmission rings Ring1 and Ring2 is taken as example, but the number of the transmission rings are not limited. The wavelengths of the first frequency band in the first transmission ring Ring1 are all represented by b, such as b1~b8, and the wavelengths of the second frequency band in the second transmission ring Ring2 are all represented by r, such as r1~r8. In addition, in the description contents and figures of the present embodiment, for the convenience and clarity of explanation, if an element number or signal number is used without a numerical index indicating the element number or signal number, it means that the element number or signal number refers to any element or signal that is not specific to the element or signal group. For example, the optical add-drop sub-system OADS(x) may be any one of the 25 optical add-drop sub-systems, and the OADS(x+5) represents the optical add-drop sub-system using the same wavelength as the optical add-drop sub-system OADS(x) and being in the first pod on the east side of the optical add-drop sub-system OADSx, the OADS(x+10) represents the optical add-drop sub-system using the same wavelength as the optical add-drop sub-system OADS(x) and being in the second pod on the east side of the optical add-drop sub-system OADSx. And so on, the OADS (x+20) represents the optical add-drop sub-system using the same wavelength as the optical add-drop sub-system OADS(x) and being in the fourth pod on the east side (the first pod on the west side) of the optical add-drop sub-system OADSx.

One way to build the intra-pod optical tunnels by the pre-allocation submodule 522 is to allocate four different wavelengths to the optical add-drop sub-system (e.g., OADS (x)) in order to build the optical tunnels to the four optical add-drop sub-systems (e.g., OADS(x+1)~OADS(x+4)) in the same pod (e.g., P1). For example, the wavelength b1 is used to the optical tunnel to the first optical add-drop sub-system, OADS(x+4), on the west side of the optical add-drop sub-system OADS(x). The wavelength b2 is used to the optical tunnel to the second optical add-drop sub-system, OADS(x+3), on the west side of the optical add-drop sub-system OADS(x). The wavelength r3 is used to the optical tunnel to the first optical add-drop sub-system, OADS(x+1), on the east side of the optical add-drop sub-system OADS(x). The wavelength r4 is used to the optical tunnel to the second optical add-drop sub-system, OADS (x+2), on the east side of the optical add-drop sub-system OADS(x). And one way to build the inter-pod optical tunnels by the pre-allocation submodule 522 is to allocate another four different wavelengths to the optical add-drop sub-system (e.g., OADS(x)) in order to build the optical tunnels to the other four optical add-drop sub-systems (e.g., OADS(x+5), OADS(x+10), OADS(x+15) and OADS(x+ 20)) in the different pods (e.g., P2~P5). For example, the wavelength r7 is used to the optical tunnel to the optical add-drop sub-system OADS(x+5) in the first pod on the east side of the optical add-drop sub-system OADS(x). The wavelength r8 is used to the optical tunnel to the optical add-drop sub-system OADS(x+10) in the second pod on the east side of the optical add-drop sub-system OADS(x). The wavelength b6 is used to the optical tunnel to the optical add-drop sub-system OADS(x+15) in the third pod on the east side (or the second pod on the west) of the optical add-drop sub-system OADS(x). The wavelength b5 is used to the optical tunnel to the optical add-drop sub-system OADS(x+20) in the fourth pod on the east side (or the first pod on the west) of the optical add-drop sub-system OADS (x). The wavelengths used in all the optical tunnels starting from the optical add-drop sub-system OADS(x) built by the pre-allocation submodule 522 is shown as Table 3.

TABLE 3

| type of routing path | destination | wavelength |
| --- | --- | --- |
| intra-pod | OADS(x + 4) | b1 |
| intra-pod | OADS(x + 3) | b2 |
| intra-pod | OADS(x + 1) | r3 |
| intra-pod | OADS(x + 2) | r4 |
| inter-pod | OADS(x + 5) | r7 |
| inter-pod | OADS(x + 10) | r8 |
| inter-pod | OADS(x + 15) | b6 |
| inter-pod | OADS(x + 20) | b5 |

In the embodiment of FIG. 17, as the x being 1, the optical add-drop sub-system OADS1 is taken as example, and described with accompany of the wavelengths allocated to the transmission ring Ring1 and Ring2 in FIG. 3A. As the frequency band including the wavelengths λ1-λ8 used by the first transmission module 210 of the optical add-drop sub-system 200a shown in FIG. 3A, the wavelengths b1~b8 of the first frequency band in the transmission ring Ring1 in the optical add-drop sub-system OADS1 in FIG. 17 are λ1-λ8. For another example, the frequency band including the wavelengths λ9-λ16 used by the second transmission module 220 of the optical add-drop sub-system 200a shown in FIG. 3A, the wavelengths r1~r8 of the second frequency band in the transmission ring Ring2 in the optical add-drop sub-system OADS1 in FIG. 17 are λ9-λ16. In other words, the wavelengths allocated to the 8 optical tunnels built by the optical add-drop sub-system OADS1 are shown in FIG. 17, about the optical tunnels of intra-pod, the optical add-drop sub-system OADS1 is allocated using λ1, λ2, λ11 and λ12 to build the optical tunnels to the optical add-drop sub-system OADS5, OADS4, OADS2 and OADS3. About the optical tunnels of inter-pod, the optical add-drop sub-system OADS1 is allocated using λ5, λ6, λ15 and λ16 to build the optical tunnels to the optical add-drop sub-system OADS21, OADS16, OADS6 and OADS11.

Through the optical tunnel configuration above, there is an optical tunnel connected from every optical add-drop sub-system OADS to the other arbitrary OADS in the same pod, and there is an optical tunnel connected from every optical add-drop sub-system OADS to ones of OADS in the other arbitrary pods. Therefore, by using the technology of tunnel relay, two optical add-drop sub-systems OADS without optical tunnel directly connected are be able to connect by tunnel relay through at most two optical tunnels having been built, and so on to build all the connection tunnel from all racks to all other racks. The specific example may be referenced to the detailed operation about the configuration managing module 540 described in following. The algorithm executed by the pre-allocation submodule 522 to build the optical tunnel network is shown in FIG. 18. It should be noted that, the way to build the optical tunnel network by the pre-allocation submodule 522 is not limited to this algorithm, all the method that may let the servers in all the racks transmit data to the servers in all the other racks through the basic optical tunnels built by the pre-allocation submodule 522 or through the way of tunnel relay is disclosed by the present content.

In summary, the relationship of exchanging information between the pre-allocation submodule 522 and the other modules is shown in FIG. 15A. The pre-allocation submodule 522 will send the control command CC_opt of building the optical tunnel network to the configuration managing module 540, and after receives the reply message Reply representing successfully constructed, the pre-allocation submodule 522 will send the top-of-rack switch control command CC_ToR of updating the flow table to the top-of-rack switch CM submodule 544. And all the setting to the intelligence-defined optical tunnel network system 100 (e.g., optical tunnel network configuration) is recorded to the shared memory 590. As the operation flowchart S19 of the pre-allocation submodule 522 shown in FIG. 19, the method and/or strategy of allocation is firstly read from the shared memory 590, then all the paths of optical tunnel and the used wavelengths are calculated according to the method and/or strategy of allocation, and at last the related setting for the optical switches (optical switch interconnect sub-systems OSIS and optical add-drop sub-systems OADS) and top-of-rack switches ToR is made.

In some embodiments, as shown in FIG. 15B, the dynamic allocation submodule 524 in the tunnel scheduling module 520 is configured to receive the load notification Alarm of the bandwidth usage monitor 560, and to read the optical tunnel network configuration from the shared memory 590 via the reading command R_tun. The dynamic allocation submodule 524 is configured to replan the optical tunnel network configuration according to the load notification Alarm and optical tunnel network configuration, to adjust and to transmit the optical node control command CC_opt to the optical node CM submodule 542 according to the result of the optical tunnel network configuration which has been replanned, and to receive the reply message Reply representing successfully constructed returned from the optical node CM submodule 542. Next, the dynamic allocation submodule 524 is configured to adjust and to transmit the top-of-rack switch control command CC_ToR to the top-of-rack switch CM submodule 544 according to the optical tunnel network configuration which has been replanned. In addition, the dynamic allocation submodule 524 is configured to store the optical tunnel network configuration which has been replanned to the shared memory 590 via the writing command W_tun.

Specifically, the load notification Alarm includes an overload alarm and an underload alarm. When the load notification Alarm is the overload alarm, the dynamic allocation submodule 524 is configured to perform calculation to determine to perform tunnel creation and/or tunnel splitting according to the optical tunnel allocation algorithm. When the load notification Alarm is the underload alarm, the dynamic allocation submodule 524 is configured to perform tunnel merging and/or tunnel removal.

When the dynamic allocation submodule 524 receives the overload alarm, the dynamic allocation submodule 524 will optimize calculations according to the optical tunnel allocation algorithm, so as to determine to perform tunnel creation or to use the existing optical tunnel with low usage rate to make the dataflows in the overload optical tunnel perform tunnel splitting to prevent the optical tunnel from overflowing and causing the packet loss. The specific example about when and how to send the load notification Alarm may be referenced to the detailed description about the bandwidth usage monitor 560.

As shown in FIG. 20A, on the condition that the bandwidth usage of the optical tunnel using the path RP4 and wavelength λ1 is overloading, the new optical tunnel (e.g., the optical tunnel using the path RP5 and wavelength λ2 shown in FIG. 20B) is built between the same source terminal (rack 900d) and the same destination terminal (rack 900e) as the path RP4 by the allocation algorithm, and the newly built optical tunnel is used to make the high load dataflows in the original optical tunnel with wavelength λ1 split (i.e., one part of data passing through the path RP4 with wavelength λ1 (e.g., 2.5-5 Gbps), another part of data passing through the path RP5 with wavelength λ2 (e.g., 5-7.5 Gbps)), this is called the tunnel splitting. Of course, as described above, the allocation algorithm may also find the existing optical tunnels or multiple optical tunnels with tunnel relaying to perform tunnel splitting, and not build the new optical tunnel, so there may not be an operation to establish a new optical tunnel, that is, the split dataflows is combined to the existing optical tunnels, but the precondition is that the combined optical tunnels will not be overloading.

The detailed operation flowchart S21 processing the high load tunnel is shown in FIG. 21. When the overload alarm is received, the optical tunnel of which the bandwidth usage rate is overload and the largest dataflows in the overload optical tunnel are found. The available existing optical tunnels are found according to the optical tunnel allocation algorithm and the dataflows are guided to the optical tunnels which are found to perform tunnel splitting. If the available existing optical tunnels are not enough to perform tunnel splitting, the new optical tunnel will be built first and then the tunnel splitting is performed.

On the other hand, when the dynamic allocation submodule 524 receives the message of underload alarm, the dataflows in the optical tunnel which is underload will be merged into other existing optical tunnels (tunnel merging), and the optical tunnel which is underload will be removed (tunnel removal). As shown in FIG. 22A, between the same source terminal (rack 900f) and the same destination terminal (rack 900g), when two original optical tunnels using path RP6 and wavelength λ1 and using path RP7 and wavelength λ2 are underload (e.g., 0-2.5 Gbps), the dynamic allocation submodule 524 is able to merge the two original optical tunnels into one of them, and this is called the tunnel merging. For example, the two original optical tunnels are merged in to the optical tunnel using the path RP6 and wavelength λ1 as shown in FIG. 22B, and the optical tunnel using the path RP7 and wavelength λ2 are removed after the tunnel merging. It should be noted that the path RP6 which has been merged must not cause overloading (e.g., keep at 2.5-5 Gbps), or the other optical tunnels must be found to perform tunnel merging. Therefore, the allocation algorithm needs to consider the load balance of the overall optical tunnel to make the decision of the traffic configuration of the optical tunnel.

The detailed operation flowchart S23 processing the low load tunnel is shown in FIG. 23. When the underload alarm is received, the load balancing of the overall optical tunnel is considered to make the optical tunnel and traffic configuration, and then optical tunnel merging and optical tunnel removal are performed.

FIG. 24 is an example of the optical tunnel allocation algorithm, it uses simple sequential way to process the overload and underload condition, that is, when the new optical tunnel needs to be built, the first available set of the path and the wavelength is chosen, and dataflows splitting or merging is arranged, and system optimization may not be considered. Therefore, the allocation algorithm is merely the basic method. According to the different targets, such as to achieve the maximum throughput of the system, to achieve the most balanced optical tunnel load, to change the minimum optical tunnel or other different goals, the allocation algorithm is designed differently. To achieve fast and optimized calculations, the machine learning may be introduced into the distribution algorithm. The input in the algorithm is the optical tunnel where the overload alarm occurs or the optical tunnel where the underload alarm occurs.

About the detailed operation of the configuration managing module 540, please refer to FIG. 25. FIG. 25 is a detailed functional block diagram of a SDN controller 500 in accordance with some embodiments of the present disclosure. As show in FIG. 25, the optical node CM submodule 542 is configured to receive the optical node control command CC_opt of the tunnel scheduling module 520, to convert the optical node control command CC_opt into the wavelength selection switch control signal CS_WSS, and to output the wavelength selection switch control signal CS_WSS to the optical switches (optical switch interconnect sub-systems OSIS and optical add-drop sub-systems OADS). Next, the optical node CM submodule 542 is configured to receive the reply message Reply representing success/failure setting returned by the optical switches (optical switch interconnect sub-systems OSIS and optical add-drop sub-systems OADS). Furthermore, as shown in FIG. 25, the top-of-rack switch CM submodule 544 is configured to receive the top-of-rack switch control command CC_ToR of the tunnel scheduling module 520, and to transmit the top-of-rack switch control signal CS_ToR to the top-of-rack switches ToR.

The detailed descriptions about how to realize the tunnel relay via the top-of-rack switch control command CC_ToR is as following. One optical tunnel is able to directly connect two specific optical add-drop sub-systems OADS. The tunnel relay is to make the optical signal pass through the first optical tunnel to reach to a certain optical add-drop sub-system OADS and to convert into the electrical signal to enter the top-of-rack switch ToR which is connected, and then to convert into the optical signal to enter the second optical tunnel immediately to reach the optical add-drop sub-system OADS of final destination. The present situation of the optical tunnel network is assumed as shown in FIG. 26, there are two optical tunnels which have existed, and the two optical tunnels include paths RP8 and RP9 respectively. The path RP8 is from the top-of-rack switches ToR_1, through the optical add-drop sub-system OADS_1, optical switch interconnect sub-system OSIS and optical add-drop sub-system OADS_2, and to the top-of-rack switches ToR_2. The path RP9 is from the top-of-rack switches ToR_2, through the optical add-drop sub-system OADS_2 and optical add-drop sub-system OADS_3, and to the top-of-rack switches ToR_3. At this time, if the tunnel scheduling module 520 determines to use the tunnel relay to build the transmission tunnel from the top-of-rack switches ToR_1 to the top-of-rack switches ToR_3, the tunnel scheduling module 520 sends the top-of-rack switch control signal CS_ToR to the top-of-rack switches ToR through the top-of-rack switch CM submodule 544 to set the top-of-rack switch ToR_1 and ToR_2. The top-of-rack switch ToR_1 and ToR_2 is added the appropriate flow entries by setting, so that the packet is able to reach the top-of-rack switches ToR_3 from the top-of-rack switches ToR_1 passing through the path RP8 and path RP9. Specifically, when the top-of-rack switches ToR receives the packet, the transfer of the packet is done according to the matching flow entry in the flow table. Therefore, the transmission path of the packet is able to be controlled by the top-of-rack switch control signal CS_ToR changing the flow entries in the flow table. Further description, the flow entry is composed of a match field and an action field. The match field is composed of one or more fields, such as source IP, destination IP, or other OpenFlow supported fields such as Vlan ID, etc. The action field is mainly composed of output field, which represents which port of the top-of-rack switch to send the packet. Therefore, if the transmission tunnel from the top-of-rack switches ToR_1 to the top-of-rack switches ToR_3 is to build by using tunnel relay (path RP8 and path RP9), firstly, the top-of-rack switches ToR_1 is set to add a new flow entry, flow entry:{Match[src: IP in ToR_1, Dst: IP in ToR_3], Action[output: port of tunnel 1]}. Next, the top-of-rack switch ToR_2 is set to add a flow entry, flow entry: {Match[src:IP in ToR_1, Dst:IP in ToR_3], Action[output: port of tunnel 2]}. And the top-of-rack switch ToR_3 does not need additional setting, because there are already the flow entry, flow entry {Match[Dst: IP in ToR_3], Action [output: port of server]}. The src represents the source IP address, Dst represents the destination IP address. The tunnel 1 is the optical tunnel with the wavelength $\lambda 1$ and the path RP8, the tunnel 2 is the optical tunnel with the wavelength $\lambda 2$ and the path RP9.

In this way, because the flow entries are added, when the top-of-rack switch ToR_1 receives the packet of which the src is the top-of-rack switch ToR_1 itself and the Dst is the top-of-rack switch ToR_3, the top-of-rack switch ToR_1 will first check the flow table to see if there are any flow entries that may match the pair. When there is a flow entry being {Match[src: IP in ToR_1, Dst: IP in ToR_3], Action [output: port of tunnel 1]} matched, the packet will be sent from the optical tunnel tunnel 1 with the wavelength $\lambda 1$ and the path RP8 according to the action field in the flow entry. Because the optical tunnel has been built, the packet will reach to the top-of-rack switch ToR_2 passing through the optical tunnel path RP8. Similarly, when the top-of-rack switch ToR_2 check the flow table and sees the flow entry being {Match[src:IP in ToR_1, Dst:IP in ToR_3], Action [output: port of tunnel 2]} matched, the packet will be sent from the optical tunnel tunnel 2 with the wavelength $\lambda 2$ and the path RP9 according to the action field in the flow entry. When the packet passes though the optical tunnel path RP9 and reaches to the top-of-rack switch ToR_3, the top-of-rack switch ToR_3 finds that the Dst in the packet is the IP address of itself, then the packet is sent to the port which is connected to the corresponding server according to the action field in the flow entry. Accordingly, the packet is able to use the tunnel relay to reach to the destination server, and no need to build additional optical tunnels.

About the detailed description of the bandwidth usage monitor 560, please refer to FIG. 27. FIG. 27 is detailed functional block diagram of a SDN controller 500 in accordance with some embodiments of the present disclosure. As shown in FIG. 27, the statistics handler 562 in the bandwidth usage monitor 560 is configured to request the top-of-rack switches ToR via the request message Request to send the flow statistics DATA_stat, to receive the flow statistics DATA_stat and to calculate the dataflow rates of the dataflows according to the flow statistics DATA_stat. Next, the statistics handler 562 is configured to store the dataflow rates to the shared memory 590 via the writing command W_stat. In addition, after all the dataflow rates are stored, the statistics handler 562 is configured to trigger the wavelength usage handler 564 in the bandwidth usage monitor 560 via the trigger message Trigger, to make the bandwidth usage monitor 560 start to calculate the bandwidth usage rate.

As shown in FIG. 27, the wavelength usage handler 564 is configured to read the dataflow rates of the dataflows from the shared memory 590 via the reading command R_stat, and read the optical tunnel network configuration via the reading command R_tun. The wavelength usage handler 564 is configured to calculate the bandwidth usage rate according to the dataflow rates, and to store the bandwidth usage rate to the shared memory 590 via the writing command W_use. In addition, the wavelength usage handler 564 is further configured to determine whether the bandwidth usage rate is too high or too low. If the bandwidth usage rate is too high or too low, the wavelength usage handler 564 is configured to send the load notification Alarm to the tunnel scheduling module 520 according to the bandwidth usage rate.

About how the bandwidth usage monitor 560 monitors the bandwidth usage rates of every optical tunnel in the intelligence-defined optical tunnel network system 100, please refer to FIG. 28. As shown in FIG. 28, the transmission process of a dataflow from one terminal to another terminal in the intelligence-defined optical tunnel network system 100 includes three parts, marked by different dotted lines respectively. First, in the first part, the dataflows from the rack of the source terminal is sent to the top-of-rack switch ToR_4 of the source terminal, and the top-of-rack switch ToR_4 compares the source IP address and the destination IP address of the packet in the dataflows to the matched field of all flow entries in the flow table. By using the appropriate match field, packets of the same dataflows will be compared to the same flow entry. After the comparison is met, the dataflow is guided to the corresponding optical tunnel according to the action field of the flow entry (for example, in FIG. 28, the dataflow will enter the optical add-drop sub-system OADS_4 of the source terminal from the output port of the top-of-rack switch ToR_4). At the same time that the data stream is imported, the top-of-rack switch ToR_4 also updates the matched bytes in the counter field in the flow entry according to the number and size of the dataflow packets, that is, the dataflow rates of the dataflows. Next, in the second part, the dataflows passes through the optical tunnel from the optical add-drop sub-system OADS_4 of the source terminal to the optical add-drop sub-system OADS_5 of the destination terminal. At last, in the third part, the top-of-rack switch ToR_5 of the destination terminal receives the dataflows from the optical add-drop sub-system OADS_5. And the top-of-rack switch ToR_5 compares the flow entry, sends the packet of the dataflows to the corresponding output port (i.e., the server of the destination), and complete the dataflows transmission.

From the above dataflows transmission process, it could be known that all dataflows are compared to the flow entry of the top-of-rack switch ToR_4 of the source terminal and then guided to the optical tunnel network. And the dataflow rates will be recorded in the matched bytes in the counter field in the flow entry. By calculating the matched bytes of the counter field, the rate of flow entry is able to be obtained, the rate of flow entry is able to reflect to the dataflows of the optical tunnel outputted from the flow entry. With this feature, the bandwidth usage monitor 560 collects and calculates the dataflow rates of all the flow entries in the top-of-rack switch of each source terminal, and sums up the dataflow rates of all the flow entries in the same optical tunnel, in this way, the bandwidth usage rate of any one of the optical tunnels is able to be obtained.

In other words, the statistics handler 562 in the bandwidth usage monitor 560 will regularly obtain the OpenFlow flow statistics from the top-of-rack switch ToR, and calculate the dataflows of the flow entry according to the flow statistics, and then writes the dataflows into the Flow_Status Table of the shared memory 590. When the dataflows of all the flow entries are recorded, the wavelength usage handler 564 starts to add up the bandwidth usage rate of the optical tunnels. By the Flows_in_Tunnel Table, the wavelength usage handler 564 is able to know which flow entries are in each optical tunnel. Then, according to the Flow_Status Table, sum up the dataflow rates of the flow entries in the optical tunnel, the bandwidth usage rate of the tunnel is able to be calculated. When the bandwidth usage rates of all the optical tunnels are recorded, the wavelength usage handler 564 will check the usage of each tunnel one by one. If there is overloading or underloading in a certain tunnel, and the situation has been going on for a while, the wavelength usage handler 564 will send the loading notification to the tunnel scheduling module 520.

In this way, when the bandwidth usage rates of the optical tunnel is too high, the bandwidth usage monitor 560 will send the load notification Alarm representing overloading to the tunnel scheduling module 520 so as to build the new optical tunnel and/or perform tunnel splitting. On the other hand, when the bandwidth usage rates of the optical tunnel is too low, the bandwidth usage monitor 560 will send the load notification Alarm representing underloading to the tunnel scheduling module 520 so as to perform tunnel merging and/or tunnel removal.

In some embodiments, since the intelligence-defined optical tunnel network system 100 may support progressive deployment, the number and/or distribution of optical nodes may vary depending on the number of racks (for example: the different number of the optical switch interconnect sub-systems and optical add-drop sub-systems). Therefore, the routing paths between the optical nodes will be different. The topology transformer 580 is configured to calculate the routing path table T_Rout according to the topology data inputted by the external (e.g., inputted by users), and to store the routing path table T_Rout and the topology data to the shared memory 590. Specifically, the topology data includes the number of the optical nodes and the connection of the optical nodes. The routing path table T_Rout includes all the possible routing paths between one of the optical add-drop sub-system and the other optical add-drop sub-systems in the intelligence-defined optical tunnel network system 100.

The routing path table T_Rout may be further divided into the intra-pod routing path table and the inter-pod routing path table. Table 4 is the content of the intra-pod routing path table. In Table 4, the routing paths are two types, a first routing path built by using the first transmission ring Ring1 and a second routing path built by using the transmission ring Ring2, respectively. In addition, the function of the routing path function in Table 4 is when the number of the source optical add-drop sub-system OADS and the destination optical add-drop sub-system OADS inputted is matched, the intra-pod routing path corresponding to the first type and the intra-pod routing path corresponding to the second type are calculated. In the routing path function, (SP, SR) represents from which source rack (SR) in which source pod (SP) the source optical add-drop sub-system OADS is, and (DP, DR) represents from which destination rack (DR) in which destination pod (DP) the destination optical add-drop sub-system OADS is. Specifically, FIG. 29 is the detailed description of the first type of the intra-pod routing path function. The algorithm is to find the routing path of starting as the optical add-drop sub-system OADS(SP, SR), along with the first transmission ring Ring1, and reaching to the optical add-drop sub-system OADS(DP, DR) according to the source pod SP, the source rack SR, the destination pod DP, the destination rack DR, the routing path type inputted by the users and the topology data recorded in the system. There are two fields of function output: OADS_Sender and OADS_Rcve. OADS_Sender represents the index of the source optical add-drop sub-system OADS and which the transmission module (210 or 220) is. OADS_Rcve represents the index of the destination optical add-drop sub-system OADS and which the transmission module (210 or 220) is. According to the function output, which optical nodes the routing path will pass through and which corresponding optical elements needs to be set are able to be found. The method for the second transmission ring Ring2 is similar.

TABLE 4

| type of routing path | routing path function |
|---|---|
| type 1 | Intra_Pod_Rpath_Type_1(SP, SR, DP, DR) |
| type 2 | Intra_Pod_Rpath_Type_2(SP, SR, DP, DR) |

For example, as shown in FIG. 30, the source optical add-drop sub-system OADS(SP, SR) and the destination optical add-drop sub-system OADS(DP, DR) are in the same pod, therefore, the routing path between the two is the intra-pod routing path. When the system decides to build the first type of the routing path between the source optical add-drop sub-system OADS(SP, SR) and the destination optical add-drop sub-system OADS(DP, DR), the source pod SP, the source rack SR in the source optical add-drop sub-system OADS(SP, SR) and the destination pod DP, the destination rack DR in the destination optical add-drop sub-system OADS(DP, DR) are regarded as input, and the first type of routing path function Intra_Pod_Rpath_Type_1 (SP,SR,DP,DR) in Table 4 is called to perform calculation. According to the algorithm in FIG. 29, the function output being OADS_Sender:(Ring_1, SP, SR), OADS_Rcver: (Ring_1, DP, DR) is obtained. This shows that the routing path found by the routing path function is starting from the transmission module 210a in the optical add-drop sub-system OADS(SP, SR), along the first transmission ring Ring1, and reaching to the transmission module 210b in the OADS(DP, DR). By setting all the optical elements along the routing path, the system is able to establish the routing path as shown in FIG. 30.

Table 5 is the inter-pod routing path table, there are four types of inter-pod routing paths in the recorded table, Type 11, Type 12, Type 21 and Type 22, respectively. Type 11 is the routing path using the first transmission ring Ring1 from the source optical add-drop sub-system OADS up to the optical switch interconnect sub-system OSIS in the second tier, and using the first transmission ring Ring1 down to the destination optical add-drop sub-system OADS. Type 12 is the routing path using the first transmission ring Ring1 from the source optical add-drop sub-system OADS up to the optical switch interconnect sub-system OSIS in the second tier, and using the second transmission ring Ring2 down to the destination optical add-drop sub-system OADS. Type 21 and Type 22 may be analogized according to the above rules. The way to use the inter-pod routing path function is as same as the way to use the intra-pod routing path function, as input the source pod SP, the source rack SR, the destination pod DP, the destination rack DR, the routing path type to the system, the routing path is able to be calculated dynamically. FIG. 31 is taken the routing path function algorithm of Type 11 as an example, the algorithm finds the inter-pod routing path from the transmission module 210 of the source optical add-drop sub-system OADS(SP, SR) up to the source optical switch interconnect sub-system OSIS (source OSIS), along the destination optical switch interconnect sub-system OSIS (destination OSIS) connected to the transmission module 210 of the destination optical add-drop sub-system OADS (DP, DR) with the shortest path, and then down to the destination optical add-drop sub-system OADS(DP, DR) from the destination optical switch interconnect sub-system OSIS, according to the source pod SP, the source rack SR in the source optical add-drop sub-system OADS(SP, SR), the destination pod DP, the destination rack DR in the destination optical add-drop sub-system OADS(DP, DR), the routing path type (Type 11, Type 12, Type 21, or Type 22) inputted by users and the topology data in the system. There are four fields of the function output: OADS_Sender, OSIS_EW, OSIS_South and OADS_Rcver. OADS_Sender represents the index of the source optical add-drop sub-system OADS and which the transmission module (210 or 220) is. OSIS_EW represents the index of the source optical switch interconnect sub-system OSIS and the routing direction (to east or to west) of the second tier. OSIS_South represents the index of the destination optical switch interconnect sub-system OSIS and which the transmission module (210 or 220) is. OADS_Rcver represents the index of the destination optical add-drop sub-system OADS and which the transmission module is. According to the function output, which optical nodes the routing path will pass through and which corresponding optical elements needs to be set are able to be found.

TABLE 5

| type of routing path | routing path function |
|---|---|
| Type 11 | Inter_Pod_Rpath_Type_11(SP, SR, DP, DR) |
| Type 12 | Inter_Pod_Rpath_Type_12(SP, SR, DP, DR) |
| Type 21 | Inter_Pod_Rpath_Type_21(SP, SR, DP, DR) |
| Type 22 | Inter_Pod_Rpath_Type_22(SP, SR, DP, DR) |

As the example in FIG. 32, the source optical add-drop sub-system OADS(SP, SR) and the destination optical add-drop sub-system OADS(DP, DR) are in the different pods, therefore, the routing path between the two is the inter-pod routing path. When the system decides to build the routing path of Type 11 between the source optical add-drop sub-system OADS(SP, SR) and the destination optical add-drop sub-system OADS(DP, DR), the source pod SP, the source rack SR in the source optical add-drop sub-system OADS (SP, SR) and the destination pod DP, the destination rack DR in the destination optical add-drop sub-system OADS(DP, DR) are regarded as input, and the Type 11 of routing path function Inter_Pod_Rpath_Type_11(SP,SR,DP,DR) is called to perform calculation. According to the algorithm of FIG. 31, the function output parameters obtained are OADS_Sender: (Ring_1, SP, SR), OSIS_EW: (To_East, SP), OSIS_South: (Ring_1, DP), OADS_Rcver: (Ring_1, DP, DR). Therefore, it may be known that the routing path found according to the routing path function is: staring from the transmission module 210c in the source optical add-drop sub-system OADS(SP, SR), along the first transmission ring Ring1 up to the source optical switch interconnect sub-system OSIS(SP) of the second tier and east to the destination optical switch interconnect sub-system OSIS(DP), and from the destination optical switch interconnect sub-system OSIS(DP) along the first transmission ring Ring1 down to the transmission module 210*d* in the destination optical switch interconnect sub-system OADS(DP, DR). By setting all the optical elements along the routing path, the system is able to establish the routing path as shown in FIG. 32.

In this way, by topology transformer 580 calculating the routing path table T_Rout according to the topology data and storing the routing path table T_Rout to the shared memory 590, It ensures that the routing path table T_Rout may change with the architecture of the intelligence-defined optical tunnel network system 100.

In summary, the SDN controller 500 proposed in the various embodiments of the present invention continuously monitors the network environment status in the intelligence-defined optical tunnel network system 100, including the network topology, the wavelength allocation status, the network routing allocation status, the wavelength bandwidth usage, and dataflow rates, and then optimizes the optical tunnel configuration and dataflow guidance according to the designed smart algorithm. The SDN controller 500 is able to quickly determine the optimal routing path and wavelength selection switch settings to achieve the highest throughput of the system and to minimize the transmission delay of the dataflows, while avoiding routing and wavelength conflicts.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An network system control method, comprising:
    planning, by a tunnel scheduling module, an optical tunnel network according to a routing path table and transmitting, by the tunnel scheduling module, a control command according to an optical tunnel network configuration of the optical tunnel network, wherein the optical tunnel network comprises a plurality of optical tunnels, and each of the optical tunnels comprises a routing path of a plurality of routing paths and a wavelength of a plurality of wavelengths;
    outputting, by a configuration managing module, a control signal to a plurality of optical switches and a plurality of top-of-rack switches according to the control command;
    receiving, by a bandwidth usage monitor, flow statistics of a plurality of dataflows of the optical tunnels from the top-of-rack switches, calculating, by the bandwidth usage monitor, dataflow rates of the dataflows and bandwidth usage rates of the optical tunnels, and transmitting, by the bandwidth usage monitor, a load notification when one of the bandwidth usage rates exceeds a preset interval; and
    replanning, by the tunnel scheduling module, the optical tunnel network according to the load notification.

2. The network system control method of claim 1, further comprising:
    calculating, by a topology transformer, the routing path table according to topology data, and storing, by the topology transformer, the routing path table and the topology data to a shared memory, wherein the topology data comprises a number of optical nodes and connectivity of the optical nodes, the routing path table comprises a plurality of routing paths between any two of the optical switches.

3. The network system control method of claim 1, further comprising:
    planning, by a pre-allocation submodule of the tunnel scheduling module the optical tunnel network according to the routing path table;
    transferring, by the pre-allocation submodule, an optical node control command and a switch control command to the configuration managing module according to the optical tunnel network configuration; and
    storing, by the pre-allocation submodule, the optical tunnel network configuration to a shared memory, wherein the optical tunnel network configuration comprises the plurality of routing paths and the plurality of wavelengths of the plurality of optical tunnels, the optical tunnel network configuration is configured for set-up of the optical tunnels.

4. The network system control method of claim 3, further comprising:
    receiving, by an optical node submodule of the configuration managing module, the optical node control command;
    outputting, by the optical node submodule, a wavelength selection switch control signal to the plurality of optical switches according to the optical node control command;
    receiving, by a top-of-rack switch submodule of the configuration managing module, the switch control command; and
    converting, by the top-of-rack switch submodule, the switch control command into a switch control signal and outputting, by the top-of-rack switch submodule, the switch control signal to the top-of-rack switches.

5. The network system control method of claim 1, further comprising:
    receiving, by a statistics module of the bandwidth usage monitor, the flow statistics from the top-of-rack switches and calculating, by the statistics module of the bandwidth usage monitor, the dataflow rates according to the flow statistics;
    calculating, by a wavelength usage module of the bandwidth usage monitor, the bandwidth usage rates according to the dataflow rates; and
    transmitting, by the wavelength usage module, the load notification according to the bandwidth usage rates.

6. The network system control method of claim 5, further comprising:
    receiving, by a dynamic allocation submodule of the tunnel scheduling module the load notification;
    replanning, by the dynamic allocation submodule, the optical tunnel network according to the load notification;
    adjusting and transmitting, by the dynamic allocation submodule, an optical node control command and a switch control command according to the optical tunnel network configuration corresponding to the optical tunnel network replanned by the dynamic allocation submodule; and
    storing, by the dynamic allocation submodule, the optical tunnel network configuration corresponding to the optical tunnel network replanned by the dynamic allocation submodule to a shared memory.

7. A network system controller, configured to control a plurality of optical switches and a plurality of top-of-rack switches to build optical tunnels, the network system controller comprising:
   a shared memory;
   a topology transformer, coupled to the shared memory, configured to calculate a routing path table, and store the routing path table to the shared memory;
   a tunnel scheduling module, coupled to the shared memory, configured to build an optical tunnel network according to the routing path table, and to transfer a control command according to an optical tunnel network configuration of the optical tunnel network;
   a configuration managing module, coupled to the tunnel scheduling module, configured to convert the control command into a control signal and to output the control signal to the optical switches and the top-of-rack switches; and
   a bandwidth usage monitor, coupled to the shared memory and the tunnel scheduling module, configured to receive flow statistics from the top-of-rack switches, to calculate dataflow rates and bandwidth usage rates according to the flow statistics, and to transfer a load notification to the tunnel scheduling module according to the bandwidth usage rates, the tunnel scheduling module configured to replan the optical tunnel network according to the bandwidth usage rates and the optical tunnel network configuration.

* * * * *